United States Patent
Migliori

(10) Patent No.: US 9,495,401 B2
(45) Date of Patent: Nov. 15, 2016

(54) DATABASE-DRIVEN ENTITY FRAMEWORK FOR INTERNET OF THINGS

(71) Applicant: Douglas T. Migliori, Newport Coast, CA (US)

(72) Inventor: Douglas T. Migliori, Newport Coast, CA (US)

(73) Assignee: Douglas T. Migliori, Newport Beach, CA (US)

( * ) Notice: Subject to any disclaimer, the term of this patent is extended or adjusted under 35 U.S.C. 154(b) by 18 days.

(21) Appl. No.: 14/685,545

(22) Filed: Apr. 13, 2015

(65) Prior Publication Data

US 2015/0293961 A1  Oct. 15, 2015

Related U.S. Application Data

(60) Provisional application No. 61/978,440, filed on Apr. 11, 2014, provisional application No. 62/008,311, filed on Jun. 5, 2014, provisional application No. 62/130,330, filed on Mar. 9, 2015.

(51) Int. Cl.
*G06F 17/30* (2006.01)

(52) U.S. Cl.
CPC ... *G06F 17/30336* (2013.01); *G06F 17/30126* (2013.01); *G06F 17/30135* (2013.01)

(58) Field of Classification Search
CPC ............. G06F 17/30; G06F 17/30345; G06F 17/30436; G06F 17/30557
See application file for complete search history.

(56) References Cited

U.S. PATENT DOCUMENTS

| | | | |
|---|---|---|---|
| 6,981,097 B2 * | 12/2005 | Martin et al. | 711/130 |
| 2006/0143238 A1 * | 6/2006 | Tamatsu | 707/200 |
| 2007/0198656 A1 | 8/2007 | Mazzaferri et al. | |
| 2007/0283317 A1 * | 12/2007 | Sadler et al. | 717/103 |
| 2010/0057485 A1 | 3/2010 | Luft | |
| 2011/0200052 A1 * | 8/2011 | Mungo | H04L 41/028 370/401 |
| 2012/0209762 A1 * | 8/2012 | Metaireau et al. | 705/39 |
| 2013/0094444 A1 | 4/2013 | Lai et al. | |
| 2013/0179557 A1 * | 7/2013 | Bian et al. | 709/223 |
| 2013/0188515 A1 | 7/2013 | Pinheiro et al. | |
| 2013/0265937 A1 | 10/2013 | Jain et al. | |
| 2014/0181085 A1 * | 6/2014 | Gokhale et al. | 707/722 |
| 2014/0258363 A1 * | 9/2014 | Peco et al. | 709/202 |
| 2014/0324973 A1 * | 10/2014 | Goel | H04L 12/2803 709/204 |

OTHER PUBLICATIONS

Pfister, Getting Started with the Internet of Things, May 2011.*
Doukas, Building Internet of Things with the Arduino, retrieved from archive.org for Feb. 12, 2014.*
International Search Report and Written Opinion for PCT/US2015/025622 dated Jul. 16, 2015, 14 pgs.

* cited by examiner

*Primary Examiner* — Brittany N Allen
(74) *Attorney, Agent, or Firm* — Procopio, Cory, Hargreaves & Savitch LLP; Jonathan D. Cheng

(57) ABSTRACT

Unified and normalized management of an object within a structured data store on any machine and/or across difference machines. In an embodiment, a first agent accesses a first request dataset representing a two-dimensional structure. Each row in the request dataset comprises an identification of an agent, a statement, an identification of a resource to execute the statement, and one of a plurality of request types. Each row in the request dataset is processed according to the identification of the agent in the row. When the identified agent is the first agent, the request type of the row is accessed, and one or more elements in the row are processed based on the request type. When the identified agent is not the first agent, the row is sent within a second request dataset to the identified agent (which may be on a different machine than the first agent) for processing.

18 Claims, 18 Drawing Sheets

SDS 290

Entity object dataset (8F55...) 293

| CI | 0 | 1 | 2 | 6 | | | 7 | 8 | Y |
|---|---|---|---|---|---|---|---|---|---|
| RI | Object Identifier | Owner Domain | Object Entity | BE05... (Key) | 1 (Code) | 2 (Name) | 156E... (Parent Entity) | 4449... (Child Entity) | |
| 8 | 2120... | 0914... | 8F55... | | | | | | |
| 9 | 4A8F... | 0914... | 8F55... | 3 (Parent/Child) | | | 2120... | 4A8F... | |
| 10 | 7F69... | 0914... | 8F55... | 6 (Parent/Code) | | | 4A8F... | | |
| 11 | 5787... | 0914... | 8F55... | 3 | | | 7F69... | 5787... | |
| 12 | 2A98... | | | | | | | | |
| x | | | | | | | | | |

Attribute object dataset (066D...) 294

| CI | 0 | 1 | 2 | 3 | 6 | 7 | Y |
|---|---|---|---|---|---|---|---|
| RI | Object Identifier | Owner Domain | Object Entity | A0A2... (Entity) | 1001... (Type) | 54C9... (Parent Entity) | |
| 7 | 1342... | 0914... | 066D... | 2120... | 1 (Text) | | |
| 8 | C889... | 0914... | 066D... | 4A8F... | 1 | | |
| 9 | 6284... | 0914... | 066D... | 7F69... | 3 (Parent) | 2120... | |
| 10 | 38F7... | 0914... | 066D... | 7F69... | 3 | 4A8F... | |
| 11 | E32D... | 0914... | 066D... | 5787... | 3 | 4A8F... | |
| 12 | 5C37... | 0914... | 066D... | 2A98... | 1 | 7F69... | |
| 13 | BC97... | 0914... | 066D... | 2A98... | 3 | 5787... | |
| 14 | C835... | | | | | | |
| x | | | | | | | |

FIG. 12

DATABASE-DRIVEN ENTITY FRAMEWORK FOR INTERNET OF THINGS

CROSS-REFERENCE TO RELATED APPLICATIONS

This application claims priority to U.S. Provisional Patent App. Nos. 61/978,440, filed on Apr. 11, 2014, and titled "X10DATA Metadatabase Cloud Service," and 62/008,311, filed on Jun. 5, 2014, and titled "Digital Automation Platform," and 62/130,330, filed on Mar. 9, 2015, and titled "Digital Automation Platform," the entireties of all of which are hereby incorporated herein by reference.

This application is related to U.S. patent application Ser. No. 14/160,403, filed on Jan. 21, 2014 and issued as U.S. Pat. No. 9,015,465 on Apr. 21, 2015, which is a continuation of U.S. patent application Ser. No. 13/830,249, filed on Mar. 14, 2013, which claims priority to U.S. Provisional Patent App. Nos. 61/762,779, filed on Feb. 8, 2013, and 61/783,362, filed on Mar. 14, 2013, the entireties of all of which are hereby incorporated herein by reference.

BACKGROUND

1. Field of the Invention

The embodiments described herein are generally directed to the unified and normalized management of an object within a structured data store on any machine and/or across different machines.

2. Description of the Related Art

Conventionally, data-centric software applications and application platforms have incorporated one or more software architecture patterns and programming paradigms, including service-oriented, client-server, peer-to-peer, event-driven, and object-oriented architectures, and object-oriented programming, object-relational mapping, and entity-relationship modeling.

Conventionally, machine to machine and human to machine communications are managed through one or more communication protocols (e.g., MQTT, XMPP, DDS, AMQP, CoAP, RESTful HTTP).

None of the existing software architecture patterns or communication protocols has an abstraction layer capable of effectively supporting the interoperability requirements of the Internet of Things. This leads to fragmented systems within complex and costly integrations between disparate systems.

It would be beneficial to have an architectural pattern and communication protocol that eliminates fragmentation and provides a normalized layer of abstraction that supports universal interoperability among machines, and enables unified management of an object within a structured data store on any machine and/or across different machines.

SUMMARY

Accordingly, systems and methods are disclosed for unified and normalized management of an object within a structured data store on any machine and/or across different machines.

In an embodiment, a method is disclosed. The method comprises using at least one hardware processor to: by a first agent on a first machine, accessing a first request dataset, wherein the first request dataset represents a two-dimensional structure having one or more rows and a plurality of columns, and wherein each of the one or more rows comprises an identification of an agent, a statement, an identification of a resource to execute the statement, and one of a plurality of request types; and process each of the one or more rows in the first request dataset by accessing the identification of an agent in the row, when the identification of the agent is the first agent, accessing the request type of the row, and processing one or more elements in the row based on the request type of the row, and, when the identification of the agent is not the first agent, sending the row in the first request dataset within a second request dataset comprising one or more rows to the identified agent for processing, wherein the identified agent is on a machine that is different from the first machine.

In an additional embodiment, a system is disclosed. The system comprises: one or more hardware processors; and one or more modules that, when executed by at least one of the one or more hardware processors, access a first events dataset, wherein the first events dataset represents a two-dimensional structure having one or more rows and a plurality of columns, and wherein each of the one or more rows comprises an identification of an object dataset, an identification of an object within the object dataset, an identification of an element of the object within the object dataset, and one of a plurality of event types, and process each of the one or more rows in the first events dataset by accessing the event type of the row, and processing one or more elements in the row, based on the event type of the row, by when the event type is a first predetermined type, creating an object within an object dataset, when the event type is a second predetermined type, updating an object within an object dataset, and, when the event type is a third predetermined type, deleting an object within an object dataset.

In an additional embodiment, a non-transitory computer-readable medium is disclosed. The medium has instructions stored thereon that, when executed by a processor, cause the processor to: access an object view identifier, wherein the object view identifier identifies a view object and one or both of an object dataset within a data store and an object within the identified object dataset, wherein the identified object dataset represents a two-dimensional structure having one or more rows and a plurality of columns; and generate a statement, wherein the statement comprises one of a view dataset and a script derived from one or more view datasets; wherein each view dataset represents a two-dimensional structure having one or more rows and a plurality of columns derived from at least one or more elements in one or both of the two-dimensional structure of the identified object dataset and a two-dimensional structure of other object datasets within the data store.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 6-18 illustrate different embodiments of related objects within object datasets within a structured data store.

DETAILED DESCRIPTION

Figure 1:
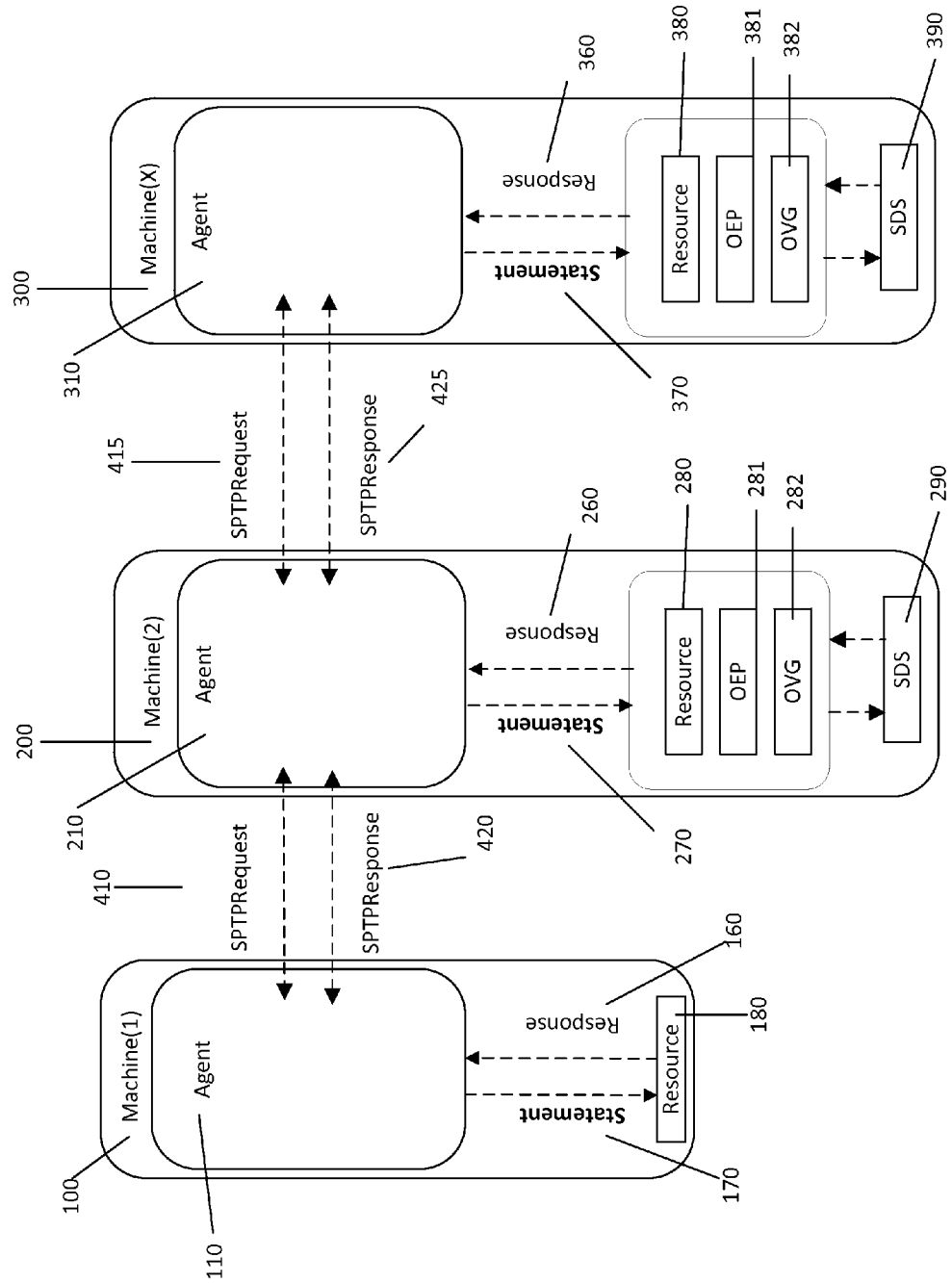
FIG. 1 illustrates a plurality of machines utilizing a structured program transfer protocol, an agent, an object event processor, an object view generator, and/or a structured data store, according to an embodiment.

A structured program transfer protocol (SPTP), object event processor (OEP), object view generator (OVG), and structured data store (SDS) are disclosed in various embodiments.

1. Glossary

For purposes of understanding the present disclosure, the following terms should be understood to include at least the following, illustrative, non-exhaustive definitions:

"Machine": An electronic device capable of performing one or more computing processes, receiving data from one or more other electronic devices (e.g., other machines), and/or sending data to one or more other electronic devices (e.g., other machines). Examples of machines include, without limitation, a server, personal computer (PC), laptop computer, tablet, a media system, an entertainment system, a control system (e.g., an in-vehicle media, entertainment, and/or controls system), smart phone, feature phone, appliance, mechanical controller, sensor, thermostat, etc.

"Agent": A hardware or software component or module that acts for a user or program in an agency relationship. Examples of agents include, without limitation, a central processing unit (CPU), microprocessor, operating system (OS), native Hypertext Markup Language (HTML) container, web browser window, web service, database server, etc.

"Statement": A structured dataset or string of characters that are constructed in the syntax of a scripting language, and which can be executed, in their entirety, by a compatible resource to perform a computing process. Examples of computing processes which may be performed by executing a statement using a resource include, without limitation, rendering a display or user interface, manipulating and/or retrieving data, printing a document, invoking an application programming interface (API), controlling a mechanism, transmitting an XML message to a web service, changing the state of a machine or resource, etc.

"Resource": A computer program that transforms statements written in a high-level scripting language to a lower-level language that can be executed on a machine to manipulate and/or retrieve data, render display content, etc. Examples of resources include, without limitation, a data engine, layout and/or rendering engine, machine control and/or printing engine, etc.

"Remote Resource": A resource on a remote machine that can be invoked directly by an agent on another machine. For example, two or more machines may be separated by one or more networks, such as the Internet, rendering each of the machines remote from the other. An example of a remote resource includes, without limitation, a web service.

"Request": A message sent to a resource or remote resource via a communication protocol that is intended to elicit a responding message. An example of a request includes, without limitation, a Hypertext Transfer Protocol (HTTP) request.

"Response": A message returned from a resource or remote resource via a communication protocol in response to a request (e.g., after executing the request). Examples of responses include, without limitation, an error message, user event, SQL result set, etc.

"Metadata-based Method": A metadata-based subroutine that is associated with a program and includes one or more single-line commands ("method steps") which are interpreted by the disclosed command processor to manipulate datasets loaded in a memory on a machine and/or invoke machine resources.

"Program": A static set of instructions that are executed by a command processor to control the behavior of a machine. The execution of a program is a series of actions following the set of instructions that it contains. Each instruction may produce an effect that alters the state of a machine according to the instruction's predefined meaning. A program manages and integrates a machine's capabilities, but typically does not directly apply in the performance of tasks that benefit the user or machine. An example of a program includes, without limitation, the Microsoft Windows™ operating system.

"Application": Computer software that applies the power of a particular program to a particular purpose. A command processor serves the program which serves the application which serves a specific purpose. Examples of applications include, without limitation, enterprise software, accounting software, office suites, graphics software, media players, etc.

"Dataset": A collection of data represented in tabular form. Each column in a dataset may represent a particular variable. Each row in a dataset may correspond to a given member of the dataset in question. A dataset may comprise data for one or more members, corresponding to the number of rows. Example embodiments of a dataset include a table within a database, a file within a file system, a two-dimensional array serialized within a string, and a port pin collection within a microcontroller.

"Dataset Element": Any value in a dataset. A dataset element can be referenced by a combination of its column position ("column index" or "CI") and row position ("row index" or "RI") within the dataset. Elements within a dataset may be referenced using [x][y] notation, where [x] is the row index and [y] is the column index. A dataset element can represent an attribute value of an object. Examples of a dataset element include a field within a database table, an address within a file, an element within a two-dimensional array, and a port pin within a microcontroller.

"Object Dataset": A structured dataset that includes a column representing a unique object identifier and one or more rows that each represent an object.

"View Dataset": A read-only dataset derived from elements from a base object dataset and one or more related object datasets.

"Nested Dataset": A view dataset stored or referenced as a dataset element within another dataset. Nested datasets are one-to-many relationships embodied in a single parent dataset memory store.

"Metadata": There are two types of metadata. "Structural metadata" is data about the design and specification of data structures. Structural metadata cannot be data about data, since at design time, the application contains no data. Rather, structural metadata is data about the containers of data. "Descriptive metadata" is data about data content. This data content is the individual instances of application data.

"Communication Protocol": A system of digital message formats and rules for exchanging messages in or between computing systems (e.g., in telecommunications). Protocols may include signaling, authentication, error detection capabilities, and/or correction capabilities. Each message has an exact meaning intended to provoke a defined response by the receiver. The nature of the communication, the actual data exchanged, and any state-dependent behaviors are defined by a technical specification or communication protocol standard. Examples of conventional communication protocols include, without limitation, HTTP, HTTP Secure (HTTPS), File Transfer Protocol (FTP), etc.

"Command Processor": A software shell with the primary purposes of (1) loading or booting another program, and (2) processing commands from the launched program. Processing of these commands can include, without limitation, data transfers, event handling, display renderings, and machine-to-machine communications. Examples of conventional command processors include, without limitation, the Microsoft Disk Operating System™ (MS-DOS), command line tools (e.g., "command.exe" or "cmd.exe"), Unix or Linux "shells," etc.

"Command": A subroutine within a command processor that can be invoked by an agent or by another command, and which executes an instruction set. Certain commands can be referenced by a command code.

"Scripting Language": A programming language that supports the writing of scripts. Scripts are programs written for a software environment that automate the execution of tasks which, alternatively, could be executed one-by-one by a human operator. Environments that can be automated through scripting include, without limitation, software applications, web pages within a web browser, shells of operating systems, and several general purpose and domain-specific languages, such as those for embedded systems. Examples of scripting languages include, without limitation, Structured Query Language (SQL), HTML, Printer Control Language (PCL), eXtensible Markup Language (XML), Computer Numeric Control (CNC), etc.

"Booting": The process of loading and executing bootstrap software by a computer during the start-up process. Booting is a chain of events that start with execution of hardware-based procedures that may then hand-off to firmware and software which is loaded into memory. Booting often involves processes such as performing self-tests, and loading configuration settings, Basic Input/Output System (BIOS), resident monitors, a hypervisor, an operating system, and/or utility software.

"Event": An action that is initiated outside the scope of a command processor, and that is handled by the command processor. Typical sources of events include users (e.g., via keystroke(s), i.e., pressing one or more keys on a keyboard) and software or hardware devices (e.g., a timer). A computer program that changes its behavior in response to events is said to be "event-driven," often with the goal of being interactive.

"Instruction Set": A collection of computer instructions, including native data types, instructions, registers, addressing modes, memory architecture, interrupt and exception handling, and external Input/Output (I/O). Instructions are in the form of a programming language (i.e., source code) or machine language (i.e., machine code) that is compatible with a machine resource. Source code is written using some human-readable computer language, usually as text. The source code of a program is specially designed to facilitate the work of computer programmers, who specify the actions to be performed by a computer, primarily by writing source code. The source code is automatically translated at some point (e.g., by a compiler) to machine code that the computer can directly read and execute.

"Data Store": A repository of a set of objects. A data store can contain one or more object datasets. A data store is a general concept that includes not just repositories like databases, but also simpler store types, such as flat files or firmware.

"Normalization": The process of reducing data and metadata to a canonical form to facilitate interoperability. For instance, dataset normalization is the process of organizing datasets and dataset elements within a data store to minimize redundancy and dependency.

"Entity": A category of like things or objects which are each recognized as being capable of an independent existence and which can be uniquely identified. Non-limiting examples of an entity include physical objects such as houses or cars, events such as house sales or car services, concepts such as customer transactions or orders, personal information such as contacts, message, appointments, and tasks, and object schema such as object datasets, dataset elements, attributes, and entities, reflectively.

"Attribute": A data characteristic of an entity. Every entity has a minimal set of uniquely identifying attributes, including a unique identifier.

"Object": A data representation of a unique instance of an entity. Data characteristics ("attribute values") of an object can be stored as dataset elements within a row of a dataset.

"GUID": A globally unique identifier (GUID) is a unique reference number generated by an algorithm that is used as an identifier in computer software. Non-limiting examples of a GUID include alphanumerical text, a sequence of digits (e.g., decimal or hexadecimal digits), a MAC address and time, and may be stored as a 16-byte (128-bit) number. An example of a GUID is "D9A4F842-AF53-4A49-B752-CE58BE46C72D".

"Object Event": A change in the state of an object, including, for a new object, the change from no state into an initial state. For example, when a consumer purchases a car, the car's state changes from "for sale" to "sold".

"Object Event Notification": A type of message (typically asynchronous) that is produced, published, propagated, detected, or consumed, and contains one or more object events. For example, a car dealer's automated system may notify another system of a car object's state change from "for sale" to "sold".

"Object View": A script in a resource-compatible scripting language that includes elements from one or more related view datasets and formatting instructions. The script, when executed by a resource, changes the state of a resource or resource's machine, and/or generates a response from the resource or resource's machine. An object view, when executed by a resource on a machine, can render a display or user interface, retrieve and/or manipulate data, print a document, invoke an application programming interface (API), control a mechanism, transmit a message to a web service, and/or change the state of a machine and/or resource, etc.

"Aggregate Object": A cluster of associated objects, including a root object, that are treated as a unit for the purpose of data changes. An example of an aggregate object is a purchase order object with one or more line item objects assigned to the purchase order object.

"Triggered Action": An action performed in response to an object event that meets a defined condition, rule, or logical test.

"Domain": A realm of administrative autonomy, authority, or control within a network. A domain can represent an addressable location on a network or a tenant within a multi-tenancy software architecture.

2. Overview

The disclosed structured program transfer protocol, agent, object event processor, object view generator, and structured data store facilitate unified and normalized management of any object within a structured data store on any machine and/or across different machines. Such machines may range, for example, from a sensor (e.g., home thermostat) to a computer (e.g., smart phone), and so on. The disclosed embodiments also facilitate the transfer and delivery of programs, applications, data, events, and views on one machine (e.g., tablet PC) to another machine (e.g., in-vehicle navigation system) via a communications interface. The request, delivery, and transfer of data and metadata for programs, program-compatible applications, events, views, etc. between machines are facilitated by a novel structured program transfer protocol for communications. The applications can be simple (e.g., an on/off switch) or complex (e.g., robotics or business solutions (e.g., enterprise resource planning (ERP), customer relationship management (CRM), etc.)).

For example, the disclosed structured program transfer protocol, agent, object event processor, object view generator, and/or structured data store can facilitate codeless, rapid development and on-demand delivery of data-centric applications on end-user devices, such as smart phones, tablets, PCs, and in-vehicle navigation systems. The data-centric application may be a spreadsheet, web site, client-server business solution, etc.

Figure 2:
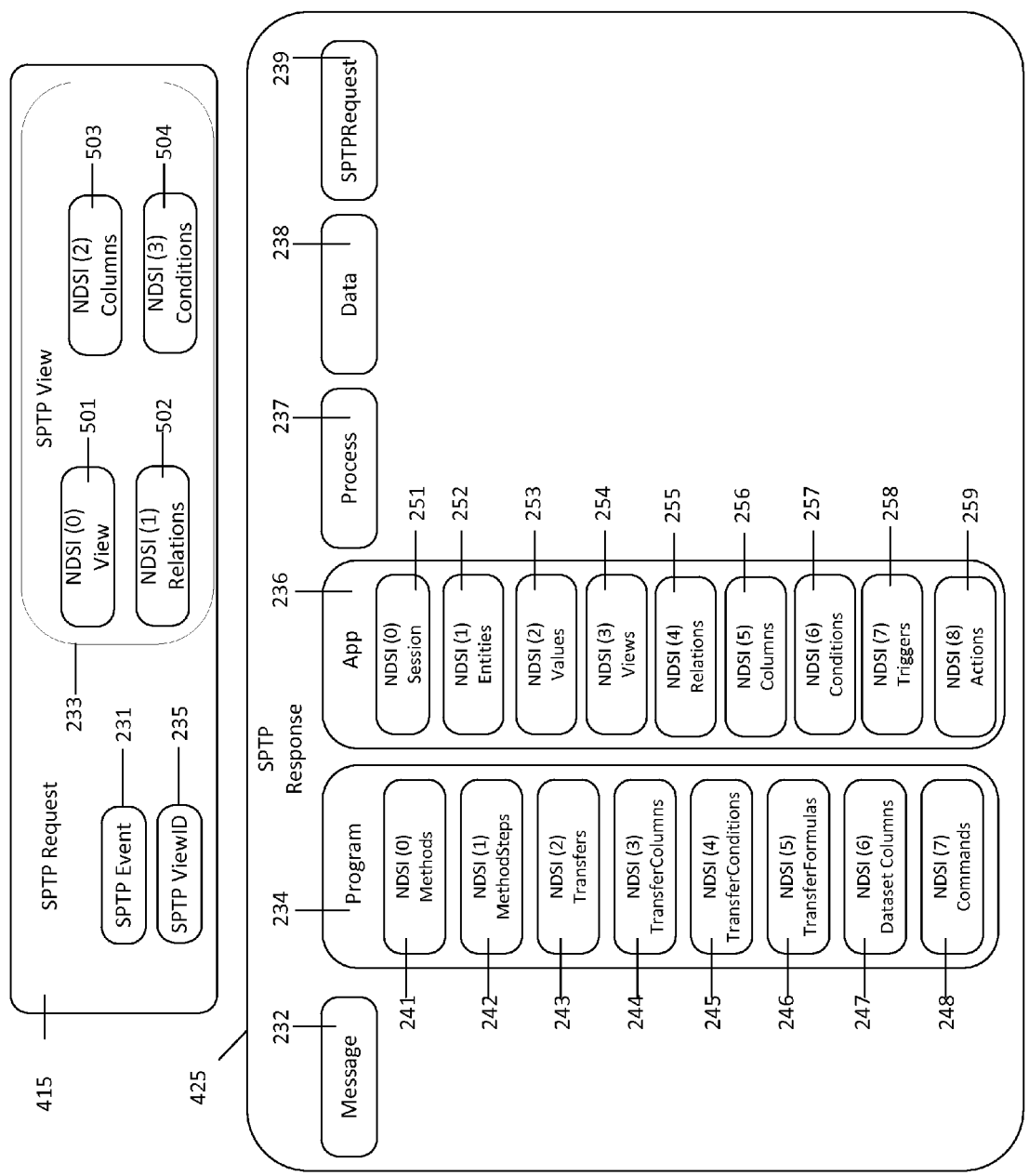
FIG. 2 illustrates examples of the nested view datasets of a structured program transfer protocol, according to an embodiment.

FIG. 2 illustrates the architecture of a structured program transfer protocol, according to an embodiment.

In an embodiment, the structured program transfer protocol is a type of communication protocol that defines the dataset schema ("SPTP Request") for sending one or more types of request, and the dataset schema ("SPTP Response") for receiving one or more types of response from one machine to another, and/or from one resource to another on a machine.

In an embodiment, each of the one or more rows in the SPTP Request comprises a request type, an identification of an agent, a statement, and an identification of a resource to execute the statement. In this embodiment, a request type in a row can comprise a statement type, i.e., specifying the type of statement included in that row. In this embodiment, an identification of an agent can comprise an agent connection type and agent connection string. In this embodiment, an identification of a resource can comprise a resource connection type and resource connection string.

In an embodiment, while processing a single defined request type within a SPTP Request may only perform a portion of creating, reading, updating, and deleting object datasets within a structured data store (e.g., reading), the combined processing all of the defined request types, within the dataset schema of SPTP Request, perform all aspects of creating, reading, updating, and deleting object datasets within a structured data store.

In an embodiment, each of the one or more rows in the SPTP Response comprises a response type and a response.

In an embodiment, the structured program transfer protocol defines the dataset schema ("SPTP Events") for creating and sending object events as a type of statement within an SPTP Request, creating and/or processing object events using an object event processor, and storing object events within a structured data store.

In an embodiment, the structured program transfer protocol defines the string schema ("SPTP View ID") for sending the identification of an object view as a type of statement within an SPTP Request, and processing identifications of object views using an object view generator.

In an embodiment, the structured program transfer protocol defines the dataset schema ("SPTP View Definition") for sending the definition of an object view as a type of statement within an SPTP Request, and creating and/or processing definitions of object views using an object view generator.

FIG. 1 illustrates the relationships between agents on a plurality of machines with at least some of the machines containing an object event processor, object view generator, and structured data store, according to an embodiment. It should be understood that not all of these machines may comprise all of these components, depending on the particular implementation and/or scenario.

The object event processor (e.g., OEP 281) is a type of resource that processes instances of SPTP Events. The object event processor can reside on multiple machines (e.g., OEP 281 on machine 200 and OEP 381 on machine 300) and be a resource available to an agent specific to each machine (e.g., agent 210 on machine 200 and agent 310 on machine 300).

The object view generator (e.g., OVG 282) is a type of resource that generates view datasets and object views from instances of an SPTP View ID or SPTP View Definition. The object view generator can reside on multiple machines (e.g., OVG 282 on machine 200 and OVG 382 on machine 300) and be a resource available to an agent specific to each machine (e.g., agent 210 on machine 200 and agent 310 on machine 300). The object view generator may also be a resource available to an object event processor specific to each machine (e.g., OEP 281 on machine 200 and OEP 381 on machine 300).

In an embodiment, the structured data store (e.g., SDS 290) is a type of data store that maintains objects within a data structure that is compatible with an object event processor and object view generator. The structured data store can reside on multiple machines (e.g., SDS 291 on machine 200 and SDS 391 on machine 300) and interact with an agent specific to each machine (e.g., agent 210 on machine 200 and agent 310 on machine 300). The structured data store can also interact with an object event processor specific to each machine (e.g., OEP 281 on machine 200 and OEP 381 on machine 300), and an object event processor specific to each machine (e.g., agent 210 on machine 200 and agent 310 on machine 300).

In an embodiment, a row in the SPTP Request may identify the resource needed to execute a statement within the row. If the resource identified in the SPTP Request is on a remote machine (e.g., machine 100), then the SPTP Request also identifies the remote agent (e.g., agent 110) on the remote machine that can communicate with the resource (e.g., resource 180) on the remote machine. For example, if agent 210 on machine 200 is processing an SPTP Request that has a row identifying a needed resource 180 on machine 100, agent 210 may forward the SPTP Request or a new SPTP Request (e.g., SPTP Request dataset 410) to the remote agent (e.g., agent 110).

If a row in the SPTP Request specifies a request to execute a statement included in the SPTP Request, then the processing agent (e.g., agent 210) sends the statement to the identified resource (e.g., directly or via forwarding to a remote agent). For example, if agent 210 processes a request to execute a statement pertaining to identified resource 280, agent 210 may send the statement (e.g., statement 270) to resource 280 directly. On the other hand, if agent 210 processes a request to execute a statement pertaining to remote resource 180, agent 210 may forward the request to agent 110 for execution (e.g., via statement 170 sent from agent 110 to resource 180). In either case, the executing resource may return a response (e.g., response 260 or response 160) to the invoking agent. The invoking agent generates a SPTP Response that includes a row that contains the response from the executing resource.

In an embodiment, agent 210 processes rows in the SPTP Request according to the request type specified in the row. In such an embodiment, agent 210 may process one or more of the following request types in one or more of the following manners:

(1) If a row in the SPTP Request specifies a request type to send instructions for creating a structured data store, then agent 210 or the identified remote agent (e.g., agent 310) invokes the identified resource 280 or remote resource (e.g., 380), respectively, to generate the instructions for creating a structured data store. The invoking agent generates a SPTP Response that includes a row that contains a SPTP Request. The SPTP Request, included in the SPTP Response, includes a row that contains the instructions within a statement. The row in the SPTP Request within the SPTP Response is returned to a resource (e.g., resource 280 via agent 210) that processes the row to execute the statement to generate a structured data store. The generated structured data store may include an object event processor and an object view generator.

(2) If a row in the SPTP Request specifies a request type to process one or more rows in an SPTP Events included in the statement of the row, then agent 210 or the identified remote agent (e.g., agent 310) invokes an object event processor (e.g., 281) or remote object event processor (e.g., 381), respectively, to create, update, or delete one or more object datasets within a structured data store (e.g., 290) or remote structured data store (e.g., 390), respectively.

(3) If a row in the SPTP Request specifies a request type to generate a view dataset based on an SPTP View ID included in the statement of the row, then agent 210 or the identified remote agent (e.g., agent 310) invokes an object view generator (e.g., 282) or remote object view generator (e.g., 382) respectively, to generate a view dataset.

(4) If a row in the SPTP Request specifies a request type to send a program and/or one or more program-compatible application datasets, then agent 210 or the identified remote agent (e.g., agent 310) invokes the identified resource 280 or remote resource (e.g., resource 380), respectively, to generate the program and/or one or more program-compatible application datasets. The invoking agent generates an SPTP Response that includes a row that contains the program and/or one or more program-compatible application datasets (e.g., program dataset 234 or application dataset 236, respectively). The row in the SPTP Response may be returned to a command processor, as a resource, for processing.

(5) If a row in the SPTP Request specifies a request type to generate an object view based on an SPTP View ID included in the statement of the row, then agent 210 or the identified remote agent (e.g., agent 310) invokes an object view generator (e.g., 282) or remote object view generator (e.g., 382), respectively, to generate a row within SPTP Request 262 for processing by the invoking agent. The generated row includes an identification of a resource and a statement that comprises an object view which was generated by the object view generator from one or more related view datasets which were generated by the object view generator based on the object view identifier.

In an embodiment, an object view generated by an object view generator includes a resource-compatible script in various scripting languages (e.g., HTML, SQL, XML, PCL). When executed by a resource on a machine, the script can render a display or user interface, retrieve or manipulate data, print a document, invoke an application program interface, control a mechanism of a machine, transmit a message to a web service, change the state of a machine or resource, etc.

(6) If a row in the SPTP Request specifies a request type to send the processing state of a program and one or more program-compatible applications, then the identified remote agent (e.g., agent 110) invokes a command processor as the identified remote resource (e.g., 180) to generate a row in an SPTP Response that includes a statement that comprises a program dataset and one or more program-compatible application datasets residing on the machine of the identified remote agent. The SPTP Response may then be returned to a command processor, as the invoking resource (e.g., 280) of the agent (e.g. 210), for processing.

3. Example Embodiments of a Structured Program Transfer Protocol

3.1. Example SPTP Request

The following description illustrates a non-limiting embodiment of a structured program transfer protocol request. The structured program transfer protocol request may comprise a multi-row SPTP Request dataset, which may be sent from an agent (e.g., agent 210) to a remote agent (e.g., agent 110 or agent 310). The SPTP Request dataset includes structured dataset elements that any agent or remote agent can interpret and process. In this embodiment, the dataset comprises the columns illustrated in Table 1:

TABLE 1

| CI | Description | Type | Default Value |
|---|---|---|---|
| 0 | Request Type | Number | 0 |
| 1 | Agent Connect Type | Number | 0 |
| 2 | Agent Connection | Text | |
| 3 | Resource Connect Type | Number | 0 |
| 4 | Resource Connection | Text | |
| 5 | Statement Type | Number | 0 |
| 6 | Statement | Text | |
| 7 | Requestor Type | Number | 0 |
| 8 | Requestor Identifier | Text | |

Illustrative defined values for specific SPTP Request dataset columns are illustrated in Table 2:

TABLE 2

| CI | Value | Description |
|---|---|---|
| 0 | 0 | Load Program and Application |
| 0 | 1 | Send Program |
| 0 | 2 | Send Process (Loaded Program and Applications) |
| 0 | 3 | Execute Statement |
| 0 | 4 | Send SDS Creation Instructions |
| 0 | 6 | Send Application |
| 1 | 0 | Local |
| 1 | 1 | Requesting Agent |
| 1, 3 | 2 | Hypertext Transfer Protocol Secure (HTTPS) |
| 1, 3 | 3 | Data Store Resource |
| 1, 3 | 4 | Layout Engine |
| 1, 3 | 5 | Print Engine |
| 1, 3 | 6 | Web Socket |
| 1, 3 | 7 | Transmission Control Protocol (TCP) |
| 1, 3 | 8 | OLE for Retail POS (OPOS)/UnifiedPOS (UPOS) |
| 1, 3 | 11 | File Transfer Protocol (FTP) |
| 1, 3 | 12 | Secure Sockets Layer (SSL) |
| 1, 3 | 13 | Simple Mail Transfer Protocol (SMTP) |

TABLE 2-continued

| CI | Value | Description |
|---|---|---|
| 1, 3 | 14 | Multipurpose Internet Mail Extensions (MIME) |
| 1, 3 | 15 | Internet Message Access Protocol (IMAP) |
| 1, 3 | 16 | Post Office Protocol (POP) |
| 1, 3 | 17 | Bluetooth |
| 1, 3 | 18 | NFC |
| 1, 3 | 19 | File System |
| When Resource Connect Type (CI [3]) = 3 (Data Store Resource) | | |
| 5 | 0 | Resource-compatible Script |
| 5 | 1 | SPTP Events |
| 5 | 2 | SPTP View ID |
| 5 | 3 | SPTP View |
| When Resource Connect Type (CI [3]) = 4 (Layout Engine) | | |
| 5 | 0 | Hypertext Markup Language (HTML) |
| When Resource Connect Type (CI [3]) = 5 (Print Engine) | | |
| 5 | 0 | Zebra Print Language (ZPL) |
| 5 | 1 | Printer Command Language (PCL) |
| When Resource Connect Type (CI [3]) = 1, 2, 6 or 7 | | |
| 5 | 0 | Structured Program Transport Protocol (SPTP) |
| 5 | 1 | Extensible Markup Language (XML) |
| 5 | 2 | VoiceXML (VXML) |
| 7 | 1 | Domain Address |
| 7 | 2 | Connection |
| 7 | 3 | Device Address |
| 7 | 4 | Session |

In an embodiment, the value of the Statement element in a row within the SPTP Request will contain an SPTP Events dataset when the Resource Connect Type element value (i.e., CI [3]) in the row is 3 (i.e., Data Store Resource) and the Statement Type element value in the row is 1 (i.e., SPTP Events).

In an embodiment, the value of the Statement element in a row within the SPTP Request will contain a SPTP View ID when the Resource Connect Type element value (i.e., CI [3]) in the row is 3 (i.e., Data Store Resource) and the Statement Type element value in the row is 2 (i.e., SPTP View ID).

In an embodiment, the value of the Statement element in a row within the SPTP Request will include a SPTP View when the Resource Connect Type element value (i.e., CI [3]) in the row is 3 (i.e., Data Store Resource) and the Statement Type element value in the row is 3 (i.e., SPTP View).

3.2. Example SPTP Response

The following description illustrates a non-limiting embodiment of a structured program transfer protocol response. The structured program transfer protocol response may comprise a multi-row SPTP Response dataset 425, which may be returned to an agent (e.g., agent 210) from a remote agent (e.g., agent 110 or agent 310) in response to a SPTP Request 415. In an embodiment, this dataset contains two columns as shown in Table 3:

TABLE 3

| CI | Description | Type | Default Value |
|---|---|---|---|
| 0 | Response Type | Number | 0 |
| 1 | Response | Text | |

The Response dataset element may contain a specific nested dataset. Illustrative defined values for the Response Type dataset element are illustrated in Table 4:

TABLE 4

| CI | Value | Description |
|---|---|---|
| 0 | 0 | Message dataset |
| 0 | 1 | Program dataset |
| 0 | 2 | Application dataset |
| 0 | 3 | Data dataset |
| 0 | 4 | Process dataset |
| 0 | 5 | SPTP Request dataset |

In an embodiment, the value of the Response element (i.e., CI [1]) in a row in the SPTP Response will contain a Program dataset 234 when the Response Type element value (i.e., CI [0]) in the row is 1 (i.e., Program dataset).

In an embodiment, the Program dataset 234 is a single-row dataset with the defined columns illustrated in Table 5. Each dataset element in the Program dataset 234 may contain a specific nested dataset as shown below:

TABLE 5

| NDSI | Nested Dataset |
|---|---|
| 0 | Methods (241) |
| 1 | MethodSteps (242) |
| 2 | Transfers (243) |
| 3 | TransferColumns (244) |
| 4 | TransferConditions (245) |
| 5 | TransferFormulas (246) |
| 6 | DatasetColumns (257) |
| 7 | Commands (248) |

In an embodiment, the value of the Response element (i.e., CI [1]) in a row in the SPTP Response 425 will contain an Application dataset 236 when the Response Type element value (i.e., CI [0]) in the row is 2 (i.e., Application dataset).

In an embodiment, an Application dataset 236 is a single-row dataset with the defined columns illustrated in Table 6. Each dataset element in the Application dataset 236 may contain a specific nested dataset as shown below:

TABLE 6

| NDSI | Nested Dataset |
|---|---|
| 0 | Session (251) |
| 1 | Entities (252) |
| 2 | Values (253) |
| 3 | Views (254) |
| 4 | Relations (255) |
| 5 | Columns (256) |
| 6 | Conditions (257) |
| 7 | Triggers (258) |
| 8 | Actions (259) |

The columns of the nested datasets within the Program dataset 234 and Application dataset 236 are described in more detail elsewhere herein.

In an embodiment, the nested datasets within the Program dataset 234 and the nested datasets within the Application dataset 236 may be generated from a response from an object view processor (e.g., OVG 282 or OVG 382).

In an embodiment, the value of the Response element (i.e., CI [1]) in a row in the SPTP Response 425 will contain a Data dataset 238 when the Response Type element value (i.e., CI [0]) in the row is 3 (i.e., "Data dataset").

In an embodiment, the Data dataset 238 is a view dataset that may be generated from a response from an object view processor (e.g., OVG 282 or OVG 382).

In an embodiment, the value of the Response element (i.e., CI [1]) in a row in the SPTP Response 425 will contain a Process dataset 237 when the Response Type element value (i.e., CI [0]) in the row is 4 (i.e., Process dataset).

In an embodiment, the Process dataset 237 may contain one or more nested datasets that represent the current processing state of a Program dataset 234 and one or more program-compatible Application datasets 236.

In an embodiment, the value of the Response element (i.e., CI [1]) in a row in the SPTP Response 425 will contain a SPTP Request dataset 239 when the Response Type element value (i.e., CI [0]) in the row is 5 (i.e., SPTP Request dataset).

3.3. Example SPTP Events

The following description illustrates a non-limiting embodiment of structured program transfer protocol events. The structured program transfer protocol events may comprise a multi-row SPTP Events dataset 231, which may be sent from an agent (e.g., agent 210) to a remote agent (e.g., agent 110 or agent 310) or stored in a structured data store (e.g., SDS 290). The SPTP Events dataset 231 includes structured dataset elements that an object event processor interfaced with or comprised in any agent or remote agent (e.g., OVG 282 interfaced with or comprised in agent 210, or OVG 382 interfaced with or comprised in agent 310) can interpret and process. In an embodiment, the SPTP Events dataset 231 comprises the columns illustrated in Table 7:

TABLE 7

| CI | Name | Type |
|---|---|---|
| 0 | UTC | UTC Date/Time |
| 1 | Type | Number |
| 2 | Dataset | Text |
| 3 | Owner Domain | GUID |
| 4 | Object Entity | GUID |
| 5 | Object | GUID |
| 6 | Element | Text |
| 7 | Attribute | GUID |
| 8 | Value | Text |
| 9 | Member Domain | GUID |

Illustrative defined values for specific SPTP Events dataset columns are illustrated in Table 8:

TABLE 8

| CI | Value | Description |
|---|---|---|
| 0 | 0 | Update |
| 0 | 1 | Create |
| 0 | 2 | Delete |
| 0 | 3 | Undelete |
| 0 | 4 | Purge |
| 0 | 5 | Create Duplicate |
| 0 | 6 | Create Template |
| 0 | 7 | Create Group |

3.4. Example SPTP View ID

The following description illustrates a non-limiting embodiment of a structured program transfer protocol view identifier. The structured program transfer protocol view identifier may comprise a SPTP View ID string 235, which may be sent from an agent (e.g., agent 210) to a remote agent (e.g., agent 110 or agent 310) included in a statement within a row of an SPTP Request. In an embodiment, the SPTP View ID string 235 includes delimited values that an object view generator (e.g., OVG 282 or OVG 382) interfaced with or comprised in any agent or remote agent can interpret and process. The string may comprise the delimited values illustrated in Table 9:

TABLE 9

| Name | Type |
|---|---|
| View | GUID |
| Object Entity | GUID |
| Object | GUID |

3.5. Example SPTP View Definition

The following description illustrates a non-limiting embodiment of a structured program transfer protocol view definition. The structured program transfer protocol view definition may comprise a single-row SPTP View Definition dataset 233, which may be sent from an agent (e.g., agent 210) to a remote agent (e.g., agent 110 or agent 310) included in a statement within a row of an SPTP Request. The SPTP View Definition dataset 233 includes structured dataset elements that an object view generator (e.g., OVG 282 or OVG 382) interfaced with or comprised in any agent or remote agent can interpret and process.

In an embodiment, the SPTP View Definition dataset 233 is a single-row dataset with the defined columns illustrated in Table 10. Each dataset element may contain a specific nested dataset as shown below:

TABLE 10

| NDSI | Nested Dataset |
|---|---|
| 0 | View |
| 1 | Relations |
| 2 | Columns |
| 3 | Conditions |

4. Example Embodiment of an Agent

Figure 3:
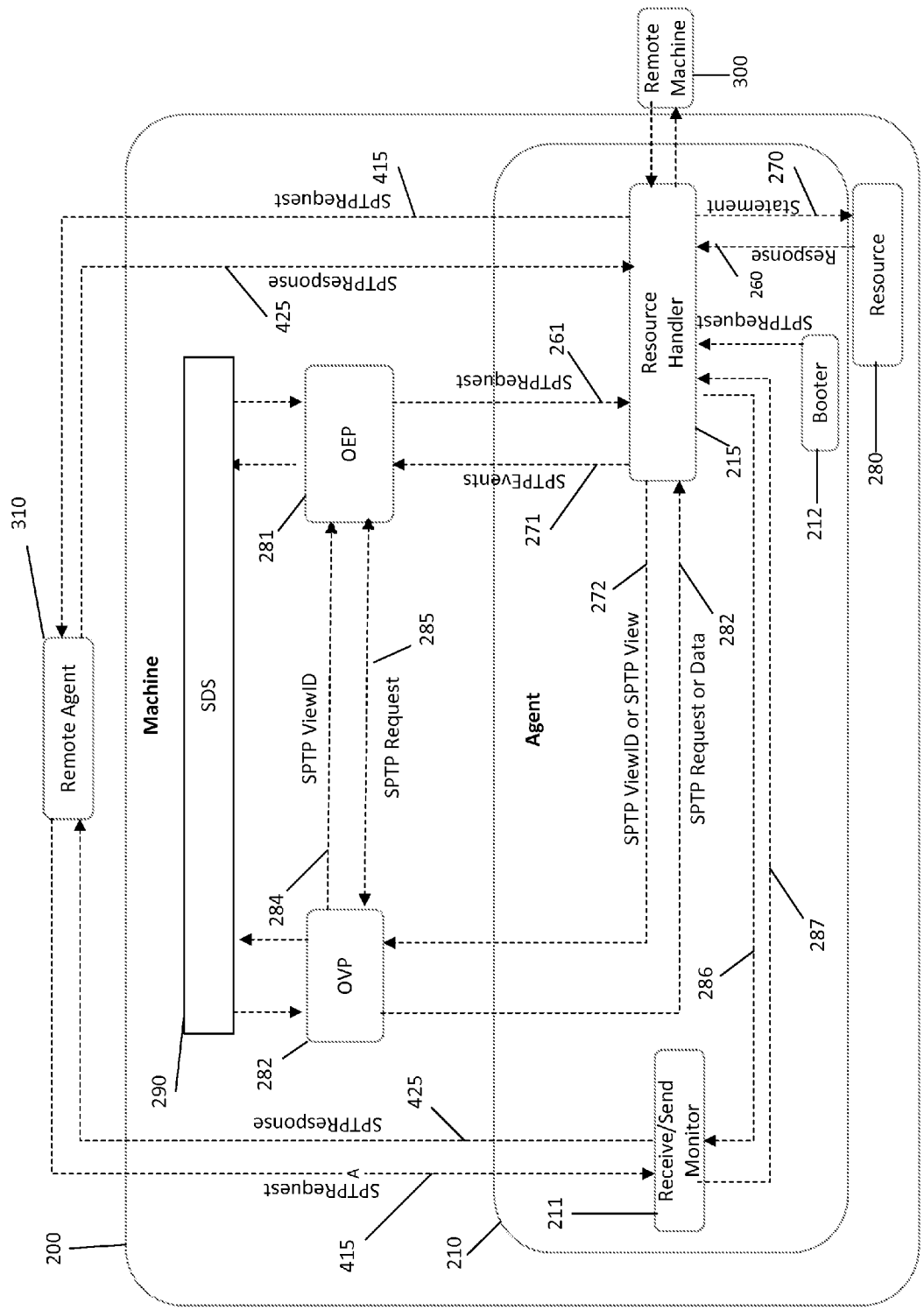
FIG. 3 illustrates a machine utilizing an agent with an object event processor, object view generator, and structured data store, according to an embodiment.

The following description illustrates a non-limiting embodiment of an agent (e.g., agent 110, 210, and/or 310). FIG. 3 illustrates the relationships between an agent 210, a resource 280, an object event processor 281, as a type of resource, an object view generator 282, as a type of resource, a structured data store 290, and a remote agent 310 and a remote machine 300, according to an embodiment. As shown, agent 210 on machine 200 may comprise receive/send monitor 211, booter 212, and resource handler 215.

In an embodiment, receive/send monitor 211 monitors incoming requests from remote agents (e.g., remote agent 310). When a SPTP Request is received (e.g., SPTP Request dataset 415), receive/send monitor 211 may invoke resource handler 215 to process one or more rows in the SPTP Request and generate one or more rows in a SPTP Response. Receive/send monitor 211 returns the SPTP Response (e.g., SPTP Response dataset 425) to the requesting remote agent.

In an embodiment, booter 212 is invoked when agent 210 is initiated on machine 200. Booter 212 generates one or more rows in a SPTP Request and invokes resource handler 215 to process the rows.

In an embodiment, a resource (e.g., resource 280) of machine 200 may generate one or more rows in an SPTP Request (e.g., SPTP Request dataset 270) and invokes resource handler 215 to process the rows and generate one or more rows in a SPTP Response (e.g., SPTP Response dataset 260) that is returned to the resource.

In an embodiment, a resource (e.g., resource 280) of machine 200 is a command processor that can process a Program dataset 234, Application dataset 236, Process dataset 237, and/or Data dataset 238, returned in an SPTP Response.

In an embodiment, for each row in a SPTP Request (e.g., SPTP Request dataset 415), resource handler 215 may invoke a resource (e.g., resource 280, OEP 281, and/or OVG 282) of machine 200 that is identified within the row to execute a statement that is contained within the row, which may generate a response. Resource handler 215 creates a SPTP Response that contains one or more rows that each contains a resource response.

In an embodiment, for one or more rows in a SPTP Response (e.g., SPTP Response dataset 425) that contain an SPTP Request (e.g., SPTP Request dataset 239), agent 210 may invoke resource handler 215 to process the one or more rows in the SPTP Request.

In an embodiment, agent 210 returns one or more rows in a SPTP Response (e.g., SPTP Response dataset 425) to a resource that generated the SPTP Request (e.g., SPTP Request dataset 415).

In an embodiment, an agent 210, resource handler 215, or resource 280 may generate a row in a SPTP Response (e.g., SPTP Response dataset 425) that comprises a Program dataset 234, Application dataset 236, Data dataset 238, Process dataset 237, and/or SPTP Request dataset 239.

In an embodiment, a resource 280 can be invoked by resource handler 215 to create, retrieve, update, or delete objects in a structured data store 290, send an SPTP Request to a remote agent for processing, send a statement to a remote machine for processing, retrieve or process an object view script to render a display or user interface, retrieve or manipulate data, print a document, invoke an application program interface, control a mechanism of a machine, transmit a message to a web service, change the state of a machine or resource, etc.

In an embodiment, resource handler 215 can generate one or more rows in an SPTP Events dataset 231 that comprise a response from a remote machine (e.g., machine 300).

5. Example Embodiment of a Structured Data Store

The following description illustrates a non-limiting embodiment of a structured data store (SDS). The SDS includes structured datasets and objects within datasets that any object event processor (OEP) and object view generator (OVG) can interpret and process.

Figure 4:
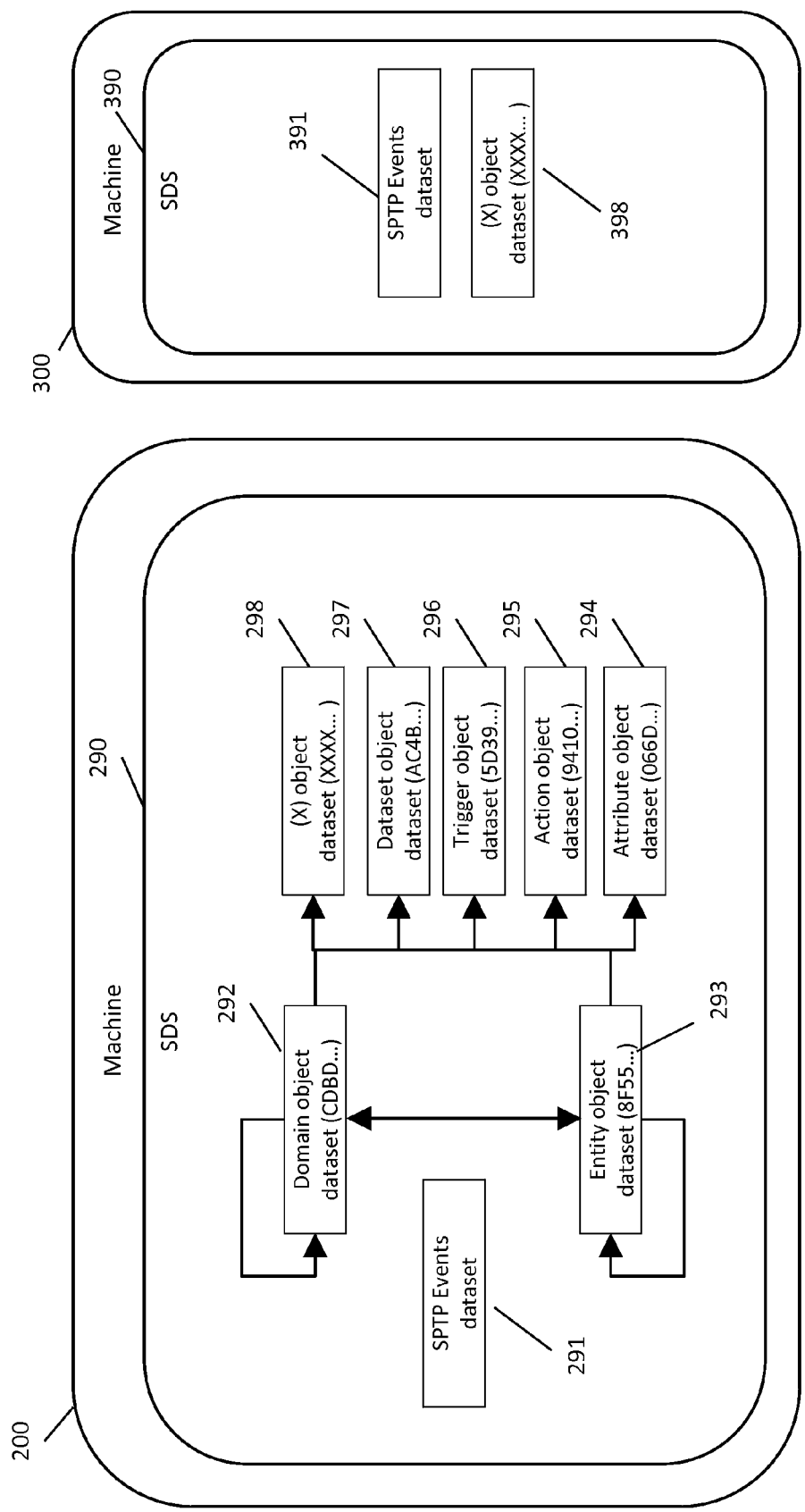
FIG. 4 illustrates different embodiments of foundational datasets within a structured data store on a plurality of machines.

In an embodiment, the SDS contains initial datasets, as illustrated in FIG. 4. One or more of these initial datasets may be created by the same resource that created the SDS (e.g., during or after creation of the SDS).

In an embodiment, SDS 290 and SDS 390 initially contain SPTP Events dataset 291 and 391, respectively. In an embodiment, SDS 290 also initially contains certain object datasets including Domain object dataset 292, Entity object dataset 293, Attribute object dataset 294, Action object dataset 295, Trigger object dataset 296, and Dataset object dataset 297. It should be understood that SDS 290 may also initially contain one or more other object datasets (e.g., represented by object dataset 298).

In an embodiment, each row within an object dataset (e.g., Domain object dataset 292, Entity object dataset 293, Attribute object dataset 294, Action object dataset 295, Trigger object dataset 296, Dataset object dataset 297, and/or additional object dataset(s) 298) represents an object, and each column within an object dataset represents an attribute, such that each element in a row within an object dataset represents an attribute value of the object represented by that row.

In an embodiment, the processing of an SPTP Events dataset 291 by an OEP (e.g., OEP 281) may create one or more of these object datasets (e.g., Domain object dataset 292, Entity object dataset 293, Attribute object dataset 294, Action object dataset 295, Trigger object dataset 296, Dataset object dataset 297, and/or additional object dataset(s) 298).

Figure 6:
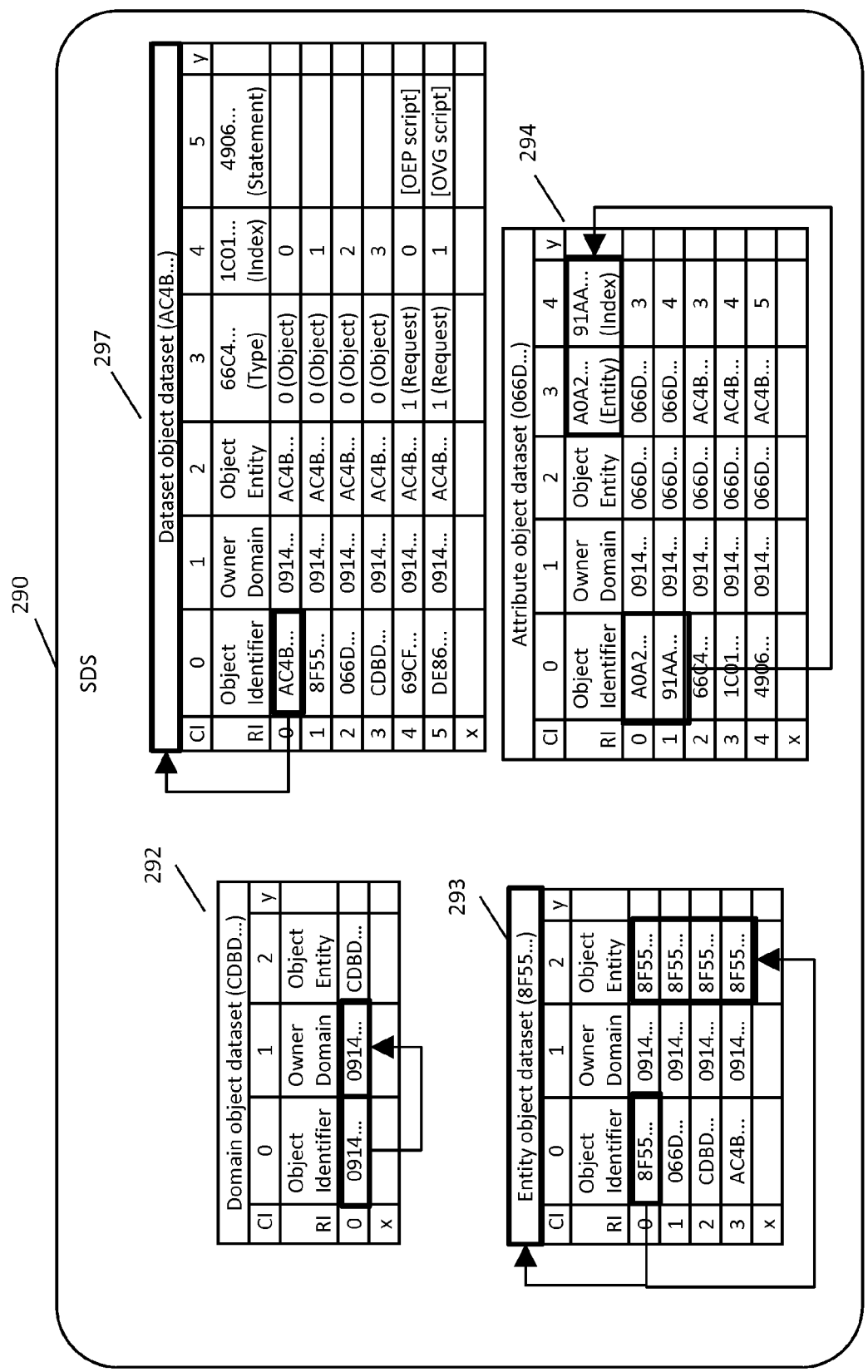

In an embodiment, one or more object datasets (e.g., any of object datasets 292-298) within an SDS (e.g. SDS 290) initially comprises an "Object Identifier" column, an "Owner Domain" column, and an "Object Entity" column, as illustrated in Table 11 and FIG. 6. In this embodiment, each element in a column of a row of an object dataset represents an attribute of the object represented by that row.

TABLE 11

| CI | Name | Type |
|---|---|---|
| 0 | Object Identifier | GUID |
| 1 | Owner Domain | GUID |
| 2 | Object Entity | GUID |

In an embodiment, the "Object Identifier" column may contain any type of unique identifier, including, without limitation, a sequence of any number of digits or alphanumerical characters, hexadecimal numbers, and the like. An "Object Identifier" element within a row in an object dataset identifies the object represented by that row. Thus, the element in an "Object Identifier" column of any of the object datasets may be referred to herein as an "object identifier."

In an embodiment, an object dataset (e.g., any of object datasets 292-298) within an SDS (e.g. SDS 290) can comprise additional initial columns as illustrated, for example, in Table 12. In this embodiment, each element in a column of a row of an object dataset represents an attribute of the object represented by, identified in, or otherwise associated with that row.

TABLE 12

| Name | Type |
|---|---|
| Local ID | Incremental Number |
| Type | Number |
| Deleted | Number |
| Create Date | Date/Time |
| Update Date | Date/Time |
| Delete Date | Date/Time |

In an embodiment, an object dataset (e.g., any of object datasets 292-298) within SDS 290 can be identified by the "Object Identifier" element within Dataset object dataset 297 for the row representing the object dataset as an object. Dataset object dataset 297 itself can be identified by the "Object Identifier" element at index location [0] [0] within Dataset object dataset 297 which is illustrated in FIG. 6 as "AC4B . . . ".

In an embodiment, each of the rows of Attribute object dataset 294 represent a particular attribute, as an object, that can be associated with other objects (e.g., objects within Entity object dataset 293). As discussed above and illustrated in FIG. 6, CI [0] for Attribute object dataset 294 comprises an identifier, such that each row represents a uniquely-identified attribute. Thus, for example, a column representing an attribute within an object dataset (e.g., any of object datasets 292-298, including Attribute object dataset 294) within SDS 290 can be identified by the "Object Identifier" element corresponding to the row in the Attribute object dataset 294 that represents that attribute. A column index (e.g., CI [3] in Attribute object dataset 294) representing an attribute within Attribute object dataset 294 itself can be identified by the "Object Identifier" element at CI 0 within Attribute object dataset 294. For example, as illustrated in FIG. 6, CI [3] is identified by the unique identifier for the attribute represented by RI [0] (i.e., the unique identifier at index location [0][0]), i.e., "A0A2 . . . ". In addition, CI [4] is identified by the unique identifier for the attribute represented by RI 1 (i.e., the unique identifier at index [1][0]), i.e., "91AA . . . ", and so on.

In an embodiment, the "Owner Domain" column can identify a domain. A single object dataset can include objects from one domain or multiple domains. Each domain may be represented as a row within Domain object dataset 292.

In an embodiment, an "Owner Domain" element within an object dataset (e.g., any of object datasets 292-298) within SDS 290 can be set to the value of an object identifier uniquely identifying a domain within Domain object dataset 292 (e.g., the element in the "Object Identifier" column of the row representing the domain object). The "Owner Domain" element at CI [1] within Domain object dataset 292 itself can be set to the value of the object identifier at CI [0] within Domain object dataset 292. For example, as illustrated in FIG. 6, the element at index location [0] [1], i.e., "E324 . . . ", representing the domain that owns the domain object, represented by RI [0], is the same as the element at index location [0] [0]. Such a scenario indicates that the domain owns its own domain object.

In an embodiment, objects within Domain object dataset 292 may represent persons, organizations, locations, and the like. In this embodiment, a domain object representing an organization and represented as a row in the Domain object dataset 292 can be assigned as the owner domain for a domain object representing a person, location, or other organization, also represented as a row in the Domain object dataset 292. As another example, a domain object representing a person and represented as a row in the Domain object dataset 292 can be assigned as the owner domain for a domain object representing a location or other person, also represented as a row in the Domain object dataset 292. In either case, a first domain object is assigned as the owner domain for a second domain object by identifying the first domain object in the "Owner Domain" column (CI 1) of the second domain object.

In an embodiment, the "Object Entity" column can identify an entity. A single object dataset can include objects from one entity or multiple entities. Each entity may be represented as a row within Entity object dataset 293.

In an embodiment, an "Object Entity" element within an object dataset (e.g., any of object datasets 292-298) within SDS 290 can be set to the value of an object identifier within Entity object dataset 293. The "Object Entity" element at CI [2] within Entity object dataset 293 itself can be set to the value of the object identifier at CI [0] within Entity object dataset 293. For example, as illustrated in FIG. 6, the element at index location [0] [2], i.e., "8F55 . . . ", is the same as the element at index location [0][0].

In an embodiment, processing SPTP Events (e.g., SPTP Events dataset 231) by an OEP on a machine (e.g., OEP 281 on machine 200) can create one or more additional object datasets (e.g., object dataset 298) within an SDS (e.g., SDS 290) on the same machine.

In an embodiment, processing SPTP Events (e.g., SPTP Events dataset 231) by an OEP on a machine (e.g., OEP 281 on machine 200) can create one or more additional rows or columns within an existing object dataset (e.g., Entity object dataset 293) within a SDS (e.g., SDS 290) on the same machine.

In an embodiment, Dataset object dataset 297 can contain rows that represent both object datasets and view datasets as objects. In this embodiment, view datasets include dataset elements from one or more related objects in one or more related object datasets within an SDS (e.g., SDS 290). Object relationships are described in more detail elsewhere herein.

In an embodiment, one or more view datasets (e.g., Views dataset 254) can be included as nested datasets within the program and application datasets (e.g., Program dataset 234 and Application dataset 236).

In an embodiment, scripts maintained within a column (e.g., CI [5]) within Dataset object dataset 297 can generate view datasets. These scripts may be maintained in a scripting language that is compatible with one or more resources interfaced with or comprised in an SDS (e.g., SDS 290).

In an embodiment, the functionality of an OEP or OVG may be embodied within a script that can be executed by a resource interfaced with or comprised in an SDS (e.g., SDS 290). For example, an OEP script and OVP script can be contained within rows within Dataset object dataset 297 (e.g., illustrated in FIG. 6 at location indices [4][5] and [5][5]).

Figure 7:
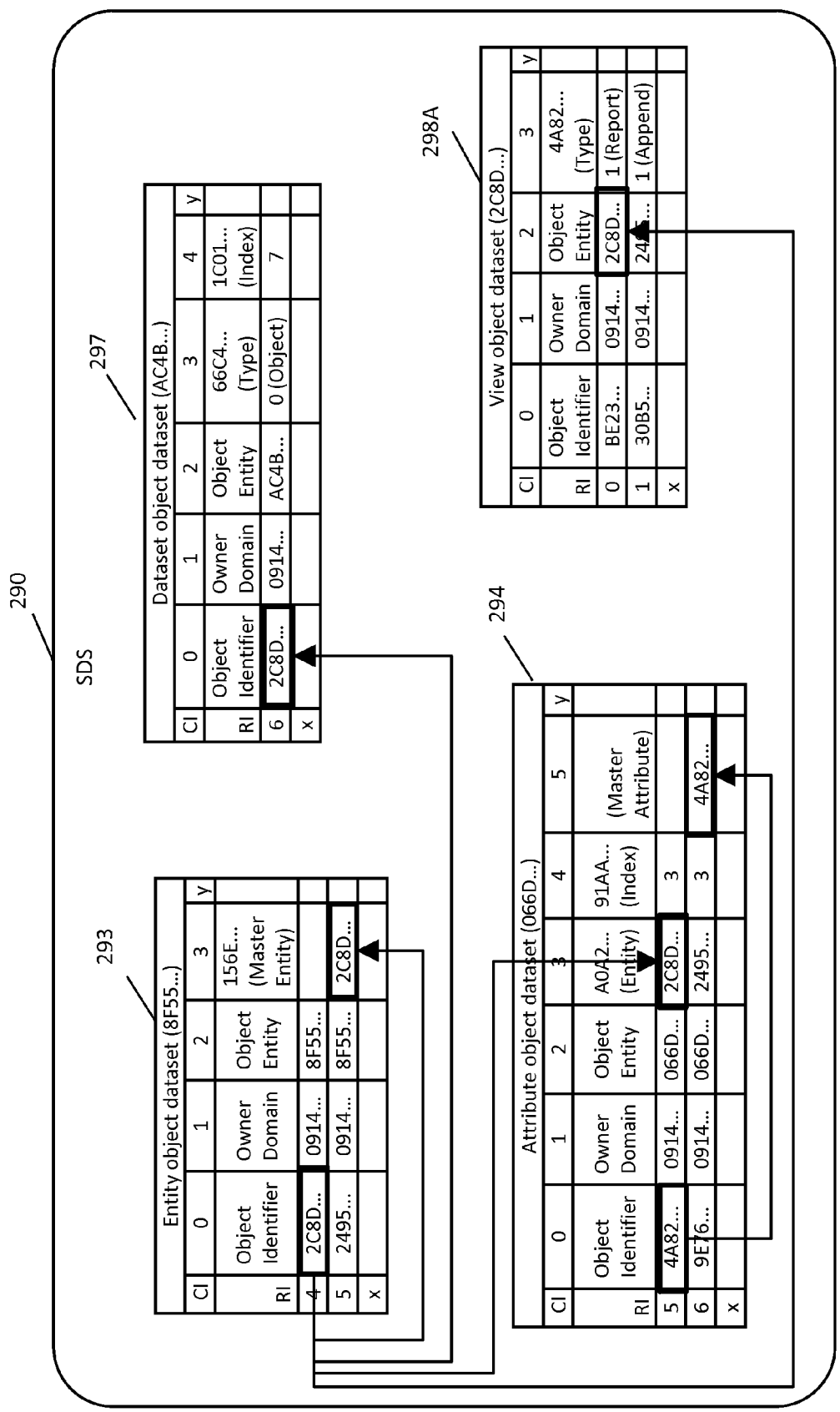
Figure 8:
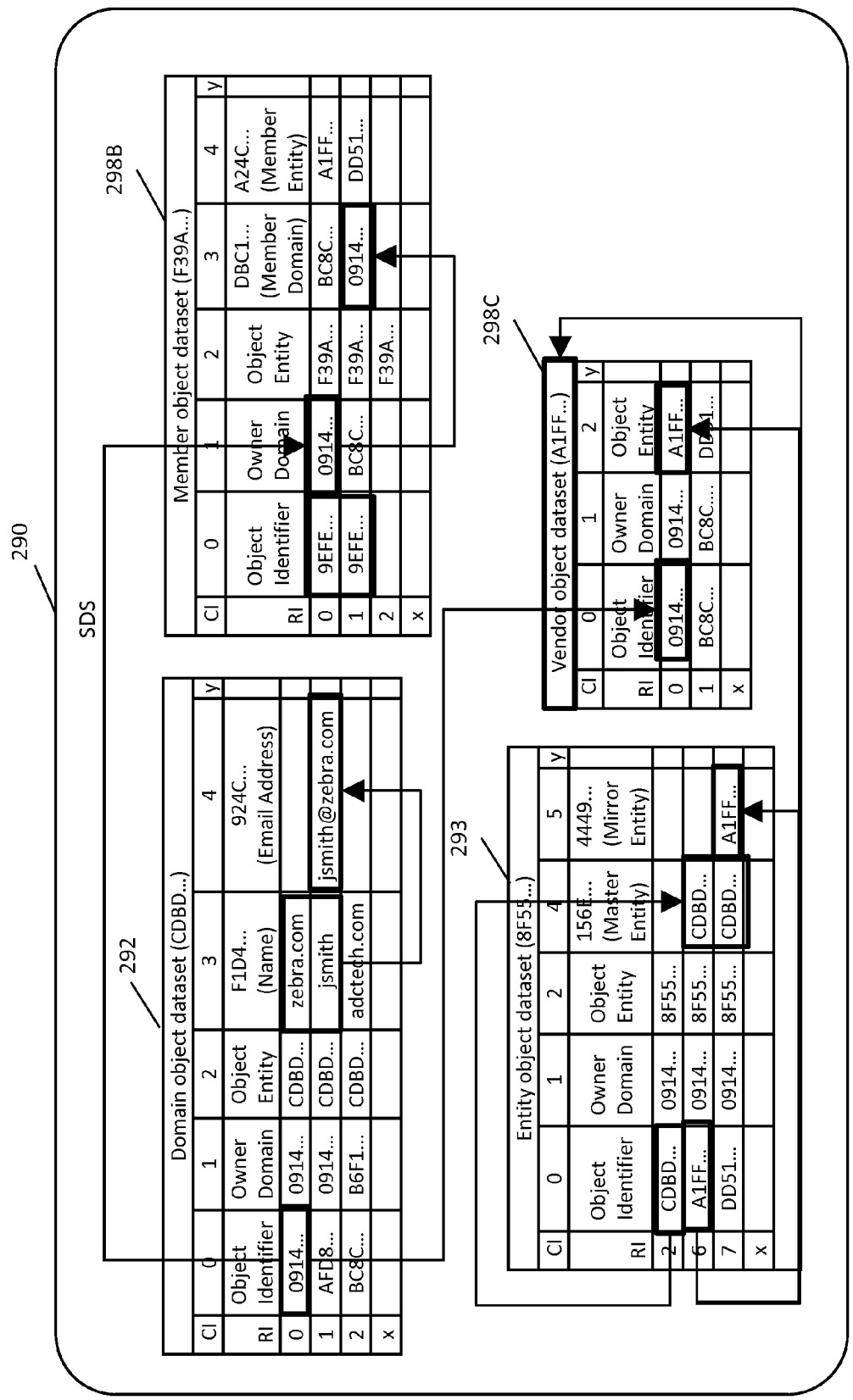
Figure 9:
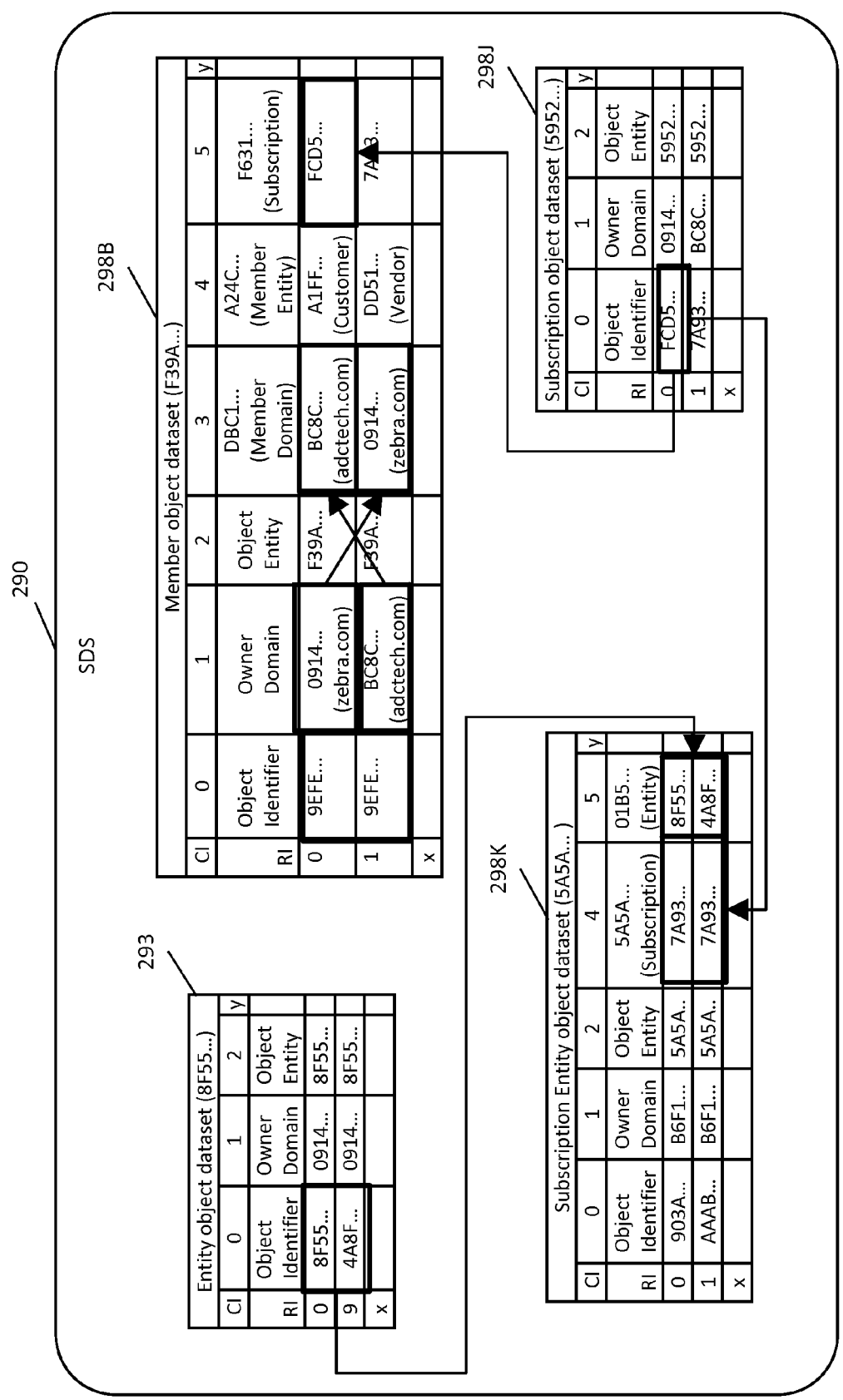
Figure 10:
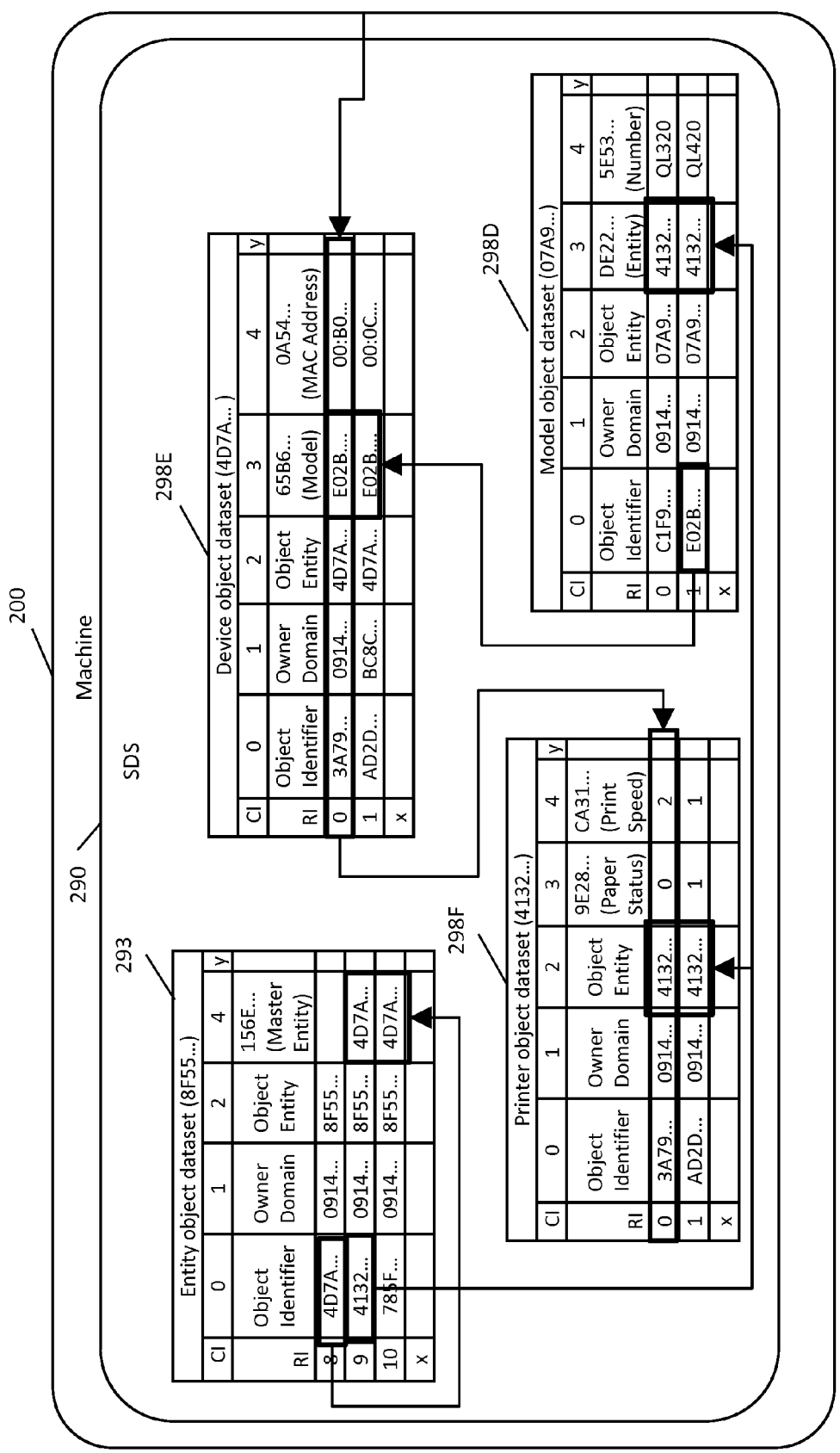

In an embodiment, Entity object dataset 293 can contain rows that represent both master entities and slave entities as objects. An example is illustrated in FIG. 7, according to an embodiment. In this embodiment, one or more slave entities can be assigned to a master entity. A column within Entity object dataset 293 (e.g., CI [3]) can identify the master Entity object assigned to a slave Entity object. In the illustrated example, he "Master Entity" element at index location [5] [3] within Entity object dataset 293 is set to the value of the object identifier at index location [4][0] within Entity object dataset 293, which is illustrated as "2C8D . . . ". Thus, in the example illustrated in FIG. 7, the entity represented by RI [5] and identified as "2495 . . . " is a slave entity to the master entity represented by RI [4] and identified as "2C8D . . . ".

In an embodiment, an object identifier for an object dataset within the Dataset object dataset 297 can be set to an object identifier for a master entity within the Entity object dataset 293. For example, as illustrated in FIG. 7, the object identifier at index location [6][0] in the Dataset object dataset 297 is set to the value of the object identifier (i.e., "2C8D . . . ") for the master entity represented by row [4][0] in the Entity object dataset 293.

In an embodiment, one or more objects, representing attributes, within Attribute object dataset 294 can be assigned to a master or slave Entity object within Entity object dataset 293. In this embodiment, a column within Attribute object dataset 294 (e.g., CI 3) can identify the Entity object assigned to an attribute object. For example, as illustrated in FIG. 7, the element at index location [5] [3] of the Attribute object dataset 294 is set to the value of the object identifier (i.e., "2C8D . . . ") for the master entity represented by row [4][0] in the Entity object dataset 293.

In an embodiment, Attribute object dataset 294 can contain rows that represent both master attributes and slave attributes as objects. In this embodiment, one or more slave attribute objects can be assigned to a slave Entity object and one or more master attribute objects can be assigned to a master Entity object. Also, in this embodiment, a slave attribute object can be assigned to a master attribute object, where the slave Entity object that is assigned to the slave attribute object is assigned to the master Entity object which is assigned to the master attribute object. A column (e.g., CI 5) within Attribute object dataset 294 can identify the master attribute object assigned to a slave attribute object. For example, as illustrated in FIG. 7, the "Master Attribute" element at index location [6] [5] within Attribute object dataset 294 is set to the value of the object identifier (i.e., "4A82 . . . ") at index location [5][0] within Attribute object dataset 294. Thus, the attribute represented by RI [6] in the Attribute object dataset 294 and identified as "9E76 . . . " is a slave attribute to the master attribute represented by RI [5] and identified as "4A82 . . . " in the Attribute object dataset 294.

In an embodiment, an object dataset (e.g. View object dataset 298A) can contain objects associated with a master entity and/or one or more slave entities assigned to the master entity. In this embodiment, the "Object Entity" element (e.g., at CI [2]) within View object dataset 298A is set to the object identifier (e.g., at CI [0]) for a master Entity object within Entity object dataset 298. For example, the "Object Entity" element at index location [0][2] in View object dataset 298A is set to the value of the "Object Identifier" element at index location [4][0] within the Entity object dataset 293, indicating that View object dataset 298A contains the master entity represented by RI [4] in Entity object dataset 293 and identified by "2C8D . . . ". In addition, the "Object Entity" element at index location [1][2] within View object dataset 298A is set to the value of the "Identifier" element at index location [5] [0] within Entity object dataset 298, indicating that View object dataset 298A also contains the slave entity represented by RI [5] in Entity object dataset 293 and identified by "2495 . . . ".

In an embodiment, values for master and slave attributes are maintained within the same object dataset column. This object dataset column can be identified as the object identifier of the master attribute. For example, as illustrated in FIG. 7, the "Type" element at index location [0][3] within View object dataset 298A is representing a value of the master attribute identified in RI [5] within Attribute object dataset 294. In addition, the "Type" element at index location [1][3] within View object dataset 298A is representing a value of the slave attribute identified in RI [6] within Attribute object dataset 294.

Figure 11:
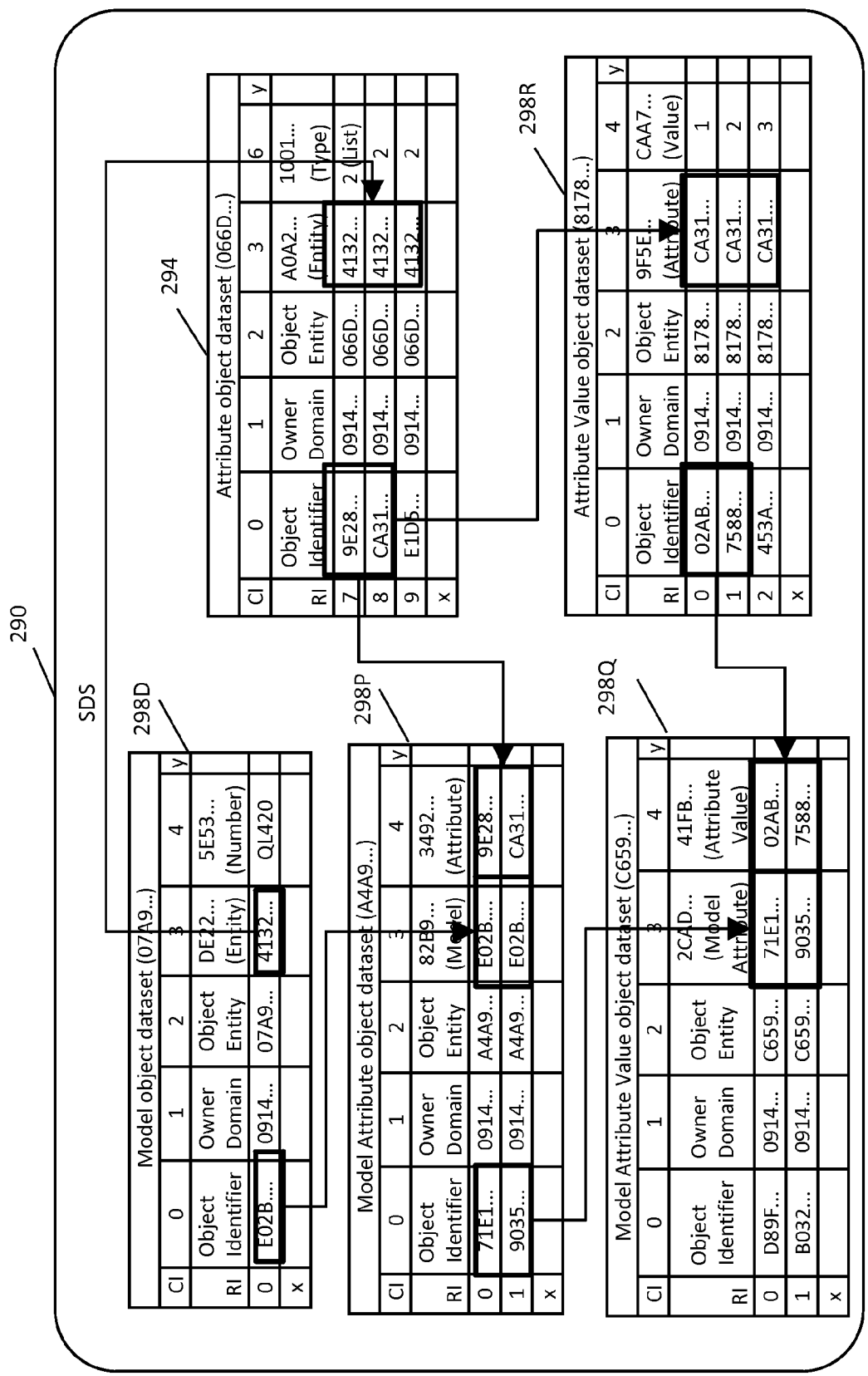

In an embodiment, a Model object assigned to an Entity object can incorporate, as Model Attribute objects, one or more Attribute objects of the Entity object as illustrated in FIG. 11. For example, a "Printer" Entity object can be assigned to a plurality of Model objects with each Model object supporting a subset of the complete attribute set a universal printer definition.

Order Item Serial Number" can be constructed from four Term objects assigned to elements of Entity object at RI 12 in Entity object 293. The human readable identifier comprises the "Name" element of each of the four Term objects (i.e. "Sales", "Order", "Item", and "Serial Number). In this embodiment, the "Type" element of an Attribute object (e.g. RI 15) in Attribute object dataset 294 can be set to a value by processing a row in SPTP Events. From a trigger action, the object event processor creates additional Attribute objects to be assigned to Term objects. For example, when a dataset element representing the Attribute object at RI 15 is included in an object view, the "Sales Order Item Serial Number" human readable identifier constructed from the assigned Term objects will be displayed in the object view.

TABLE 13

| Object GUID | 1642 . . . (Parent Attribute) | 91AA . . . (Sequence) | 1EDE . . . (Name) |
|---|---|---|---|
| 0BE3 . . . |  |  | Mailing Address |
| 7CB9 . . . | 0BE3 . . . (Mailing Address) | 1 | Street |
| A6AE . . . | 0BE3 . . . (Mailing Address) | 2 | Unit |
| EB60 . . . | 0BE3 . . . (Mailing Address) | 3 | City |
| A42B . . . | 0BE3 . . . (Mailing Address) | 4 | State |
| 0032 . . . | 0BE3 . . . (Mailing Address) | 5 | Postal Code |
| E948 . . . | 0BE3 . . . (Mailing Address) | 6 | Country |

TABLE 14

| Field Name |
|---|
| 0BE3 . . . |
| 0BE3 . . . −1 |
| 0BE3 . . . −2 |
| 0BE3 . . . −3 |
| 0BE3 . . . −4 |
| 0BE3 . . . −5 |
| 0BE3 . . . −6 |

In an embodiment, the value of Attribute 0BE3 . . . (Mailing Address) is calculated by replacing the bracketed numbers in the Format String for Type 20 (Mailing Address) in Table 15 with the value of the Attribute with the corresponding Sequence. For Domain Object xxxx . . . (ControlBEAM), the value of its 0BE3 . . . (Mailing Address) is calculated from the values in xxx to derive a calculated value shown in xxx

TABLE 15

| Object GUID | 0BE3 . . . (Mailing Address) | 7CB9 . . . (Street) | A6AE . . . (Unit) | EB60 . . . (City) | A42B . . . (State) | 0032 . . . (Postal Code) | E948 . . . (Country) |
|---|---|---|---|---|---|---|---|
| 257A . . . | 1 Main St Irvine, CA 92657 USA | 1 Main St |  | Irvine | CA | 92657 | USA |

In an embodiment, from a triggered action upon creating or updating an Entity object, the object event processor can create Attribute objects from the "Parent Entity" element and/or the "Child Entity" element of the Entity object as illustrated in FIG. 12.

Figure 13:
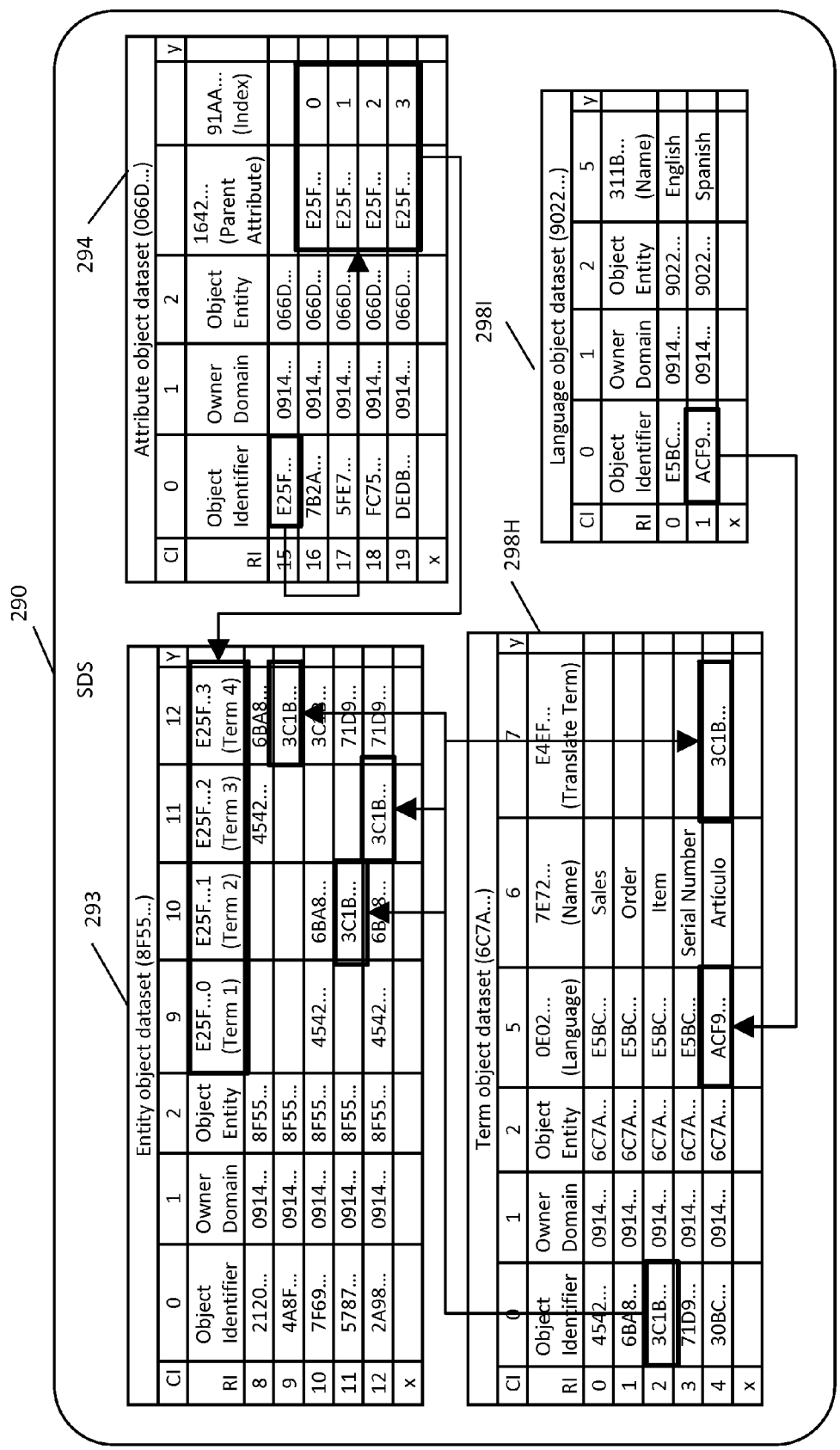
Figure 14:
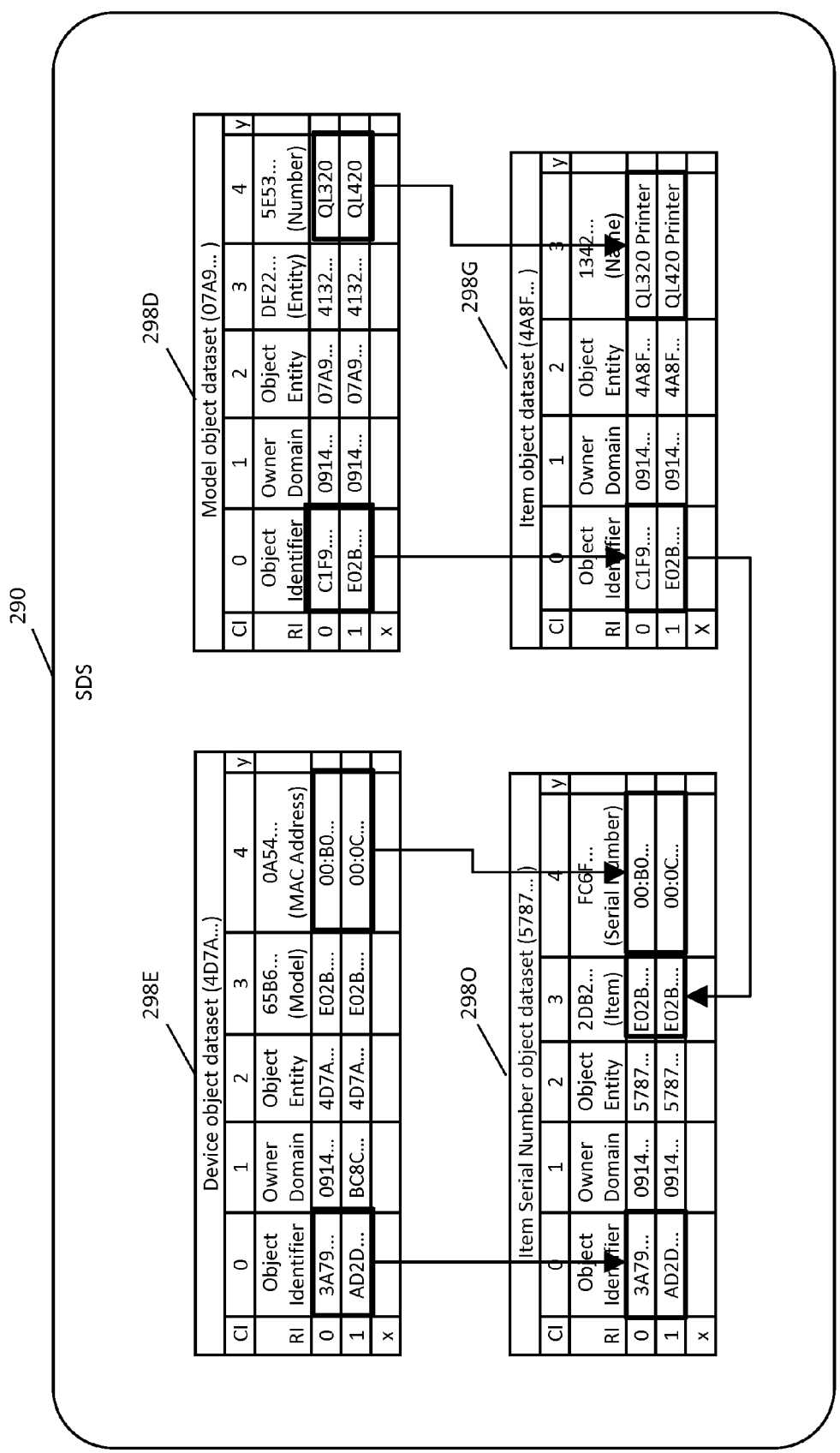
Figure 15:
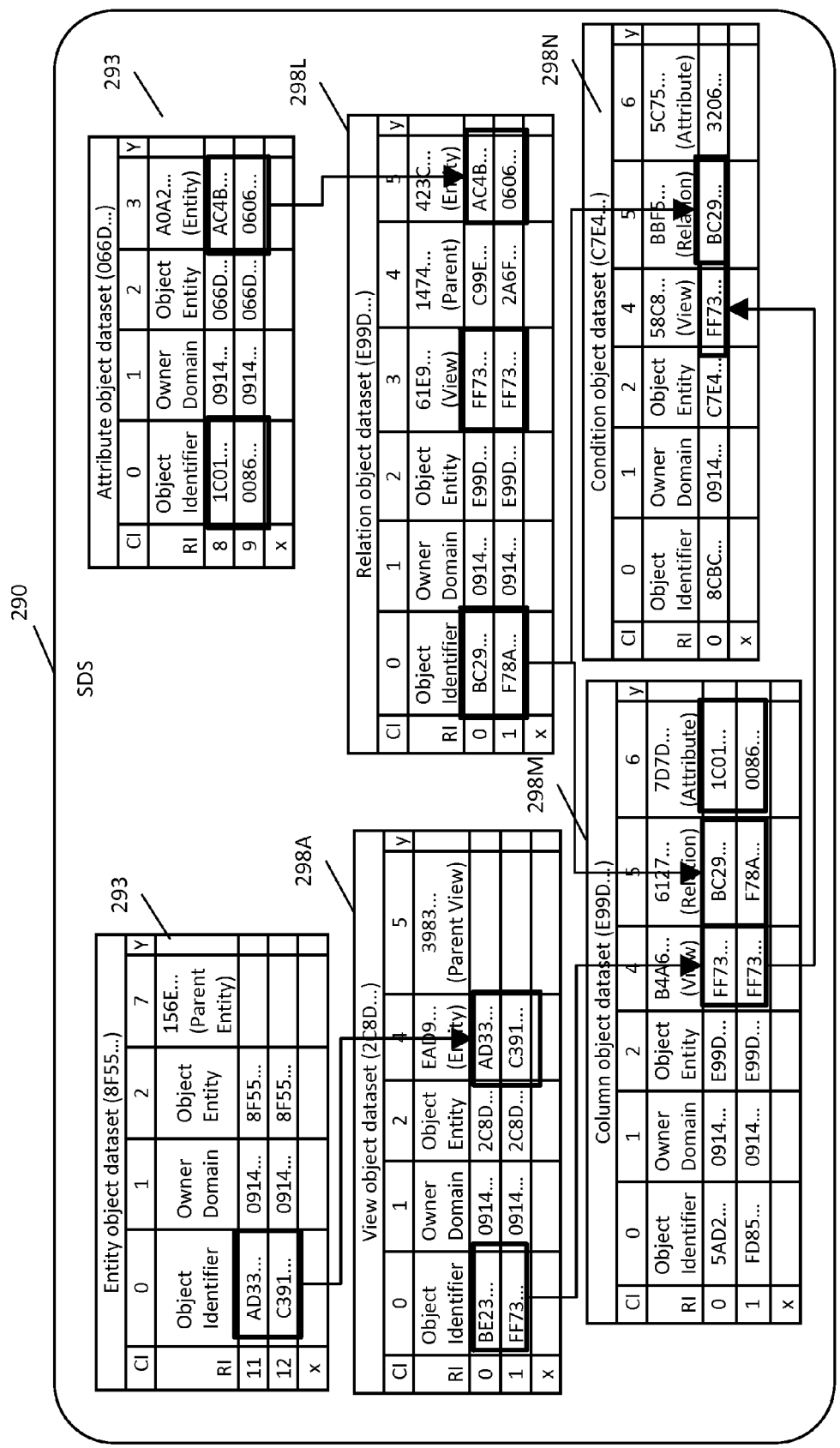
Figure 16:
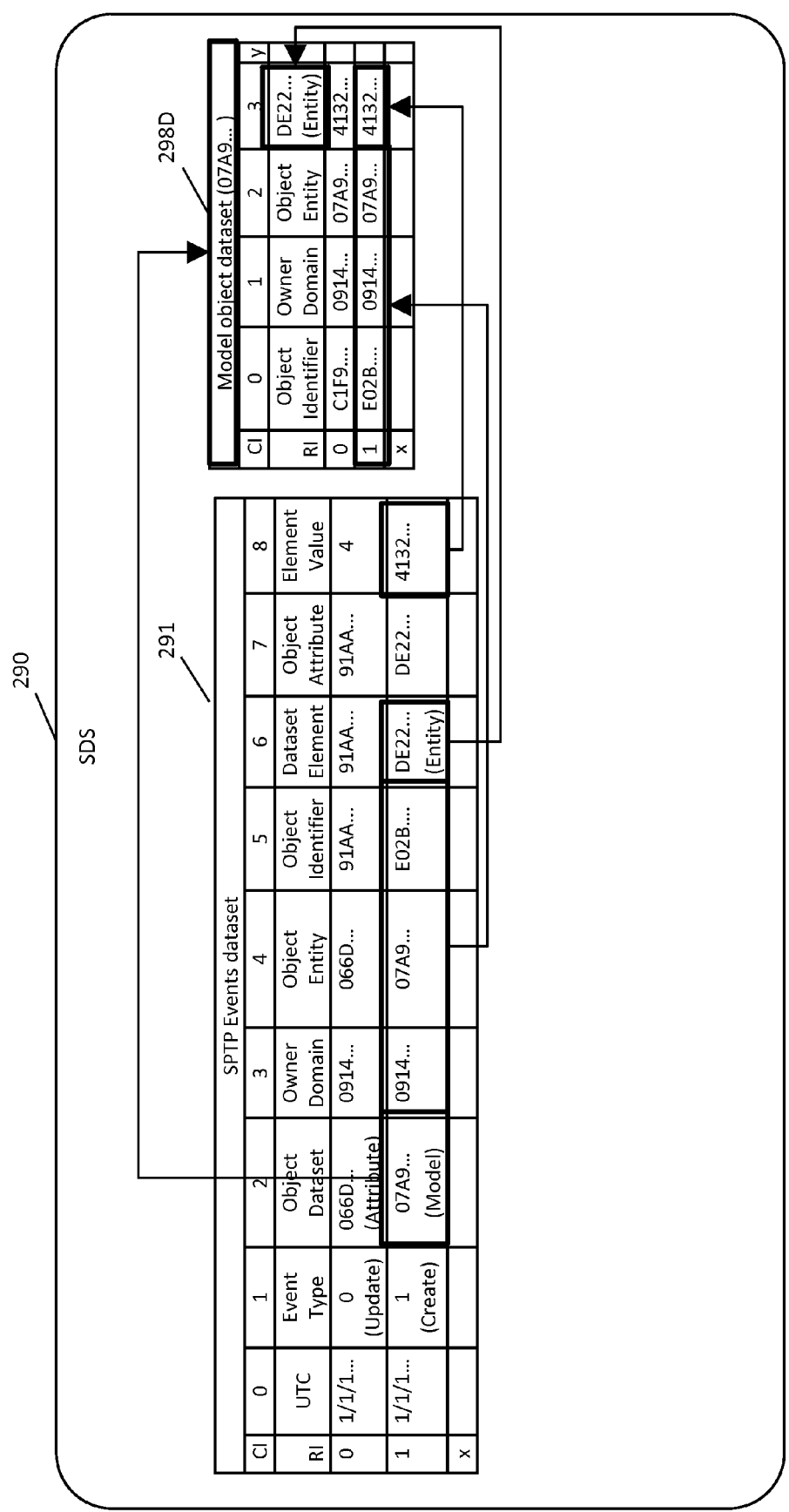
Figure 17:
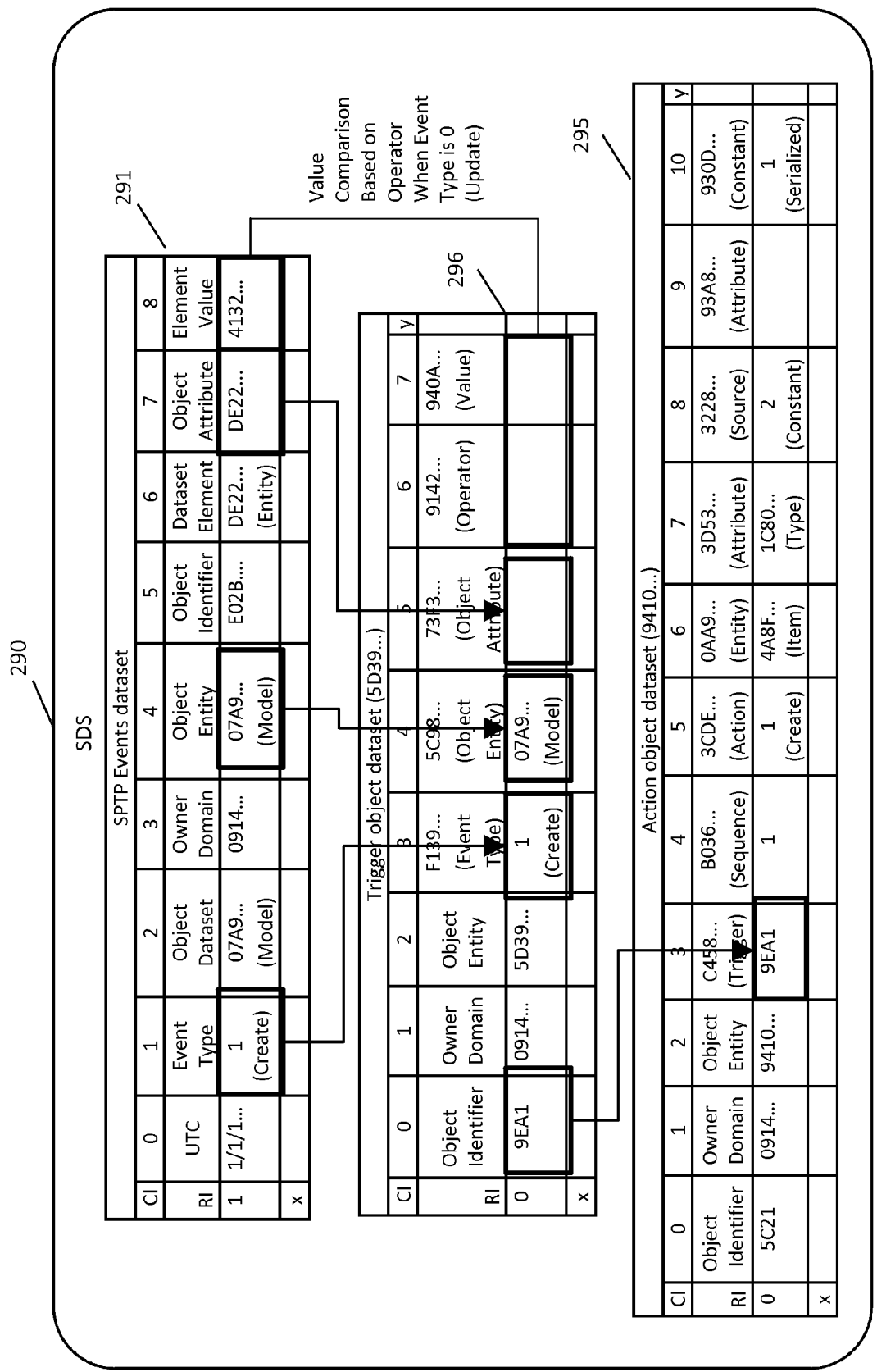

In an embodiment, human readable identifiers for objects within certain object datasets (e.g., Entities object dataset 293, Attributes object dataset 294) can be constructed from assigned objects from a Terms object dataset as illustrated in FIG. 13. For example, a human readable identifier of "Sales

TABLE 16

| Element Name |
|---|
| 6FE7 . . . |
| 6FE7 . . . −1 |
| 6FE7 . . . −2 |
| 6FE7 . . . −3 |
| 6FE7 . . . −4 |

TABLE 16-continued

| Element Name |
|---|
| 6FE7 . . . −5 |
| 6FE7 . . . −6 |

In an embodiment, the value of Attribute 6FE7 . . . (Full Name) is calculated by replacing the bracketed numbers in the Format String for Type 22 (Full Name) in Table 17 with the value of the Attribute with the corresponding Sequence. For Domain Object xxxx . . . (ControlBEAM), the value of its 0BE3 . . . (Full Name) is calculated from the values in Table xx to derive a calculated value shown in Table xx as illustrated in Table xxx.

TABLE 17

| Object GUID | 6FE7 . . . (Full Name) | (Title) | DAC4 . . . (First Name) | (Middle Name) | B48C . . . (Last Name) | (Suffix) | (Company) |
|---|---|---|---|---|---|---|---|
| | Mr. John M. Smith Jr. ControlBEAM | Mr. | John | M. | Smith | Jr. | ControlBEAM |

TABLE 18

| Attribute | Value |
|---|---|
| 6FE7 . . . (Full Name) | Mr. John M. Smith Jr. |
| 6FE7 . . . (Full Name) | ControlBEAM |
| 0BE3 . . . (Mailing Address) | 1 Main St Irvine, CA 92657 USA |

6. Example Embodiment of an Object View Generator

The following description illustrates a non-limiting embodiment of an Object View Generator (OVG), as a resource of a machine.

In an embodiment, resource handler 215 invokes OVG 282 to process SPTP View ID 287 or SPTP View 287 included in a statement in a row within a SPTP Request (e.g., SPTP Request dataset 415). OVG 282 returns SPTP Request 286 as a response to resource handler 215.

In an embodiment, OEP 281 invokes OVG 282 to process SPTP View ID 284 and OVG 282 returns SPTP Request 285 as a response to OEP 281.

In an embodiment, OVG 282 generates one or more view datasets from objects within object datasets within SDS 290 related to a SPTP View ID (e.g., SPTP View ID 287). OVG 282 nests these view datasets within a SPTP View Definition dataset.

In an embodiment, OVG 282 generates a view dataset from objects within object datasets within SDS 290 that comprises elements defined within a SPTP View Definition dataset (e.g., SPTP View dataset 287).

In an embodiment, agent nests one or more view datasets generated from OVG 282 within a program dataset or application dataset.

In an embodiment, a view dataset generated by OVG 282 from a SPTP View may include elements that represent the state of machine 200.

In an embodiment, OVG 282 generates a statement from a SPTP View that can be executed by a resource. In this embodiment, the statement is a resource-compatible script that can include object dataset elements and formatting script.

In an embodiment, OEP 281 generates a row within SPTP Request 262 and includes the statement within the row.

7. Example Embodiment of an Object Event Processor

The following description illustrates a non-limiting embodiment of an Object Event Processor (OEP), as a resource of a machine.

In an embodiment, resource handler 215 invokes OEP 281 to process SPTP Events 271 included in a statement in a row within a SPTP Request and OEP 281 returns SPTP Request 261 as a response to resource handler 215.

In an embodiment, OEP 281 processes one or more rows in SPTP Events. In an embodiment, each row in SPTP Events comprises a type of action.

In an embodiment, processing a type of action within SPTP Events creates an object within an object dataset within SDS 290.

In an embodiment, processing a type of action within SPTP Events deletes an object within an object dataset within SDS 290.

In an embodiment, processing a type of action within SPTP Events sets an attribute value of an object within an object dataset within SDS 290.

In an embodiment, processing a type of action within SPTP Events sets an attribute value of an object within an object dataset to a value contained in the same row as the action within SPTP Events.

In an embodiment, processing a type of action within SPTP Events sets an attribute value of an object within an object dataset to a value derived from one or more attribute values of related objects within object datasets within SDS 290.

In an embodiment, objects created, updated, and deleted by OEP 281 may include objects used to create a nested dataset within a program dataset or a nested dataset within an application dataset and may include contact object(s), message object(s), task object(s), appointment object(s), and the like.

In an embodiment, an object within an object dataset within an SDS that is updated by OEP 281 may include the state of the machine on which OEP 281 resides.

In an embodiment, a row in an Action object dataset 295 comprises a type of action and an object view identifier (e.g., SPTP View ID 284).

In an embodiment, OEP 281 invokes OVG 282 to process a type of action within a row in Action object dataset 295 that also comprises SPTP View ID 284 and OVG 282 returns SPTP Request 285 to OEP 281. OEP 281 appends the rows within SPTP Request 285 to SPTP Request 261.

In an embodiment, OEP 281 references nested Trigger object dataset 296 and Action object dataset 295 within Application object dataset 236 which are generated from related objects in a SDS 290 including Trigger object dataset 296 and Action object dataset 295.

8. Example Embodiment of Object Datasets within a Structured Data Store

The following description illustrates a non-limiting embodiment of object datasets within a structured data store that can be incorporated within the nested datasets of a program and/or application dataset.

In an embodiment, Entity object dataset 293 can comprise the objects illustrated in Table 19.

TABLE 19

| Entity object dataset (8F55 . . .) | | | |
|---|---|---|---|
| Object Identifier | (E25F . . .) Name | 28C9 . . . (Parent Entity) | 156E . . . (Master Entity) |
| 524F . . . | Appointment | | 93DA . . . (Message) |
| F584 . . . | Appointment Attendee | 524F . . . (Appointment) | A1ED . . . (Message Recipient) |
| F652 . . . | Command | | |
| 155E . . . | Connection | | |
| 236F . . . | Contact | | CDBD . . . (Domain) |
| AC4B . . . | Dataset | | |
| 0606 . . . | Dataset Element | | |
| 2495 . . . | Dataset Transfer | | |
| 713D . . . | Dataset Transfer Column | 2495 . . . (Dataset Transfer) | E99D . . . (Entity View Column) |
| DC99 . . . | Dataset Transfer Condition | 2495 . . . (Dataset Transfer) | C7E4 . . . (Entity View Condition) |
| 5851 . . . | Dataset Transfer Formula | 2495 . . . (Dataset Transfer) | C7E4 . . . (Entity View Condition) |
| 4D7A . . . | Device | | |
| 566F . . . | Dictionary | | |
| 6C7A . . . | Dictionary Term | 566F . . . (Dictionary) | |
| 8618 . . . | Dictionary Term Translation | 6C7A . . . (Dictionary Term) | |
| CDBD . . . | Domain | | |
| 8F55 . . . | Entity | | |
| 066D . . . | Entity Attribute | 8F55 . . . (Entity) | |
| 8178 . . . | Entity Attribute Value | 066D . . . (Entity Attribute) | |
| 2C8D . . . | Entity View | 8F55 . . . (Entity) | |
| E99D . . . | Entity View Column | 2C8D . . . (Entity View) | |
| C7E4 . . . | Entity View Condition | 2C8D . . . (Entity View) | |
| BEB0 . . . | Entity View Relation | 2C8D . . . (Entity View) | |
| 9022 . . . | Language | | |
| F39A . . . | Member | | |
| 93DA . . . | Message | | |
| A1ED . . . | Message Recipient | 93DA . . . (Message) | |
| AD33 . . . | Method | | |
| C391 . . . | Method Step | 406B . . . (Method) | |
| 07A9 . . . | Model | | |
| A4A9 . . . | Model Attribute | 07A9 . . . (Model) | |
| C659 . . . | Model Attribute Value | A4A9 . . . (Model Attribute) | |
| A2F4 . . . | Session | | |
| CE2E . . . | Shortcut | | |
| 5952 . . . | Subscription | | |
| 2A29 . . . | Subscription Entity | 5952 . . . (Subscription) | |
| 9812 . . . | Task | | 93DA . . . (Message) |
| A8B4 . . . | Task Assignee | 9812 . . . (Task) | A1ED . . . (Message Recipient) |
| 5D39 . . . | Trigger | | C7E4 . . . (Entity View Condition) |
| 9410 . . . | Trigger Action | 2A3A . . . (Trigger) | E99D . . . (Entity View Column) |
| 4F19 . . . | View Mode | | |

In an embodiment, Attribute object dataset 294 can comprise the objects illustrated in Table 20.

TABLE 20

| Attribute object dataset (066D . . .) | | | |
|---|---|---|---|
| Object Identifier | A0A2 . . . (Entity) | 1EDE . . . (Name) | 1001 . . . (Type) |
| C99E . . . | 0606 . . . (Element) | Dataset | 3 (Parent) |
| 251F . . . | 0606 . . . (Element) | Default Value | 1 (Text) |
| 96F1 . . . | 0606 . . . (Element) | Length | 8 (Number) |
| 4601 . . . | 0606 . . . (Element) | Name | 1 (Text) |
| 0086 . . . | 0606 . . . (Element) | Sequence | 25 (Sequence) |
| FE36 . . . | 0606 . . . (Element) | Type | 2 (List) |

TABLE 20-continued

Attribute object dataset (066D . . .)

| Object Identifier | A0A2 . . . (Entity) | 1EDE . . . (Name) | 1001 . . . (Type) |
|---|---|---|---|
| 741D . . . | 066D . . . (Attribute) | Default Value | 1 (Text) |
| 1ABA . . . | 066D . . . (Attribute) | Increment Value | 8 (Number) |
| 9A1F . . . | 066D . . . (Attribute) | Key | 2 (List) |
| 015F . . . | 066D . . . (Attribute) | Length | 8 (Number) |
| 371F . . . | 066D . . . (Attribute) | Master Attribute | 3 (Parent) |
| F1D8 . . . | 066D . . . (Attribute) | Maximum Value | 8 (Number) |
| CFB1 . . . | 066D . . . (Attribute) | Minimum Value | 8 (Number) |
| 1642 . . . | 066D . . . (Attribute) | Parent Attribute | 3 (Parent) |
| 251C . . . | 066D . . . (Attribute) | Required? | 9 (Yes/No) |
| 2794 . . . | 066D . . . (Attribute) | Base Term | 3 (Parent) |
| A0A2 . . . | 066D . . . (Attribute) | Entity | 3 (Parent) |
| 1EDE . . . | 066D . . . (Attribute) | Name | 23 (Object Name) |
| A0F4 . . . | 066D . . . (Attribute) | Parent Base Term | 3 (Parent) |
| 54C9 . . . | 066D . . . (Attribute) | Parent Entity | 3 (Parent) |
| 257A . . . | 066D . . . (Attribute) | Parent Prefix Term | 3 (Parent) |
| C685 . . . | 066D . . . (Attribute) | Prefix Term | 3 (Parent) |
| 91AA . . . | 066D . . . (Attribute) | Sequence | 25 (Sequence) |
| 1001 . . . | 066D . . . (Attribute) | Type | 2 (List) |
| DE22 . . . | 07A9 . . . (Model) | Entity | 3 (Parent) |
| 872C . . . | 07A9 . . . (Model) | Name | 1 (Text) |
| 5E53 . . . | 07A9 . . . (Model) | Number | 1 (Text) |
| 4408 . . . | 07A9 . . . (Model) | Type | 2 (List) |
| 889B . . . | 155E . . . (Connection) | Address | 6 (Notes) |
| 44FD . . . | 155E . . . (Connection) | Data Model | 3 (Parent) |
| 2903 . . . | 155E . . . (Connection) | Device | 3 (Parent) |
| 5329 . . . | 155E . . . (Connection) | Name | 1 (Text) |
| D854 . . . | 155E . . . (Connection) | Parent Connection | 3 (Parent) |
| 6955 . . . | 155E . . . (Connection) | Status | 2 (List) |
| 7AF7 . . . | 155E . . . (Connection) | Type | 2 (List) |
| 9D83 . . . | 155E . . . (Connection) | Zone | 3 (Parent) |
| BB7D . . . | 2495 . . . (Transfer) | Dataset Element | 3 (Parent) |
| 56B8 . . . | 2495 . . . (Transfer) | From Dataset | 3 (Parent) |
| F029 . . . | 2495 . . . (Transfer) | Name | 1 (Text) |
| 25AA . . . | 2495 . . . (Transfer) | Parent Transfer | 3 (Parent) |
| 5A90 . . . | 2495 . . . (Transfer) | Sequence | 25 (Sequence) |
| 9CA3 . . . | 2495 . . . (Transfer) | To Dataset | 3 (Parent) |
| 9E76 . . . | 2495 . . . (Transfer) | Type | 2 (List) |
| 01B5 . . . | 2A29 . . . (Subscription Entity) | Entity | 3 (Parent) |
| 5A5A . . . | 2A29 . . . (Subscription Entity) | Subscription | 3 (Parent) |
| 47F5 . . . | 2C8D . . . (View) | Base Term | 3 (Parent) |
| EAD9 . . . | 2C8D . . . (View) | Entity | 3 (Parent) |
| 9AF1 . . . | 2C8D . . . (View) | Method | 3 (Parent) |
| BBCA . . . | 2C8D . . . (View) | Name | 23 (Object Name) |
| 9AEA . . . | 2C8D . . . (View) | Parent Base Term | 3 (Parent) |
| 98A2 . . . | 2C8D . . . (View) | Parent Prefix Term | 3 (Parent) |
| 3983 . . . | 2C8D . . . (View) | Parent View | 3 (Parent) |
| E6FA . . . | 2C8D . . . (View) | Prefix Term | 3 (Parent) |
| 4A82 . . . | 2C8D . . . (View) | Type | 2 (List) |
| 0A54 . . . | 4D7A . . . (Device) | MAC Address | 1 (Text) |
| 65B6 . . . | 4D7A . . . (Device) | Model | 3 (Parent) |
| 8C65 . . . | 4D7A . . . (Device) | Serial Number | 1 (Text) |
| 1E74 . . . | 4D7A . . . (Device) | Service Domain | 3 (Parent) |
| 78BD . . . | 4F19 . . . (View Mode) | Code | 1 (Text) |
| F691 . . . | 4F19 . . . (View Mode) | Display | 2 (List) |
| 6D57 . . . | 4F19 . . . (View Mode) | Name | 1 (Text) |
| D58A . . . | 4F19 . . . (View Mode) | Parent | 3 (Parent) |
| E40C . . . | 566F . . . (Dictionary) | Name | 1 (Text) |
| 8817 . . . | 5851 . . . (Transfer Formula) | Constant | 1 (Text) |
| A4CC . . . | 5851 . . . (Transfer Formula) | Sequence | 25 (Sequence) |
| DCE1 . . . | 5851 . . . (Transfer Formula) | Source Element | 3 (Parent) |
| 5EBB . . . | 5851 . . . (Transfer Formula) | Transfer Column | 3 (Parent) |
| D7E1 . . . | 5851 . . . (Transfer Formula) | Value Type | 2 (List) |
| 735B . . . | 5851 . . . (Transfer Formula) | Operator | 2 (List) |
| DA87 . . . | 5952 . . . (Subscription) | Allow Create? | 9 (Yes/No) |
| DA12 . . . | 5952 . . . (Subscription) | Allow Delete? | 9 (Yes/No) |
| 09EE . . . | 5952 . . . (Subscription) | Allow Update? | 9 (Yes/No) |
| 7104 . . . | 5952 . . . (Subscription) | Design Access | 2 (List) |
| B0C3 . . . | 5952 . . . (Subscription) | Entity Access | 2 (List) |
| 6089 . . . | 5952 . . . (Subscription) | Name | 1 (Text) |
| 3756 . . . | 5952 . . . (Subscription) | Read Access | 2 (List) |
| 3F58 . . . | 5D39 . . . (Trigger) | App | 3 (Parent) |
| 73F3 . . . | 5D39 . . . (Trigger) | Attribute | 3 (Parent) |
| 3E08 . . . | 5D39 . . . (Trigger) | Domain Attribute | 3 (Parent) |
| 5C98 . . . | 5D39 . . . (Trigger) | Entity | 3 (Parent) |
| 2D2D . . . | 5D39 . . . (Trigger) | Name | 1 (Text) |
| 9142 . . . | 5D39 . . . (Trigger) | Operator | 2 (List) |

TABLE 20-continued

| Attribute object dataset (066D . . .) | | | |
|---|---|---|---|
| Object Identifier | A0A2 . . . (Entity) | 1EDE . . . (Name) | 1001 . . . (Type) |
| FD41 . . . | 5D39 . . . (Trigger) | Status | 2 (List) |
| F139 . . . | 5D39 . . . (Trigger) | Type | 2 (List) |
| 940A . . . | 5D39 . . . (Trigger) | Value | 1 (Text) |
| F2E4 . . . | 6C7A . . . (Term) | Dictionary | 3 (Parent) |
| F2E4 . . . | 6C7A . . . (Term) | Dictionary | 3 (Parent) |
| 7E72 . . . | 6C7A . . . (Term) | Name | 1 (Text) |
| D515 . . . | 6C7A . . . (Term) | Plural Name | 1 (Text) |
| 7E72 . . . | 6C7A . . . (Term) | Term | 1 (Text) |
| 6264 . . . | 713D . . . (Transfer Column) | Source Element | 3 (Parent) |
| D6CD . . . | 713D . . . (Transfer Column) | Constant | 1 (Text) |
| 243F . . . | 713D . . . (Transfer Column) | Sequence | 25 (Sequence) |
| 5D79 . . . | 713D . . . (Transfer Column) | To Element | 3 (Parent) |
| 7324 . . . | 713D . . . (Transfer Column) | Transfer | 3 (Parent) |
| 9C4F . . . | 713D . . . (Transfer Column) | Value Type | 2 (List) |
| 9F5E . . . | 8178 . . . (Value) | Attribute | 3 (Parent) |
| FA79 . . . | 8178 . . . (Value) | Base Term | 3 (Parent) |
| 17C5 . . . | 8178 . . . (Value) | Name | 23 (Object Name) |
| 0727 . . . | 8178 . . . (Value) | Parent Base Term | 3 (Parent) |
| 753C . . . | 8178 . . . (Value) | Parent Prefix Term | 3 (Parent) |
| 2D62 . . . | 8178 . . . (Value) | Prefix Term | 3 (Parent) |
| A9F0 . . . | 8178 . . . (Value) | Sequence | 25 (Sequence) |
| CAA7 . . . | 8178 . . . (Value) | Value | 1 (Text) |
| 0E02 . . . | 8618 . . . (Translation) | Language | 3 (Parent) |
| 0E02 . . . | 8618 . . . (Translation) | Language | 3 (Parent) |
| B91D . . . | 8618 . . . (Translation) | Name | 1 (Text) |
| E4EF . . . | 8618 . . . (Translation) | Term | 3 (Parent) |
| E4EF . . . | 8618 . . . (Translation) | Term | 3 (Parent) |
| B91D . . . | 8618 . . . (Translation) | Translation | 1 (Text) |
| 9647 . . . | 8D55 . . . (App Entity) | App | 3 (Parent) |
| A5F7 . . . | 8D55 . . . (App Entity) | Entity | 3 (Parent) |
| 4B5D . . . | 8F55 . . . (Entity) | Autonumber Attribute | 3 (Parent) |
| DEDB . . . | 8F55 . . . (Entity) | Base Term | 3 (Parent) |
| 0AB1 . . . | 8F55 . . . (Entity) | Child Attribute | 3 (Parent) |
| 52E6 . . . | 8F55 . . . (Entity) | Child Entity | 3 (Parent) |
| 184C . . . | 8F55 . . . (Entity) | Command | 3 (Parent) |
| BB02 . . . | 8F55 . . . (Entity) | Dictionary | 3 (Parent) |
| 1D46 . . . | 8F55 . . . (Entity) | Key Attribute | 3 (Parent) |
| 156E . . . | 8F55 . . . (Entity) | Master Entity | 3 (Parent) |
| 4039 . . . | 8F55 . . . (Entity) | Mirror Attribute | 3 (Parent) |
| 4449 . . . | 8F55 . . . (Entity) | Mirror Entity | 3 (Parent) |
| E25F . . . | 8F55 . . . (Entity) | Name | 23 (Object Name) |
| B68B . . . | 8F55 . . . (Entity) | Parent Attribute | 3 (Parent) |
| 5FE7 . . . | 8F55 . . . (Entity) | Parent Base Term | 3 (Parent) |
| 28C9 . . . | 8F55 . . . (Entity) | Parent Entity | 3 (Parent) |
| 7B2A . . . | 8F55 . . . (Entity) | Parent Prefix Term | 3 (Parent) |
| FC75 . . . | 8F55 . . . (Entity) | Prefix Term | 3 (Parent) |
| BE05 . . . | 8F55 . . . (Entity) | Primary Key | 2 (List) |
| AC15 . . . | 8F55 . . . (Entity) | Sequence Attribute | 3 (Parent) |
| C8A4 . . . | 8F55 . . . (Entity) | Starting Autonumber | 8 (Number) |
| BE05 . . . | 8F55 . . . (Entity) | Type | 2 (List) |
| 311B . . . | 9022 . . . (Language) | Name | 1 (Text) |
| 311B . . . | 9022 . . . (Language) | Name | 1 (Text) |
| B7CE . . . | 93DA . . . (Message) | Body | 6 (Notes) |
| 3E19 . . . | 93DA . . . (Message) | From | 3 (Parent) |
| 56CF . . . | 93DA . . . (Message) | Object | 3 (Parent) |
| 4CFB . . . | 93DA . . . (Message) | Object Entity | 3 (Parent) |
| 6BA9 . . . | 93DA . . . (Message) | Sent Date/Time | 16 (Date/Time) |
| FE29 . . . | 93DA . . . (Message) | Status | 2 (List) |
| 2C37 . . . | 93DA . . . (Message) | Subject | 1 (Text) |
| 97A3 . . . | 93DA . . . (Message) | Type | 2 (List) |
| 92B3 . . . | 93DA . . . (Message) | View | 3 (Parent) |
| 3D53 . . . | 9410 . . . (Action) | Attribute | 3 (Parent) |
| 0AA9 . . . | 9410 . . . (Action) | Entity | 3 (Parent) |
| 4BA7 . . . | 9410 . . . (Action) | Name | 1 (Text) |
| B3A1 . . . | 9410 . . . (Action) | Parent Attribute | 3 (Parent) |
| B036 . . . | 9410 . . . (Action) | Sequence | 25 (Sequence) |
| 93A8 . . . | 9410 . . . (Action) | Source Attribute | 3 (Parent) |
| 930D . . . | 9410 . . . (Action) | Source Constant | 1 (Text) |
| 3228 . . . | 9410 . . . (Action) | Source Value Type | 2 (List) |
| C458 . . . | 9410 . . . (Action) | Trigger | 3 (Parent) |
| 3CDE . . . | 9410 . . . (Action) | Type | 2 (List) |
| BE45 . . . | 9410 . . . (Action) | View | 3 (Parent) |
| 1517 . . . | 9812 . . . (Task) | Object | 3 (Parent) |
| A4D4 . . . | 9812 . . . (Task) | Object Entity | 3 (Parent) |
| 1126 . . . | 9812 . . . (Task) | Subject | 1 (Text) |
| A273 . . . | 9812 . . . (Task) | View | 3 (Parent) |

TABLE 20-continued

Attribute object dataset (066D . . .)

| Object Identifier | A0A2 . . . (Entity) | 1EDE . . . (Name) | 1001 . . . (Type) |
|---|---|---|---|
| AC97 . . . | A1ED . . . (Recipient) | Contact | 3 (Parent) |
| B006 . . . | A1ED . . . (Recipient) | Message | 3 (Parent) |
| 366A . . . | A1ED . . . (Recipient) | Status | 2 (List) |
| 336C . . . | A1ED . . . (Recipient) | Type | 2 (List) |
| F110 . . . | A2F4 . . . (Session) | App | 3 (Parent) |
| 2E6A . . . | A2F4 . . . (Session) | App Domain | 3 (Parent) |
| FEB7 . . . | A2F4 . . . (Session) | Connection | 3 (Parent) |
| 1138 . . . | A2F4 . . . (Session) | Device | 3 (Parent) |
| 9ABB . . . | A2F4 . . . (Session) | End Date/Time | 16 (Date/Time) |
| D023 . . . | A2F4 . . . (Session) | Host Domain | 3 (Parent) |
| 9A17 . . . | A2F4 . . . (Session) | Language | 3 (Parent) |
| 9208 . . . | A2F4 . . . (Session) | Member | 3 (Parent) |
| 10D7 . . . | A2F4 . . . (Session) | Member Domain | 3 (Parent) |
| EACC . . . | A2F4 . . . (Session) | Member Entity | 3 (Parent) |
| 1AEE . . . | A2F4 . . . (Session) | Start Date/Time | 16 (Date/Time) |
| C693 . . . | A2F4 . . . (Session) | Status | 2 (List) |
| 4200 . . . | A2F4 . . . (Session) | Subscription | 3 (Parent) |
| 4D9F . . . | A2F4 . . . (Session) | Type | 2 (List) |
| 3492 . . . | A4A9 . . . (Attribute) | Attribute | 3 (Parent) |
| 8524 . . . | A4A9 . . . (Attribute) | Conversion Value | 8 (Number) |
| F81C . . . | A4A9 . . . (Attribute) | Default Value | 1 (Text) |
| 0685 . . . | A4A9 . . . (Attribute) | Increment Value | 8 (Number) |
| 2AE1 . . . | A4A9 . . . (Attribute) | Maximum Value | 8 (Number) |
| 5993 . . . | A4A9 . . . (Attribute) | Minimum Value | 8 (Number) |
| 82B9 . . . | A4A9 . . . (Attribute) | Model | 3 (Parent) |
| 48F7 . . . | A4A9 . . . (Attribute) | Name | 1 (Text) |
| 37C7 . . . | A4A9 . . . (Attribute) | Read? | 9 (Yes/No) |
| C799 . . . | A4A9 . . . (Attribute) | Sequence | 25 (Sequence) |
| C7E3 . . . | A4A9 . . . (Attribute) | Write? | 9 (Yes/No) |
| 9698 . . . | A8B4 . . . (Assignee) | Contact | 3 (Parent) |
| 7E36 . . . | A8B4 . . . (Assignee) | Status | 2 (List) |
| C2C2 . . . | A8B4 . . . (Assignee) | Task | 3 (Parent) |
| B4C9 . . . | A8B4 . . . (Assignee) | Type | 2 (List) |
| E26D . . . | AC4B . . . (Dataset) | Device View | 3 (Parent) |
| AFB3 . . . | AC4B . . . (Dataset) | Name | 1 (Text) |
| 9988 . . . | AC4B . . . (Dataset) | Parent Dataset | 3 (Parent) |
| 1C01 . . . | AC4B . . . (Dataset) | Sequence | 25 (Sequence) |
| 4906 . . . | AC4B . . . (Dataset) | Statement | 6 (Notes) |
| 66C4 . . . | AC4B . . . (Dataset) | Type | 2 (List) |
| 36C8 . . . | AC4B . . . (Dataset) | View | 3 (Parent) |
| D9A4 . . . | AD33 . . . (Method) | Name | 1 (Text) |
| DE89 . . . | AD33 . . . (Method) | Parent Method | 3 (Parent) |
| 33D5 . . . | AD33 . . . (Method) | Sequence | 25 (Sequence) |
| F4F6 . . . | AD33 . . . (Method) | Type | 2 (List) |
| 423C . . . | BEB0 . . . (Relation) | Entity | 3 (Parent) |
| 1474 . . . | BEB0 . . . (Relation) | Parent Relation | 3 (Parent) |
| DC58 . . . | BEB0 . . . (Relation) | Sequence | 25 (Sequence) |
| 50EA . . . | BEB0 . . . (Relation) | Type | 2 (List) |
| 61E9 . . . | BEB0 . . . (Relation) | View | 3 (Parent) |
| E1F3 . . . | C391 . . . (Method Step) | Action Dataset | 3 (Parent) |
| 7730 . . . | C391 . . . (Method Step) | Action Method | 3 (Parent) |
| 3FE1 . . . | C391 . . . (Method Step) | Action Transfer | 3 (Parent) |
| 2A6F . . . | C391 . . . (Method Step) | Condition Element | 3 (Parent) |
| DB97 . . . | C391 . . . (Method Step) | Condition Value | 1 (Text) |
| A3A0 . . . | C391 . . . (Method Step) | Else Condition | 9 (Yes/No) |
| 5237 . . . | C391 . . . (Method Step) | Method | 3 (Parent) |
| 6B94 . . . | C391 . . . (Method Step) | Object Source | 2 (List) |
| 7635 . . . | C391 . . . (Method Step) | Operator | 2 (List) |
| C373 . . . | C391 . . . (Method Step) | Sequence | 25 (Sequence) |
| 6D53 . . . | C391 . . . (Method Step) | Status | 2 (List) |
| C9DF . . . | C391 . . . (Method Step) | Type | 2 (List) |
| 41FB . . . | C659 . . . (Value) | Attribute Value | 3 (Parent) |
| 2CAD . . . | C659 . . . (Value) | Data Field | 3 (Parent) |
| D42D . . . | C659 . . . (Value) | Value | 1 (Text) |
| 5C75 . . . | C7E4 . . . (Condition) | Attribute | 3 (Parent) |
| 8CE5 . . . | C7E4 . . . (Condition) | Condition Attribute | 3 (Parent) |
| B268 . . . | C7E4 . . . (Condition) | Condition Constant | 1 (Text) |
| 0639 . . . | C7E4 . . . (Condition) | Condition Relation | 3 (Parent) |
| 2952 . . . | C7E4 . . . (Condition) | Conjunction | 2 (List) |
| 4698 . . . | C7E4 . . . (Condition) | Operator | 2 (List) |
| BBF5 . . . | C7E4 . . . (Condition) | Relation | 3 (Parent) |
| 2DE5 . . . | C7E4 . . . (Condition) | Segment | 2 (List) |
| FAD1 . . . | C7E4 . . . (Condition) | Sequence | 25 (Sequence) |
| DB0D . . . | C7E4 . . . (Condition) | Value Type | 2 (List) |
| 58C8 . . . | C7E4 . . . (Condition) | View | 3 (Parent) |
| 05A4 . . . | CDBD . . . (Domain) | Administrator | 1 (Text) |

TABLE 20-continued

Attribute object dataset (066D . . .)

| Object Identifier | A0A2 . . . (Entity) | 1EDE . . . (Name) | 1001 . . . (Type) |
|---|---|---|---|
| EB60 . . . | CDBD . . . (Domain) | City | 1 (Text) |
| 151B . . . | CDBD . . . (Domain) | Company | 1 (Text) |
| E948 . . . | CDBD . . . (Domain) | Country | 1 (Text) |
| F1D4 . . . | CDBD . . . (Domain) | Domain Name | 1 (Text) |
| 924C . . . | CDBD . . . (Domain) | Email Address | 11 (Email Address) |
| DAC4 . . . | CDBD . . . (Domain) | First Name | 1 (Text) |
| 6FE7 . . . | CDBD . . . (Domain) | Full Name | 22 (Full Name) |
| B48C . . . | CDBD . . . (Domain) | Last Name | 1 (Text) |
| 0BE3 . . . | CDBD . . . (Domain) | Mailing Address | 20 (Mailing Address) |
| 3604 . . . | CDBD . . . (Domain) | Middle Name | 1 (Text) |
| DB11 . . . | CDBD . . . (Domain) | Password | 14 (Password) |
| 0032 . . . | CDBD . . . (Domain) | Postal Code | 1 (Text) |
| A42B . . . | CDBD . . . (Domain) | State | 1 (Text) |
| 7CB9 . . . | CDBD . . . (Domain) | Street | 1 (Text) |
| DB6B . . . | CDBD . . . (Domain) | Suffix | 1 (Text) |
| E15E . . . | CDBD . . . (Domain) | Title | 1 (Text) |
| 7C01 . . . | CDBD . . . (Domain) | Type | 2 (List) |
| A6AE . . . | CDBD . . . (Domain) | Unit | 1 (Text) |
| 7A31 . . . | CE2E . . . (Shortcut) | Filter | 3 (Parent) |
| E2E5 . . . | CE2E . . . (Shortcut) | Method | 3 (Parent) |
| EF28 . . . | CE2E . . . (Shortcut) | Mode | 3 (Parent) |
| BF34 . . . | CE2E . . . (Shortcut) | Name | 1 (Text) |
| 30AC . . . | CE2E . . . (Shortcut) | Objects | 1 (Text) |
| DE44 . . . | CE2E . . . (Shortcut) | Parent | 3 (Parent) |
| 4696 . . . | CE2E . . . (Shortcut) | Parent Entity | 3 (Parent) |
| 07FD . . . | CE2E . . . (Shortcut) | Parent Object | 8 (Number) |
| 0B8C . . . | CE2E . . . (Shortcut) | Sequence | 25 (Sequence) |
| 775F . . . | CE2E . . . (Shortcut) | Status | 2 (List) |
| FBE5 . . . | CE2E . . . (Shortcut) | Tile Height | 8 (Number) |
| 00E9 . . . | CE2E . . . (Shortcut) | Tile Width | 8 (Number) |
| FDD1 . . . | CE2E . . . (Shortcut) | Type | 2 (List) |
| B319 . . . | CE2E . . . (Shortcut) | View | 3 (Parent) |
| 7CF6 . . . | DC99 . . . (Transfer Condition) | Condition Element | 3 (Parent) |
| 95F2 . . . | DC99 . . . (Transfer Condition) | Constant | 1 (Text) |
| 7BD8 . . . | DC99 . . . (Transfer Condition) | Dataset Transfer | 3 (Parent) |
| 1152 . . . | DC99 . . . (Transfer Condition) | From Element | 3 (Parent) |
| CEC2 . . . | DC99 . . . (Transfer Condition) | Sequence | 25 (Sequence) |
| F378 . . . | DC99 . . . (Transfer Condition) | Value Type | 2 (List) |
| F625 . . . | DC99 . . . (Transfer Condition) | Operator | 2 (List) |
| F3C5 . . . | E99D . . . (Column) | Name | 1 (Text) |
| 0973 . . . | E99D . . . (Column) | Sequence | 25 (Sequence) |
| 99C9 . . . | E99D . . . (Column) | Source | 2 (List) |
| 7D7D . . . | E99D . . . (Column) | Source Attribute | 3 (Parent) |
| 0248 . . . | E99D . . . (Column) | Status | 2 (List) |
| B4A6 . . . | E99D . . . (Column) | View | 3 (Parent) |
| 6127 . . . | E99D . . . (Column) | View Relation | 1 (Text) |
| AACE . . . | F39A . . . (Member) | App | 3 (Parent) |
| F761 . . . | F39A . . . (Member) | Host Domain | 3 (Parent) |
| DBC1 . . . | F39A . . . (Member) | Member Domain | 3 (Parent) |
| A24C . . . | F39A . . . (Member) | Member Entity | 3 (Parent) |
| 3BB8 . . . | F39A . . . (Member) | Parent Member | 3 (Parent) |
| DE5A . . . | F39A . . . (Member) | Status | 2 (List) |
| F631 . . . | F39A . . . (Member) | Subscription | 3 (Parent) |
| 290B . . . | F3D7 . . . (App) | Base Term | 3 (Parent) |
| E320 . . . | F3D7 . . . (App) | Dictionary | 3 (Parent) |
| 8261 . . . | F3D7 . . . (App) | Name | 23 (Object Name) |
| A7DE . . . | F3D7 . . . (App) | Parent Base Term | 3 (Parent) |
| B6EC . . . | F3D7 . . . (App) | Parent Prefix Term | 3 (Parent) |
| 1F2E . . . | F3D7 . . . (App) | Prefix Term | 3 (Parent) |
| EFBF . . . | F584 . . . (Attendee) | Appointment | 3 (Parent) |
| BC10 . . . | F584 . . . (Attendee) | Contact | 3 (Parent) |
| 7B78 . . . | F584 . . . (Attendee) | Status | 2 (List) |
| 580F . . . | F584 . . . (Attendee) | Type | 2 (List) |
| 5AA7 . . . | F652 . . . (Command) | Base Term | 3 (Parent) |
| 3E21 . . . | F652 . . . (Command) | Dialog Entity | 3 (Parent) |
| 4F4A . . . | F652 . . . (Command) | Icon Image | 13 (Image) |
| 2B16 . . . | F652 . . . (Command) | Key | 3 (Parent) |
| 41E4 . . . | F652 . . . (Command) | Method | 3 (Parent) |
| C7FD . . . | F652 . . . (Command) | Mode | 3 (Parent) |
| 38EE . . . | F652 . . . (Command) | Name | 23 (Object Name) |
| 9841 . . . | F652 . . . (Command) | Parent Base Term | 3 (Parent) |
| F5BA . . . | F652 . . . (Command) | Parent Command | 3 (Parent) |
| 67A9 . . . | F652 . . . (Command) | Parent Command | 3 (Parent) |
| BA8C . . . | F652 . . . (Command) | Parent Method | 3 (Parent) |
| 1452 . . . | F652 . . . (Command) | Parent Mode | 3 (Parent) |
| 01BC . . . | F652 . . . (Command) | Parent Prefix Term | 3 (Parent) |

TABLE 20-continued

Attribute object dataset (066D . . .)

| Object Identifier | A0A2 . . . (Entity) | 1EDE . . . (Name) | 1001 . . . (Type) |
|---|---|---|---|
| 23FF . . . | F652 . . . (Command) | Prefix Term | 3 (Parent) |
| FBFB . . . | F652 . . . (Command) | Sequence | 25 (Sequence) |
| C607 . . . | F652 . . . (Command) | Status | 2 (List) |
| 59AB . . . | F652 . . . (Command) | Toggle Command | 3 (Parent) |
| 68D2 . . . | F652 . . . (Command) | Type | 2 (List) |
| 25F1 . . . | F652 . . . (Command) | View | 3 (Parent) |
| 25F1 . . . | F652 . . . (Command) | View | 3 (Parent) |

In an embodiment, Attribute Value object dataset 298R can comprise the objects illustrated in Table 21.

TABLE 21

Attribute Value object dataset (8178 . . .)

| Object GUID | 9F5E . . . (Attribute) | 17C5 . . . (Name) | CAA7 . . . (Value) |
|---|---|---|---|
| 0540 . . . | 1001 . . . (Type) | Text | 1 |
| 92C3 . . . | 1001 . . . (Type) | List | 2 |
| 1C5A . . . | 1001 . . . (Type) | Parent | 3 |
| 3A45 . . . | 1001 . . . (Type) | Date | 4 |
| C2FD . . . | 1001 . . . (Type) | Time | 5 |
| 354C . . . | 1001 . . . (Type) | Notes | 6 |
| CE18 . . . | 1001 . . . (Type) | Function | 7 |
| 840E . . . | 1001 . . . (Type) | Number | 8 |
| 9618 . . . | 1001 . . . (Type) | Yes/No | 9 |
| 02B4 . . . | 1001 . . . (Type) | URL | 10 |
| 51CC . . . | 1001 . . . (Type) | Email Address | 11 |
| 6081 . . . | 1001 . . . (Type) | Phone Number | 12 |
| 084B . . . | 1001 . . . (Type) | Image | 13 |
| 6DE3 . . . | 1001 . . . (Type) | Password | 14 |
| 4EFB . . . | 1001 . . . (Type) | Color | 15 |
| D1CF . . . | 1001 . . . (Type) | Date/Time | 16 |
| 60AF . . . | 1001 . . . (Type) | File | 17 |
| D802 . . . | 1001 . . . (Type) | Shortcut | 18 |
| 2A86 . . . | 1001 . . . (Type) | Signature | 19 |
| 5E15 . . . | 1001 . . . (Type) | Mailing Address | 20 |
| 5BB8 . . . | 1001 . . . (Type) | Dimensions | 21 |
| FE39 . . . | 1001 . . . (Type) | Full Name | 22 |
| 6129 . . . | 1001 . . . (Type) | Object Name | 23 |
| 024B . . . | 1001 . . . (Type) | Level | 24 |
| E92F . . . | 1001 . . . (Type) | Sequence | 25 |
| E9AB . . . | 184C . . . (Menu) | None | 0 |
| 8B28 . . . | 184C . . . (Menu) | Cards | 4 |
| 8151 . . . | 184C . . . (Menu) | Daily | 5 |
| F0AE . . . | 184C . . . (Menu) | Settings | 13 |
| 88AD . . . | 184C . . . (Menu) | Personal | 19 |
| 416F . . . | 336C . . . (Type) | To | 0 |
| FB5F . . . | 336C . . . (Type) | Cc | 1 |
| E8B4 . . . | 336C . . . (Type) | Bcc | 2 |
| 215D . . . | 366A . . . (Status) | Undelivered | 0 |
| 23C1 . . . | 366A . . . (Status) | Delivered | 1 |
| 8A77 . . . | 366A . . . (Status) | Read | 2 |
| 3D46 . . . | 97A3 . . . (Type) | Outbound | 0 |
| 5418 . . . | 97A3 . . . (Type) | Inbound | 1 |
| 830D . . . | F4F6 . . . (Type) | None | 0 |
| E4B8 . . . | F4F6 . . . (Type) | Booting | 1 |
| 32E3 . . . | F4F6 . . . (Type) | Screen Size Change | 2 |
| AAE0 . . . | F4F6 . . . (Type) | Message | 3 |

In an embodiment, Dataset object dataset 297 can comprise objects that define the view datasets that are nested within a program dataset, including the column index within the program dataset, and the corresponding View object that defines the elements included in the view dataset, as illustrated in Table 22.

TABLE 22

Dataset object dataset (AC4B . . .)

| Object Identifier | 9988 . . . (Parent Dataset) | 1C01 . . . (Index) | AFB3 . . . (Name) | 36C8 . . . (View) |
|---|---|---|---|---|
| 44A0 . . . | DC4F . . . (Program) | 0 | Methods | BE23 . . . (Methods) |
| D5CA . . . | DC4F . . . (Program) | 1 | MethodSteps | FF73 . . . (MethodSteps) |
| 67A5 . . . | DC4F . . . (Program) | 2 | Transfers | EEB6 . . . (Transfers) |
| 66B5 . . . | DC4F . . . (Program) | 3 | TransferColumns | 6BCC . . . (TransferColumns) |
| 2248 . . . | DC4F . . . (Program) | 4 | TransferConditions | 64FF . . . (TransferConditions) |
| 5237 . . . | DC4F . . . (Program) | 5 | TransferFormulas | 61F5 . . . (TransferFormulas) |
| DE2A . . . | DC4F . . . (Program) | 6 | DatasetColumns | EF5A . . . (DatasetColumns) |
| FA39 . . . | DC4F . . . (Program) | 7 | Commands | 8EA5 . . . (Commands) |

In an embodiment, View object dataset 298A can comprise objects that define the view datasets that are nested within a program dataset as illustrated in Table 23.

TABLE 23

View object dataset (2C8D . . .)

| Object Identifier | BBCA . . . (Name) | EAD9 . . . (Entity) |
|---|---|---|
| BE23 . . . | Methods | AD33 . . . (Method) |
| FF73 . . . | Steps | C391 . . . (Method Step) |

TABLE 23-continued

View object dataset (2C8D . . .)

| Object Identifier | BBCA . . . (Name) | EAD9 . . . (Entity) |
|---|---|---|
| EEB6 . . . | Transfers | 2495 . . . (Transfer) |
| 6BCC . . . | Columns | 713D . . . (Transfer Column) |
| 64FF . . . | Conditions | DC99 . . . (Transfer Condition) |
| 61F5 . . . | Formulas | 5851 . . . (Transfer Formula) |
| EF5A . . . | Elements | 0606 . . . (Dataset Element) |
| 8EA5 . . . | Commands | F652 . . . (Command) |

In an embodiment, Relation object dataset 298M can comprise objects that define the related object datasets included in each of the view datasets that are nested within a program dataset as illustrated in Table 24.

TABLE 24

Relation object dataset (E99D . . .)

| 61E9 . . . (View) | DC58 . . . (Sequence) | 423C . . . (Entity) | 1474 . . . (Parent Relation) |
|---|---|---|---|
| FF73 . . . (Steps) | 1 | AD33 . . . (Method) | 5237 . . . (Method) |
| FF73 . . . (Steps) | 2 | AD33 . . . (Method) | 7730 . . . (Action Method) |
| FF73 . . . (Steps) | 3 | 2495 . . . (Transfer) | 3FE1 . . . (Action Transfer) |
| FF73 . . . (Steps) | 4 | AC4B . . . (Dataset) | E1F3 . . . (Action Dataset) |
| FF73 . . . (Steps) | 5 | 0606 . . . (Element) | 2A6F . . . (Condition Element) |
| FF73 . . . (Steps) | 6 | AC4B . . . (Dataset) | C99E . . . (Dataset) |
| FF73 . . . (Steps) | 7 | AC4B . . . (Dataset) | 9988 . . . (Parent Dataset) |
| EEB6 . . . (Transfers) | 1 | AC4B . . . (Dataset) | 56B8 . . . (From Dataset) |
| EEB6 . . . (Transfers) | 2 | AC4B . . . (Dataset) | 9988 . . . (Parent Dataset) |
| EEB6 . . . (Transfers) | 3 | AC4B . . . (Dataset) | 9CA3 . . . (To Dataset) |
| EEB6 . . . (Transfers) | 4 | AC4B . . . (Dataset) | 9988 . . . (Parent Dataset) |
| EEB6 . . . (Transfers) | 5 | 0606 . . . (Element) | BB7D . . . (Dataset Element) |
| EEB6 . . . (Transfers) | 6 | 2495 . . . (Transfer) | 25AA . . . (Parent Transfer) |
| 6BCC . . . (Columns) | 1 | 2495 . . . (Transfer) | 7324 . . . (Transfer) |
| 6BCC . . . (Columns) | 2 | 0606 . . . (Element) | 6264 . . . (Source Element) |
| 6BCC . . . (Columns) | 3 | 0606 . . . (Element) | 6264 . . . (To Element) |
| 64FF . . . (Conditions) | 1 | 2495 . . . (Transfer) | 7BD8 . . . (Dataset Transfer) |
| 64FF . . . (Conditions) | 2 | 0606 . . . (Element) | 1152 . . . (From Element) |
| 64FF . . . (Conditions) | 3 | 0606 . . . (Element) | 7CF6 . . . (Condition Element) |
| 64FF . . . (Conditions) | 4 | AC4B . . . (Dataset) | C99E . . . (Dataset) |
| 64FF . . . (Conditions) | 5 | AC4B . . . (Dataset) | 9988 . . . (Parent Dataset) |
| 61F5 . . . (Formulas) | 1 | 713D . . . (Transfer Column) | 5EBB . . . (Transfer Column) |
| 61F5 . . . (Formulas) | 2 | 0606 . . . (Dataset Element) | DCE1 . . . (Source Element) |
| EF5A . . . (Elements) | 1 | AC4B . . . (Dataset) | C99E . . . (Dataset) |
| EF5A . . . (Elements) | 2 | AC4B . . . (Dataset) | 9988 . . . (Parent Dataset) |
| 8EA5 . . . (Commands) | 1 | AD33 . . . (Method) | BA8C . . . (Parent Method) |
| 8EA5 . . . (Commands) | 2 | 4F19 . . . (Mode) | 1452 . . . (Parent Mode) |
| 8EA5 . . . (Commands) | 3 | AD33 . . . (Method) | 41E4 . . . (Method) |
| 8EA5 . . . (Commands) | 4 | 4F19 . . . (Mode) | C7FD . . . (Mode) |
| 8EA5 . . . (Commands) | 5 | 8EA5 . . . (Commands) | 59AB . . . (Toggle Command) |
| 8EA5 . . . (Commands) | 6 | 8EA5 . . . (Commands) | 67A9 . . . (Parent Command) |
| 8EA5 . . . (Commands) | 7 | 2C8D . . . (View) | 25F1 . . . (View) |
| 8EA5 . . . (Commands) | 8 | 8F55 . . . (Entity) | 3E21 . . . (Entity) |

In an embodiment, Column object dataset 298M can comprise objects that define the object dataset columns included in the view datasets that are nested within a program dataset, including the column index, as illustrated in Table 25.

TABLE 25

Column object dataset (E99D . . .)

| B4A6 . . . (View) | 0973 . . . (Index) | 99C9 . . . (Source) | 6127 . . . (Relation) | 7D7D . . . (Attribute) |
|---|---|---|---|---|
| BE23 . . . (Methods) | 0 | 4 (ID) | 0 | |
| BE23 . . . (Methods) | 1 | 1 (Attribute) | 0 | D9A4 . . . (Name) |
| BE23 . . . (Methods) | 2 | 1 (Attribute) | 0 | F4F6 . . . (Type) |
| FF73 . . . (Steps) | 0 | 4 (ID) | 1 | |
| FF73 . . . (Steps) | 1 | 1 (Attribute) | 0 | C9DF . . . (Type) |
| FF73 . . . (Steps) | 2 | 5 (Case) | 0 | C9DF . . . (Type) |
| FF73 . . . (Steps) | 3 | 1 (Attribute) | 0 | A3A0 . . . (Else Condition) |
| FF73 . . . (Steps) | 4 | 1 (Attribute) | 7 | 1C01 . . . (Sequence) |
| FF73 . . . (Steps) | 5 | 1 (Attribute) | 6 | 1C01 . . . (Sequence) |
| FF73 . . . (Steps) | 6 | 1 (Attribute) | 5 | 0086 . . . (Sequence) |
| FF73 . . . (Steps) | 7 | 1 (Attribute) | 0 | 7635 . . . (Operator) |

TABLE 25-continued

Column object dataset (E99D . . .)

| B4A6 . . . (View) | 0973 . . . (Index) | 99C9 . . . (Source) | 6127 . . . (Relation) | 7D7D . . . (Attribute) |
|---|---|---|---|---|
| FF73 . . . (Steps) | 8 | 1 (Attribute) | 0 | DB97 . . . (Condition Value) |
| EEB6 . . . (Transfers) | 0 | 4 (ID) | 0 | |
| EEB6 . . . (Transfers) | 1 | 1 (Attribute) | 0 | 9E76 . . . (Type) |
| EEB6 . . . (Transfers) | 2 | 1 (Attribute) | 2 | 1C01 . . . (Sequence) |
| EEB6 . . . (Transfers) | 3 | 1 (Attribute) | 1 | 1C01 . . . (Sequence) |
| EEB6 . . . (Transfers) | 4 | 1 (Attribute) | 4 | 1C01 . . . (Sequence) |
| EEB6 . . . (Transfers) | 5 | 1 (Attribute) | 3 | 1C01 . . . (Sequence) |
| EEB6 . . . (Transfers) | 6 | 1 (Attribute) | 5 | 0086 . . . (Sequence) |
| EEB6 . . . (Transfers) | 7 | 4 (ID) | 6 | |
| 6BCC . . . (Columns) | 0 | 4 (ID) | 0 | |
| 6BCC . . . (Columns) | 1 | 1 (Attribute) | 0 | 9C4F . . . (Value Type) |
| 6BCC . . . (Columns) | 2 | 5 (Case) | 0 | 9C4F . . . (Value Type) |
| 6BCC . . . (Columns) | 3 | 1 (Attribute) | 3 | 0086 . . . (Sequence) |
| 64FF . . . (Conditions) | 0 | 4 (ID) | 1 | |
| 64FF . . . (Conditions) | 1 | 1 (Attribute) | 2 | 0086 . . . (Sequence) |
| 64FF . . . (Conditions) | 2 | 1 (Attribute) | 0 | F625 . . . (Operator) |
| 64FF . . . (Conditions) | 3 | 1 (Attribute) | 0 | F378 . . . (Value Type) |
| 64FF . . . (Conditions) | 4 | 1 (Attribute) | 0 | 95F2 . . . (Constant) |
| 64FF . . . (Conditions) | 5 | 1 (Attribute) | 5 | 1C01 . . . (Sequence) |
| 64FF . . . (Conditions) | 6 | 1 (Attribute) | 4 | 1C01 . . . (Sequence) |
| 64FF . . . (Conditions) | 7 | 1 (Attribute) | 3 | 0086 . . . (Sequence) |
| 61F5 . . . (Formulas) | 0 | 4 (ID) | 1 | |
| 61F5 . . . (Formulas) | 1 | 1 (Attribute) | 0 | 735B . . . (Operator) |
| 61F5 . . . (Formulas) | 2 | 1 (Attribute) | 0 | D7E1 . . . (Value Type) |
| 61F5 . . . (Formulas) | 3 | 5 (Case) | 0 | D7E1 . . . (Value Type) |
| EF5A . . . (Elements) | 0 | 1 (Attribute) | 2 | 1C01 . . . (Sequence) |
| EF5A . . . (Elements) | 1 | 1 (Attribute) | 1 | 1C01 . . . (Sequence) |
| EF5A . . . (Elements) | 2 | 1 (Attribute) | 0 | 0086 . . . (Sequence) |
| EF5A . . . (Elements) | 3 | 1 (Attribute) | 0 | 251F . . . (Default Value) |
| 8EA5 . . . (Commands) | 0 | 4 (ID) | 0 | |
| 8EA5 . . . (Commands) | 1 | 4 (ID) | 1 | |
| 8EA5 . . . (Commands) | 2 | 4 (ID) | 2 | |
| 8EA5 . . . (Commands) | 3 | 4 (ID) | 3 | |
| 8EA5 . . . (Commands) | 4 | 4 (ID) | 4 | |
| 8EA5 . . . (Commands) | 5 | 4 (ID) | 5 | |
| 8EA5 . . . (Commands) | 6 | 4 (ID) | 6 | |
| 8EA5 . . . (Commands) | 7 | 4 (ID) | 7 | |
| 8EA5 . . . (Commands) | 8 | 4 (ID) | 8 | |
| 8EA5 . . . (Commands) | 9 | 1 (Attribute) | 0 | 38EE . . . (Name) |
| 8EA5 . . . (Commands) | 10 | 1 (Attribute) | 4 | 78BD . . . (Code) |
| 8EA5 . . . (Commands) | 11 | 1 (Attribute) | 0 | 68D2 . . . (Type) |
| 8EA5 . . . (Commands) | 12 | 1 (Attribute) | 0 | C607 . . . (Status) |
| 8EA5 . . . (Commands) | 13 | 1 (Attribute) | 0 | 4F4A . . . (Icon Image) |

9. Example Utility

An implementation of a sample utility which utilizes an embodiment of the disclosed database-driven entity framework for the internet of things will now be described.

For purposes of demonstrating the sample utility, devices A, B, C, and D are machines that all have the agent component and a profile file installed. The profile file maintains structured content including the Device object identifier and its Model object identifier, the identification of a remote agent on a controller device, and the identification of one or more local and/or remote resources. A program and application dataset is also resident on Devices A, B, and C.

Device A is owned by and is the controller device (e.g., web server) for the "zebra.com" Domain object. Device A has the SDS component installed.

The "jsmith@zebra.com" Domain object is owned by the "zebra.com" Domain object, and is a Member object, as a "Sales Rep" entity, of the "zebra.com" Domain object.

Device B is owned by and is the controller device (e.g., web server) for the "adctech.com" Domain object. Device B has the SDS components installed.

Device C is owned by and is an End User Device (EUD) (e.g., smartphone) for the "jsmith@zebra.com" Domain object. Device C has the SDS and agent components installed.

Device C has a "web socket" Connection object to Device A. The "jsmith@zebra.com" Domain object has an active Session object with the "zebra.com" Domain object using this Connection object.

Device D (e.g., printer) does not have a resident program and application dataset, as the agent on Device D has never been booted and provisioned. The name of the "zebra.com" Domain object (i.e. "zebra.com") is the identification of the remote agent in its profile file.

Device E is a machine that does not have the agent component installed.

The "zebra.com" Domain object is a Member object, as a "Vendor" entity, of the "adctech.com" Domain object, and the "adctech.com" Domain object is a mirrored Member object, as a "Customer" entity, of the "zebra.com" Domain object with a subscription to Item and Sales Rep objects owned by the "zebra.com" Domain object. The "adctech.com" Domain object is also a Member object, as a "Developer" entity, of the "zebra.com" Domain object with a subscription to Entity objects owned by the "zebra.com" Domain object.

Entities, Devices, Domains, Connections, Sessions, and Members are represented as objects within object datasets within SDS. The SDS component includes an OEP and OVG. Globally Unique Identifiers (GUIDs) are used as object identifiers within all object datasets in the SDS.

Tables 26 and 27 represent an ordered sequence of steps for demonstrating the sample utility. In these tables, the sequence column in the table represents the sequence, the device column represents the Device (e.g., Device A) performing the sequence step, and the component column represents the component of the device (e.g. agent) identified in the device column that performs the sequence step. The Automation column describes the sequence step being performed.

Through an embodiment of the disclosed database-driven entity framework, the demonstration in Table 26 illustrates how a user on a smartphone (Device C) creates an aggregate "Printer" Entity object and an aggregate "QL420" Model object assigned to the "Printer" Entity object, and how those objects are transported as SPTP Events datasets to a vendor's cloud server (Device A) and stored within its SDS. It further illustrates how automation generates a "QL420 Printer" Item object based on the new "QL420" Model object and associated "Printer" Entity object, and transports the new aggregate "Printer" Entity object and new "QL420 Printer" Item object as a SPTP Events dataset to a customer's cloud server (Device B) based on a subscription, and replicates these objects within its SDS.

The demo also illustrates how the booting of an un-provisioned printer (Device D) transports its Device object identifier and Model object identifier (which is the identity of the new "QL420" model object) and current attribute settings of the printer as a SPTP Events dataset to the vendor's cloud server (Device A) to be stored as a new "00:B0 . . . " Device object within its SDS. It further illustrates how automation generates a new "00:B0 . . . " Item Serial Number object based on the "00:B0 . . . " Device object, and generates nested datasets within a program and application dataset from object datasets in the SDS, and transports the program and application datasets to the printer (Device D). Device D stores the program and application datasets in firmware and processes them using its command processor to control the printer and render a user interface for the printer's control panel.

This demonstration of the sample utility also illustrates how the program and application datasets and current attribute settings of the printer can be transported, as a collection of datasets, from the printer (Device D) to the smartphone (Device C) which processes the datasets using its command processor to render a user interface for a printer's control panel. It further illustrates how the user can change attribute settings of the printer using the printer's control panel rendered on the smartphone (Device C) and transport the setting changes, as an SPTP Events dataset, to the printer (Device D) which processes the rows in SPTP Events to update its attribute settings.

TABLE 26

| Sequence | Device | Component | Automation |
| --- | --- | --- | --- |
| 1.1 | C | command processor | A row in a SPTP Events is created for each attribute value created from user events within a "New Entity" object view, including the "Term" attribute value set to the "Printer" Term object identifier, and the "Master Entity" attribute value set to the "Device" Entity object identifier. When a user event invokes saving the "Printer" Entity object, a row in a SPTP Request is created with the SPTP Events included in its Statement. |
| 1.2 | C | agent | The row in the SPTP Request is transported via HTTP to the agent on Device A using the Agent Connection address"zebra.com" defined in the row. |
| 1.3 | A | agent | The SPTP Events within the Statement of the submitted SPTP Request is submitted to the OEP for the SDS. |
| 1.4 | A | OEP | A "Printer" Entity object and child Attribute and Attribute Value objects are created from these SPTP Events to form an aggregate "Printer" Entity object.<br>As the "Printer" Entity object is a new master Entity object, a triggered action creates a Dataset object within SDS with the Dataset object identifier set to the "Printer" Entity object identifier. A triggered action creates a Printer object dataset within SDS that is referenceable by the "Printer" Entity object identifier. A triggered action creates additional elements within the Printer object dataset corresponding to child Attribute objects of the "Printer" Entity object with each additional element referenceable by the corresponding child Attribute object identifier.<br>As Member "adctech.com" Domain object has a subscription to Entity objects owned by "zebra.com" Domain object, a row in a SPTP Request is created with these same SPTP Events included its Statement. |
| 2.1 | A | agent | The returned SPTP Request is transported via HTTP to the agent on Device B using the Agent Connection address "adctech.com" defined in the SPTP Request. |
| 2.2 | B | agent | The SPTP Events within the Statement of the submitted SPTP Request is submitted to the OEP for the SDS. |
| 2.3 | B | OEP | The aggregate "Printer" Entity object is replicated from these SPTP Events.<br>As the "Printer" Entity object is a new master Entity object, a triggered action creates a Dataset object within SDS with the Dataset object identifier set to the "Printer" Entity object identifier. A triggered action creates a Printer object dataset within SDS that is referenceable by the "Printer" Entity object identifier. A triggered action creates additional elements within the Printer object |

TABLE 26-continued

| Sequence | Device | Component | Automation |
|---|---|---|---|
| | | | dataset corresponding to child Attribute objects of the "Printer" Entity object with each additional element referenceable by the corresponding child Attribute object identifier. |
| 3.1 | C | command processor | A row in a SPTP Events dataset is created for each attribute value created from user events within a "New Model" object view including the "Number" attribute value set to "QL420" and the "Entity" attribute value set to the "Printer" Entity object identifier. When a user event invokes saving the Model object, a row in a SPTP Request is created with the SPTP Events included in its Statement. |
| 3.2 | C | agent | The row in the SPTP Request is transported via HTTP to the agent on Device A using the Agent Connection address defined in the row. |
| 3.3 | A | agent | The SPTP Events within the Statement of the submitted SPTP Request is submitted to the OEP of the SDS |
| 3.4 | A | OEP | An aggregate "QL420" Model object is created from these SPTP Events. (The Model object identifier is included in the profile file installed on Devices associated with this Model.) Additional SPTP Events are created from triggered actions and processed internally to create a "QL420 Printer" Item object from dataset elements in the "QL420" Model object and associated "Printer" Entity object, with the Item object identifier set to the Model object identifier. As Member "adctech.com" Domain object has a subscription to Item objects owned by "zebra.com" Domain object, a row in a SPTP Request is created with these same additional SPTP Events included its Statement. |
| 4.1 | A | agent | The returned SPTP Request is transported via HTTP to the agent on Device B using the Agent Connection address "adctech.com" defined in the SPTP Request. |
| 4.2 | B | agent | The SPTP Events within the Statement of the submitted SPTP Request is submitted to the OEP for the SDS |
| 4.3 | B | OEP | An aggregate "QL420 Printer" Item object is replicated from these SPTP Events. |
| 5.1 | D | agent | On booting of the agent, the content from the resident profile file and program and application datasets are retrieved via the File System resource. As the program and application datasets are not resident on this un-provisioned Device, a row in a SPTP Events dataset is created for each dataset element of the Device object with the value of the Model element set from the profile file's Model object identifier and the value of the "MAC Address" element set from the firmware. Other dataset elements are retrieved from the associated current pin values within the firmware, which can be a SDS. A row in a SPTP Request is created with the SPTP Events included in its Statement and the Agent Connect Type "HTTP" and "Agent Connection" address "zebra.com" set from corresponding values from the profile. The submitted SPTP Request is transported via HTTP to the agent on Device A using the "Agent Connection" address. |
| 5.2 | A | agent | The SPTP Events within the Statement of the submitted SPTP Request is submitted to the OEP for the SDS |
| 5.3 | A | OEP | A "00:B0 . . ." Device object representing Device D is created from the rows in SPTP Events. As the "00:B0 . . ." Device object's "Model" element is assigned to the "QL420" Model object with an "Entity" element assigned to the "Printer" Entity object, a triggered action creates additional rows in SPTP Events. The additional rows are processed internally to create a supplemental "00:B0 . . ." Printer object with its object identifier set to the Device object identifier. Additional rows are created in SPTP Events from triggered actions and processed internally to create a Connection object from dataset elements in the "00:B0 . . ." Device object. Additional rows are created in SPTP Events from triggered actions and processed internally to create a "00:B0 . . ." Item Serial Number object from dataset elements in the "00:B0 . . ." Device object, with the "00:B0 . . ." Item Serial Number object identifier set to the "00:B0 . . ." Device object identifier and the "Number" element of the "00:B0 . . ." Item Serial Number object set to the "MAC Address" of the "00:B0 . . ." Device object. A row in a SPTP Request is created with Request Type set |

TABLE 26-continued

| Sequence | Device | Component | Automation |
|---|---|---|---|
| | | | to 1 (Send Program) and Agent Connect Type set to 1 (Requesting Agent). Another row in a SPTP Request is created with Request Type set to 6 (Send App) and Agent Connect Type set to 1 (Requesting Agent). |
| 6.1 | A | agent | The returned SPTP Request is processed internally to retrieve program and application datasets from the SDS. Nested datasets within the application dataset include the attributes of the "Printer" Entity object that are mapped to the specific Model Attribute objects. A row in a SPTP Response is created with the "Response Type" element set to 1 (Program) and the program dataset included in the "Response" element. Another row in a SPTP Response is created with the "Response Type" element set to 6 (App) and the application dataset included in the "Response" element. The SPTP Response is returned via HTTP to the agent on Device D. |
| 6.2 | D | agent | The program and datasets within rows in the "Response" element of the SPTP Response are saved on the Device via the "File System" resource. |
| 7.1 | C | command processor | On a user event, a row in a SPTP Request is created with the "Request Type" element set to 6 (send App) and the "Agent Connect Type" element set to 7 (TCP Socket) and the MAC Address of Device D included in the "Agent Connection" element. |
| 7.2 | C | agent | The submitted SPTP Request is transported via TCP Socket to the agent on Device D using the "Agent Connection" address defined in the SPTP Request. |
| 7.3 | D | agent | The application dataset is retrieved via the Device's File System resource. A row in a SPTP Response is created with the "Response Type" element set to 6 (App) and the App datasets included in the "Response" element. The SPTP Response is returned via TCP socket to the agent on Device C. |
| 7.4 | C | agent | The App datasets in the "Response" element of the SPTP Response are submitted to the command processor. |
| 8.1 | C | command processor | A dynamic ZCL (Zebra Command Language) statement is created from processing the App datasets and included in the Statement column of a new SPTP Request. |
| 8.2 | C | agent | The submitted SPTP Request is transported via TCP Socket to the agent on Device D using the "Agent Connection" address defined in the SPTP Request. |
| 8.3 | D | agent | A row in a SPTP Response is created with the "Response Type" element set to 3 (Data) and current pin values included in the "Response" element. The SPTP Response is returned via TCP socket to the agent on Device C. |
| 8.4 | C | agent | The Data dataset in the "Response" element of the SPTP Response is submitted to the command processor. |
| 8.5 | C | command processor | A dynamic HTML statement is created from processing the application and Data datasets and is included in the Statement column of a new row in a SPTP Request. |
| 8.6 | C | agent | The HTML statement in the submitted SPTP Request is submitted to the Device's rendering engine to display a "Printer Control Panel" object view that includes the elements and associated pin values within Device D. |
| 9.1 | C | agent | User events within the "Printer Control Panel" object view are communicated to the command processor for processing. |
| 9.2 | C | command processor | A row in a SPTP Events dataset is created for each attribute value changed or created from user events within the "Printer Control Panel" object view. When a user event indicates saving of the object, a row in a SPTP Request is created with the SPTP Events included in its Statement. |
| 9.3 | C | agent | The submitted SPTP Request is transported via TCP Socket to the agent on Device D using the "Agent Connection" address defined in the SPTP Request. |
| 9.4 | D | agent | Device pin settings in firmware are updated from the corresponding elements in the SPTP Events within the Statement of the submitted SPTP Request. |

Through an embodiment of the disclosed database-driven entity framework, the demonstration in Table 27 illustrates how an automated process can generate a new aggregate Purchase Order object from an SPTP Events dataset on a customer's cloud server (B) which is stored within its SDS. The automation then generates a mirrored aggregate Sales Order object that is transported as an SPTP Events dataset to a vendor's cloud server (A) which is then stored within its SDS. The automation then generates a new Task object within its SDS from rows in an SPTP Events dataset. The automation then generates a mirrored Task object that is transported as an SPTP Events dataset to a smartphone (C) which is then stored within its SDS.

The demo also illustrates how the mirrored Task object can be rendered to the user on the smartphone (C) using its command processor to process its program dataset. It further illustrates how a new Shipment object view linked to the Task object can be rendered to the user. The user can fulfill the Sales Order using the rendered Shipment object view and the new aggregate Shipment object is transported as a SPTP Events dataset to the vendor's cloud server (A) and stored within its SDS.

The automation then invokes a disparate carrier web service to initiate pickup, generates a "shipping label" object view of the aggregate Shipment object, and transports the object view to the printer (C) which prints a shipping label and broadcasts an "out of paper" status as a row in an SPTP Events dataset, which generates a Task object. The automation then generates a mirrored aggregate Receipt object that is transported as an SPTP Events dataset to a customer's cloud server (B) which is then stored within its SDS.

TABLE 27

| Sequence | Device | Component | Automation |
|---|---|---|---|
| 1.1 | B | agent | A SPTP Events dataset is submitted to the OEP for the SDS |
| 1.2 | B | OEP | An aggregate Purchase Order object assigned to the "adctech.com" Domain object is created from the rows in an SPTP Events dataset. The "Vendor" element of the Purchase Order object is set to the "zebra.com" Domain object identifier. The "Sales Rep" element of the Purchase Order object is set to the "jsmith@zebra.com" Domain object identifier. The "Item" element of the Purchase Order Item object is set to the "QL420 Printer" Item object identifier generated and replicated in the first demonstration. An additional row in SPTP Events is created from a triggered action and processed internally by the OEP to update the "Order Number" dataset element for the Purchase Order object. Mirrored rows in SPTP Events are created from a triggered action and included as the Statement in a returned row in a SPTP Request dataset to create a mirrored aggregate Sales Order object assigned to the "zebra.com" Domain object with object identifiers matching the Purchase Order object identifiers. |
| 1.3 | B | agent | The returned SPTP Request dataset is transported via HTTP to the agent on Device A using the "Agent Connection" address "zebra.com" defined in the row of the SPTP Request. |
| 1.4 | A | agent | The SPTP Events dataset within the Statement of the row within the SPTP Request is submitted to the OEP for the SDS. |
| 1.5 | A | OEP | An aggregate Sales Order object is created from the rows within the SPTP Events dataset. The "Customer" element of the Sales Order object is set to the "adctech.com" Domain object identifier. A SPTP Event is created from a triggered action and processed internally by the OEP to update the "Order Number" dataset element for the new Sales Order. |
| 2.1 | A | OEP | Additional rows in SPTP Events are created from a triggered action and processed internally by the OEP to create a Task object and Task Recipient object. The SPTP View ID elements of the Task object are set from the triggering row in SPTP Events and triggered action dataset elements. The "Recipient" element of the Task Recipient object is set to the "Sales Rep" element of the Sales Order object, which is the "jsmith@zebra.com" Domain object identifier. Mirrored rows in a SPTP Events are created from a triggered action and processed internally to create a mirrored Task object assigned to the "jsmith@zebra.com" Domain object. These mirrored rows in SPTP Events are also included as the Statement in a returned row in a SPTP Request. |
| 2.2 | A | agent | The returned SPTP Request dataset is transported via web socket to the agent on Device C using the "Agent Connection" address defined in the SPTP Request. |
| 2.3 | C | agent | The SPTP Events dataset within the Statement of the submitted SPTP Request is submitted to the OEP for the SDS |
| 2.4 | C | OEP | A Task object is created from the rows in SPTP Events. |
| 2.5 | C | command processor | An additional row in SPTP Request is created with its Statement set to a SPTP View Definition dataset based on the SPTP View ID elements of the Task object. |
| 2.6 | C | agent | The submitted SPTP Request dataset is transported via HTTP to the agent on Device A using the "Agent Connection" address "zebra.com" defined in the SPTP Request. |

TABLE 27-continued

| Sequence | Device | Component | Automation |
| --- | --- | --- | --- |
| 2.7 | A | agent | The Statement in the row of the submitted SPTP Request is submitted to the OVG. |
| 2.8 | A | OVG | A view dataset is retrieved from object datasets within the SDS based on the SPTP View Definition included in the Statement. |
| 2.9 | A | agent | The view dataset is included in a row of a SPTP Response that is returned via HTTP to the agent on Device C. |
| 2.10 | C | agent | The view dataset in the SPTP Response is returned to the command processor. |
| 2.11 | C | command processor | An HTML script is dynamically generated by the command processor from the program, application, and returned view datasets. The HTML script is included in the Statement of a new row in a SPTP Request dataset. |
| 2.12 | C | agent | The HTML script in the submitted SPTP Request is submitted to the Device's rendering engine to display the "New Shipment" object view to the user logged in as "jsmith@zebra.com" |
| 3.1 | C | agent | User events within the object view are communicated to the command processor for processing. |
| 3.2 | C | command processor | A row in a SPTP Events dataset is created for each attribute value changed or created from user events within the object view. When a user event invokes completion of the Task, a row in a SPTP Request is created with the SPTP Events dataset included in its Statement. |
| 3.3 | C | agent | The submitted SPTP Request dataset is transported via HTTP to the agent on Device A using the "Agent Connection" address "zebra.com" defined in the SPTP Request. |
| 3.4 | A | agent | The SPTP Events dataset within the Statement of the submitted SPTP Request is submitted to the OEP for the SDS |
| 3.5 | A | OEP | An aggregate Shipment object is created from these SPTP Events. The "Customer" element of the Shipment object is set to the "adctech.com" Domain object identifier. An additional row in SPTP Events is created from a triggered action and processed internally by the OEP to update the "Shipment Number" dataset element for the new Shipment object. An additional row in SPTP Events is created from a triggered action and processed internally, submitting the SPTP View ID values in a statement to the OVG. |
| 3.6 | A | OVG | The OVG creates an additional row in SPTP Request setting its Statement to a dynamically generated XML statement. |
| 3.7 | A | OEP | The OEP returns the SPTP Request to the agent. |
| 3.8 | A | agent | A parsing of the XML statement in the row of the SPTP Request is submitted via HTTP to a disparate carrier web service to retrieve a disparate XML response. Rows in a SPTP Events dataset are created from values extracted from the disparate XML response combined with a separate parsing of the XML statement in the SPTP Request. The SPTP Events dataset is submitted to the OEP of the SDS. |
| 3.9 | A | OEP | The Shipment object and certain child objects are updated from the rows in SPTP Events, including the "Status" element of the Shipment object, which triggers an action. An additional row in SPTP Event is created from the triggered action and processed internally to decrement the "Quantity On Hand" dataset element of the "00:B0 . . ." Item Serial Number object assigned to the Shipment Item Serial Number child object of the Shipment Item object of the Shipment object. An additional row in SPTP Events is created from a triggered action and processed internally which submits an SPTP View ID to the OVG. |
| 3.10 | A | OVG | The OVG creates an additional row in SPTP Request, setting its Statement to a dynamically generated ZPL (Zebra Printer Language) script. |
| 3.11 | A | OEP | Mirrored rows in SPTP Events are created from a triggered action and included as the Statement in an additional row in SPTP Request to create a mirrored aggregate Receipt object within the "adctech.com" Domain with object identifiers matching the Shipment object identifiers. The SPTP Request is returned to the agent for processing. |
| 4.1 | A | agent | One row in the returned SPTP Request is transported via TCPIP to the agent on Device D using the "Agent Connection" address defined in the row. |
| 4.2 | D | agent | The ZPL statement in the row of the SPTP Request is submitted to the Device's printing engine to print a shipping |

TABLE 27-continued

| Sequence | Device | Component | Automation |
|---|---|---|---|
| 5.1 | A | agent | label<br>The other row in the returned SPTP Request is transported via HTTP to the agent on Device B using the "Agent Connection" address "adctech.com" defined in the SPTP Request. |
| 5.2 | B | agent | The SPTP Events within the Statement of the row in SPTP Request is submitted to the OEP for the SDS |
| 5.3 | B | OEP | An aggregate Receipt object is created from the rows in SPTP Events. The "Vendor" element of the Receipt object is set to the "zebra.com" Domain object identifier.<br>An additional row in the SPTP Events dataset is created from a triggered action and processed internally by the OEP to update the "Receipt Number" dataset element for the new Receipt object. |
| 6.1 | D | agent | On an "out of paper" machine event, a row in a SPTP Events dataset is created with the "Attribute" column set to the "Paper Status" element identifier of the Printer object and the "Value" column reflecting the numeric representation for the "out of paper" status.<br>A row in a SPTP Request dataset is created with the SPTP Events dataset included in the Statement column, and the "Agent Connection" element set from the corresponding values in the profile.<br>The SPTP Request is transported via HTTP to the agent on Device A using the "Agent Connection" address "zebra.com" defined in the row. |
| 6.2 | A | agent | The SPTP Events dataset within the Statement of the row in SPTP Request is submitted to the OEP for the SDS |
| 6.3 | A | OEP | The Printer object's status element within the SDS is updated from the row in SPTP Events. |
| 7.1 | A | OEP | Additional rows in SPTP Events are created from a triggered action and processed internally by the OEP to create a Task object and Task Recipient object. The SPTP View ID elements of the Task object are set from the triggering row in SPTP Events and triggered action dataset elements. The "Recipient" element of the Task Recipient object is set to the "Custodian" dataset element of the Device object with an object identifier that matches the Printer object identifier. The "Custodian" dataset element is the "jsmith@zebra.com" Domain object identifier.<br>Mirrored rows in SPTP Events are created from a triggered action and processed internally to create a mirrored Task object assigned to the "jsmith@zebra.com" Domain object. These mirrored rows in the SPTP Events are also included as the Statement in a returned row in a SPTP Request. |
| 7.2 | A | agent | The returned SPTP Request is transported via web socket to the agent on Device C using the "Agent Connection" address defined in the row. |
| 7.3 | C | OEP | A Task object is created from the rows in SPTP Events. |

The SPTP Events dataset processed by the OEP in Sequence 1.4 and 2.3 in Table 26 is illustrated in Table 28.

TABLE 28

| | SPTP Events dataset | | | | | | | |
|---|---|---|---|---|---|---|---|---|
| | | | | CI | | | | |
| RI | 1<br>Event<br>Type | 2<br>Object<br>Dataset | 3<br>Owner<br>Domain | 4<br>Object<br>Entity | 5<br>Object<br>Identifier | 6<br>Dataset<br>Element | 7<br>Object<br>Attribute | 8<br>Element<br>Value |
| 0 | 1 | 8F55 . . . | 0914 . . . | 8F55 . . . | 4132 . . . | 156E . . . | 156E . . . | 4D7A . . . |
| 1 | 1 | 8F55 . . . | 0914 . . . | 8F55 . . . | 4132 . . . | E25F . . . 3 | E25F . . . 3 | 8D2A . . . |
| 2 | 1 | 066D . . . | 0914 . . . | 066D . . . | 9E28 . . . | A0A2 . . . | A0A2 . . . | 4132 . . . |
| 3 | 1 | 066D . . . | 0914 . . . | 066D . . . | 9E28 . . . | 91AA . . . | 91AA . . . | 3 |
| 4 | 1 | 066D . . . | 0914 . . . | 066D . . . | 9E28 . . . | 1001 . . . | 1001 . . . | 2 |
| 5 | 1 | 066D . . . | 0914 . . . | 066D . . . | CA31 . . . | A0A2 . . . | A0A2 . . . | 4132 . . . |
| 6 | 1 | 066D . . . | 0914 . . . | 066D . . . | CA31 . . . | 91AA . . . | 91AA . . . | 4 |
| 7 | 1 | 066D . . . | 0914 . . . | 066D . . . | CA31 . . . | 1001 . . . | 1001 . . . | 2 |
| 8 | 1 | 066D . . . | 0914 . . . | 066D . . . | E1D5 . . . | A0A2 . . . | A0A2 . . . | 4132 . . . |
| 9 | 1 | 066D . . . | 0914 . . . | 066D . . . | E1D5 . . . | 91AA . . . | 91AA . . . | 5 |
| 10 | 1 | 066D . . . | 0914 . . . | 066D . . . | E1D5 . . . | 1001 . . . | 1001 . . . | 2 |
| 11 | 1 | 8178 . . . | 0914 . . . | 8178 . . . | 02AB . . . | 9F5E . . . | 9F5E . . . | CA31 . . . |

TABLE 28-continued

SPTP Events dataset

| | CI | | | | | | | |
|---|---|---|---|---|---|---|---|---|
| RI | 1 Event Type | 2 Object Dataset | 3 Owner Domain | 4 Object Entity | 5 Object Identifier | 6 Dataset Element | 7 Object Attribute | 8 Element Value |
| 12 | 1 | 8178 . . . | 0914 . . . | 8178 . . . | 02AB . . . | CAA7 . . . | CAA7 . . . | 1 |
| 13 | 1 | 8178 . . . | 0914 . . . | 8178 . . . | 7588 . . . | 9F5E . . . | 9F5E . . . | CA31 . . . |
| 14 | 1 | 8178 . . . | 0914 . . . | 8178 . . . | 7588 . . . | CAA7 . . . | CAA7 . . . | 2 |
| 15 | 1 | 8178 . . . | 0914 . . . | 8178 . . . | 453A . . . | 9F5E . . . | 9F5E . . . | CA31 . . . |
| 16 | 1 | 8178 . . . | 0914 . . . | 8178 . . . | 453A . . . | CAA7 . . . | CAA7 . . . | 3 |

The OEP creates a "Printer" Entity object by processing RIs 1 through 2 in the SPTP Events dataset as illustrated in Table 29.

TABLE 29

Entity object dataset (8F55 . . .)

| CI | 0 | 1 | 2 | 3 | 12 |
|---|---|---|---|---|---|
| RI | Object Identifier | Owner Domain | Object Entity | 156E . . . (Master Entity) | E25F . . . 3 (Term 4) |
| 9 | 4132 . . . | 0914 . . . | 8F55 . . . | 4D7A . . . (Device) | 8D2A . . . (Printer) |

The OEP creates child Attribute objects of the "Printer" Entity object by processing RIs 2 through 10 in the SPTP Events dataset as illustrated in Table 30.

TABLE 30

Attribute object dataset (066D . . .)

| | CI | | | | | |
|---|---|---|---|---|---|---|
| RI | 0 Object Identifier | 1 Owner Domain | 2 Object Entity | 3 A0A2 . . . (Entity) | 4 91AA . . . (Index) | 6 1001 . . . (Type) |
| 7 | 9E28 . . . | 0914 . . . | 066D . . . | 4132 . . . | 3 | 2 (List) |
| 8 | CA31 . . . | 0914 . . . | 066D . . . | 4132 . . . | 4 | 2 |
| 9 | E1D5 . . . | 0914 . . . | 066D . . . | 4132 . . . | 5 | 2 |

The OEP creates child Attribute Value objects of the Attribute objects by processing RIs 11 through 16 in the SPTP Events dataset as illustrated in Table 31.

TABLE 31

Attribute Value object dataset (8178 . . .)

| CI | 0 | 1 | 2 | 3 | 4 |
|---|---|---|---|---|---|
| RI | Object Identifier | Owner Domain | Object Entity | 9F5E . . . (Attribute) | CAA7 . . . (Value) |
| 0 | 02AB . . . | 0914 . . . | 8178 . . . | CA31 . . . | 1 |

TABLE 31-continued

Attribute Value object dataset (8178 . . .)

| CI | 0 | 1 | 2 | 3 | 4 |
|---|---|---|---|---|---|
| 1 | 7588 . . . | 0914 . . . | 8178 . . . | CA31 . . . | 2 |
| 2 | 453A . . . | 0914 . . . | 8178 . . . | CA31 . . . | 3 |

As the "Printer" Entity object is a new master entity, from a triggered action, the OEP creates a Dataset object with the Dataset object identifier set to the "Printer" Entity object identifier (4132 . . . ) as illustrated in Table 32.

TABLE 32

Dataset object dataset (AC4B . . .)

| CI | 0 | 1 | 2 | 3 | 4 |
|---|---|---|---|---|---|
| RI | Object Identifier | Owner Domain | Object Entity | 66C4 . . . (Type) | 1C01 . . . (Index) |
| 7 | 4132 . . . | 0914 . . . | AC4B . . . | 0 (Object) | 8 |

From a triggered action, the OEP creates a Printer object dataset within SDS that is referenceable by the "Printer" Entity object identifier (4132 . . . ) as illustrated in Table 33. From a triggered action, the OEP also creates additional elements within the Printer object dataset corresponding to child Attribute objects of the "Printer" Entity object with each additional element referenceable by the corresponding child Attribute object identifier (e.g. 9E28 . . . ).

TABLE 33

Printer object dataset (4132 . . .)

| CI | 1 | 2 | 3 | 4 | 5 |
|---|---|---|---|---|---|
| RI | Object Identifier | Owner Domain | Object Entity | 9E28 . . . (Paper Status) | CA31 . . . (Print Speed) |

The SPTP Events processed by the OEP in Sequence 3.4 in Table 26 is illustrated in Table 34.

TABLE 34

SPTP Events dataset

| | CI | | | | | | | |
|---|---|---|---|---|---|---|---|---|
| | 1 | 2 | 3 | 4 | 5 | 6 | 7 | 8 |
| RI | Event Type | Object Dataset | Owner Domain | Object Entity | Object Identifier | Dataset Element | Object Attribute | Element Value |
| 0 | 1 | 07A9 ... | 0914 ... | 07A9 ... | E02B ... | DE22 ... | DE22 ... | 4132 ... |
| 1 | 1 | 07A9 ... | 0914 ... | 07A9 ... | E02B ... | 5E53 ... | 5E53 ... | QL420 |
| 2 | 1 | A4A9 ... | 0914 ... | A4A9 ... | 71E1 ... | 82B9 ... | 82B9 ... | E02B ... |
| 3 | 1 | A4A9 ... | 0914 ... | A4A9 ... | 71E1 ... | 3492 ... | 3492 ... | 9E28 ... |
| 4 | 1 | A4A9 ... | 0914 ... | A4A9 ... | 9035 ... | 82B9 ... | 82B9 ... | E02B ... |
| 5 | 1 | A4A9 ... | 0914 ... | A4A9 ... | 9035 ... | 3492 ... | 3492 ... | CA31 ... |
| 6 | 1 | A4A9 ... | 0914 ... | A4A9 ... | D89F ... | 2CAD ... | 2CAD ... | 71E1 ... |
| 7 | 1 | A4A9 ... | 0914 ... | A4A9 ... | D89F ... | 41FB ... | 41FB ... | 02AB ... |
| 8 | 1 | A4A9 ... | 0914 ... | A4A9 ... | B032 ... | 2CAD ... | 2CAD ... | 9035 ... |
| 9 | 1 | A4A9 ... | 0914 ... | A4A9 ... | B032 ... | 41FB ... | 41FB ... | 7588 ... |

The OEP creates a "QL420" Model object by processing RIs 0 through 1 in the SPTP Events dataset as illustrated in Table 35.

TABLE 35

Model object dataset (07A9 ...)

| CI | 0 | 1 | 2 | 3 | 4 |
|---|---|---|---|---|---|
| RI | Object Identifier | Owner Domain | Object Entity | DE22 ... (Entity) | 5E53 ... (Number) |
| 1 | E02B ... | 0914 ... | 07A9 ... | 4132 ... | QL420 |

From triggered actions, the OEP creates additional rows in SPTP Events as illustrated in Table 36.

TABLE 36

SPTP Events dataset

| | CI | | | | | | | |
|---|---|---|---|---|---|---|---|---|
| | 1 | 2 | 3 | 4 | 5 | 6 | 7 | 8 |
| RI | Event Type | Object Dataset | Owner Domain | Object Entity | Object Identifier | Dataset Element | Object Attribute | Element Value |
| 10 | 1 | 4A8F ... | 0914 ... | 4A8F ... | E02B ... | 1342 ... | 1342 ... | QL420 Printer |
| 11 | 1 | 4A8F ... | 0914 ... | 4A8F ... | E02B ... | 1C80 ... | 1C80 ... | 1 |

In Sequence 3.4 and 4.3 in Table 26, the OEP processes the additional rows (RI 10 through 11) in the SPTP Events dataset to create a "QL420 Printer" Item object from dataset elements in the "QL420" Model object and associated "Printer" Entity object as illustrated in Table 37. The "QL420 Printer" Item object identifier set to the "QL420" Model object identifier.

TABLE 37

Item object dataset (4A8F ...)

| CI | 0 | 1 | 2 | 3 | 4 |
|---|---|---|---|---|---|
| RI | Object Identifier | Owner Domain | Object Entity | 1342 ... (Name) | 1C80 ... (Type) |
| 1 | E02B ... | 0914 ... (zebra.com) | 4A8F ... | QL420 Printer | 1 (Serialized) |

This demonstration of the sample utility also illustrates how the program and application datasets The OEP creates child Model Attribute objects of the "QL420" Model object by processing RIs 2 through 5 in the SPTP Events dataset as illustrated in Table 38.

TABLE 38

Model Attribute object dataset (A4A9 ...)

| CI | 0 | 1 | 2 | 3 | 4 |
|---|---|---|---|---|---|
| RI | Object Identifier | Owner Domain | Object Entity | 82B9 ... (Model) | 3492 ... (Attribute) |
| 0 | 71E1 ... | 0914 ... (zebra.com) | A4A9 ... | E02B ... (QL420) | 9E28 ... (Paper Status) |
| 1 | 9035 ... | 0914 ... | A4A9 ... | E02B ... | CA31 ... (Print Speed) |

This demonstration of the sample utility also illustrates how the program and application datasets The OEP creates child Model Attribute Value objects of the Model Attribute objects by processing RIs 6 through 9 in the SPTP Events dataset as illustrated in Table 39.

TABLE 39

Model Attribute Value object dataset (C659 ...)

| CI | 0 | 1 | 2 | 3 | 4 |
|---|---|---|---|---|---|
| RI | Object Identifier | Owner Domain | Object Entity | 2CAD ... (Model Attribute) | 41FB ... (Attribute Value) |
| 0 | D89F ... | 0914 ... | C659 ... | 71E1 ... | 02AB ... |
| 1 | B032 ... | 0914 ... | C659 ... | 9035 ... | 7588 ... |

The SPTP Events dataset processed by the OEP in Sequence 5.3 in Table 26 is illustrated in Table 40.

TABLE 40

SPTP Events dataset

| | | | | CI | | | | |
|---|---|---|---|---|---|---|---|---|
| RI | 1 Event Type | 2 Object Dataset | 3 Owner Domain | 4 Object Entity | 5 Object Identifier | 6 Dataset Element | 7 Object Attribute | 8 Element Value |
| 0 | 1 | 4D7A... | 0914... | 4D7A... | 3A79... | 65B6... | 65B6... | E02B... |
| 1 | 1 | 4D7A... | 0914... | 4D7A... | 3A79... | 0A54... | 0A54... | 00:B0... |

The OEP creates a "00:B0 . . . " Device object by processing RIs 0 through 1 in the SPTP Events dataset as illustrated in Table 41.

TABLE 41

Device object dataset (4D7A . . .)

| CI | 1 | 2 | 3 | 4 | 5 |
|---|---|---|---|---|---|
| RI | Object Identifier | Owner Domain | Object Entity | 65B6... (Model) | 0A54... (MAC Address) |
| 0 | 3A79... | 0914... (zebra.com) | 4D7A... | E02B... (QL420) | 00:B0... |

As the "00:B0 . . . " Device object's "Model" element is assigned to the "QL420" Model object with an "Entity" element assigned to the "Printer" Entity object, from a triggered action, the OEP creates additional rows in the SPTP Events dataset as illustrated in Table 42.

TABLE 42

SPTP Events dataset

| | | | | CI | | | | |
|---|---|---|---|---|---|---|---|---|
| RI | 1 Event Type | 2 Object Dataset | 3 Owner Domain | 4 Object Entity | 5 Object Identifier | 6 Dataset Element | 7 Object Attribute | 8 Element Value |
| 2 | 1 | 4132... | 0914... | 4132... | 3A79... | 9E28... | 9E28... | 0 |
| 3 | 1 | 4132... | 0914... | 4132... | 3A79... | CA31... | CA31... | 2 |

The OEP processes the additional rows (RI 2 through 3) in the SPTP Events dataset to create a supplemental "00:B0 . . ." Printer object with its object identifier set to the Device object identifier as illustrated in Table 43.

TABLE 43

Printer object dataset (4132 . . .)

| CI | 1 | 2 | 3 | 4 | 5 |
|---|---|---|---|---|---|
| RI | Object Identifier | Owner Domain | Object Entity | 9E28... (Paper Status) | CA31... (Print Speed) |
| 0 | 3A79... | 0914... (zebra.com) | 4132... | 0 (Loaded) | 2 (2 IPS) |

From a triggered action, the OEP creates additional rows in the SPTP Events dataset as illustrated in Table 44.

TABLE 44

SPTP Events dataset

| | | | | CI | | | | |
|---|---|---|---|---|---|---|---|---|
| RI | 1 Event Type | 2 Object Dataset | 3 Owner Domain | 4 Object Entity | 5 Object Identifier | 6 Dataset Element | 7 Object Attribute | 8 Element Value |
| 4 | 1 | 155E... | 0914... | 155E... | F585... | 2903... | 2903... | 3A79... |
| 5 | 1 | 155E... | 0914... | 155E... | F585... | 7AF7... | 7AF7... | 6 |
| 6 | 1 | 155E... | 0914... | 155E... | F585... | 889B... | 889B... | 02.38... |

The OEP processes the additional rows (RI 4 through 6) in the SPTP Events dataset to create a Connection object from dataset elements in the "00:B0 . . . " Device object as illustrated in Table 45.

TABLE 45

Connection object dataset (155E . . .)

CI

| RI | 0 Object Identifier | 1 Owner Domain | 2 Object Entity | 3 2903 . . . (Device) | 4 7AF7 . . . (Type) | 5 889B . . . (Address) |
|---|---|---|---|---|---|---|
| 0 | F585 . . . | 0914 . . . | 155E . . . | 3A79 . . . (00:B0 . . .) | 6 (Web Socket) | 02.38 . . . |

From a triggered action, the OEP creates additional rows in the SPTP Events dataset as illustrated in Table 46.

TABLE 46

SPTP Events dataset

CI

| RI | 1 Event Type | 2 Object Dataset | 3 Owner Domain | 4 Object Entity | 5 Object Identifier | 6 Dataset Element | 7 Object Attribute | 8 Element Value |
|---|---|---|---|---|---|---|---|---|
| 7 | 1 | 5787 . . . | 0914 . . . | 5787 . . . | 3A79 . . . | 2DB2 . . . | 2DB2 . . . | E02B . . . |
| 8 | 1 | 5787 . . . | 0914 . . . | 5787 . . . | 3A79 . . . | FC6F . . . | FC6F . . . | 00:B0 . . . |

The OEP processes the additional rows (RI 7 through 8) in the SPTP Events dataset to create a "00:B0 . . . " Item Serial Number object from dataset elements in the "00:B0 . . . " Device object, with the "00:B0 . . . " Item Serial Number object identifier set to the "00:B0 . . . " Device object identifier and the "Number" element of the "00:B0 . . . " Item Serial Number object set to the "MAC Address" of the "00:B0 . . . " Device object, as illustrated in Table 47.

TABLE 47

Item Serial Number object dataset (5787 . . .)

| CI | 0 | 1 | 2 | 3 | 4 |
|---|---|---|---|---|---|
| RI | Identifier | Owner Domain | Object Entity | 2DB2 . . . (Item) | FC6F . . . (Serial Number) |
| 0 | 3A79 . . . | E324 . . . | 5787 . . . | E02B . . . (QL420) | 00:B0 . . . |

Figure 18:
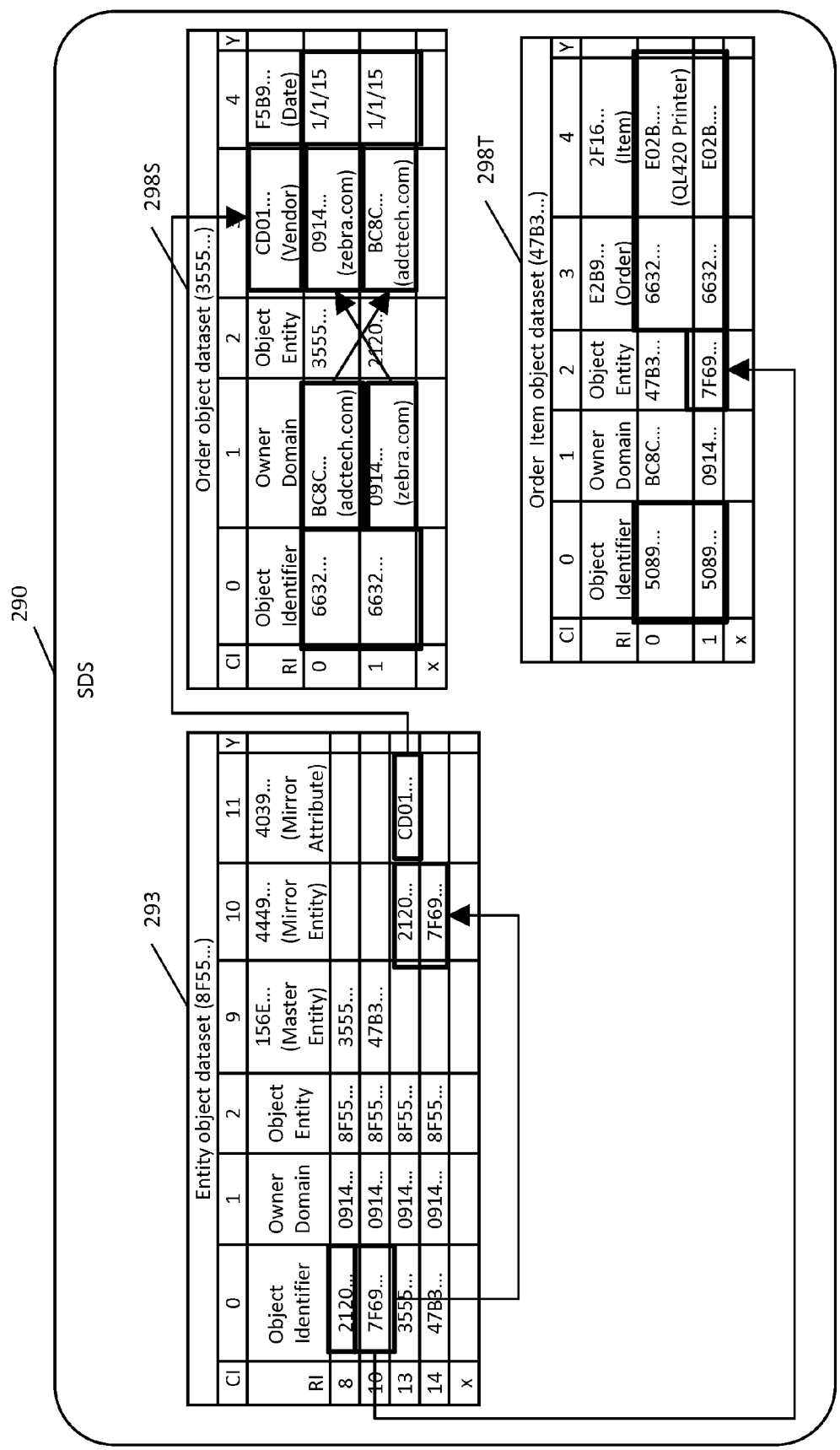

The objects created by the OEP in Sequence 1.2 of Table 27 are illustrated in FIG. 18. The Purchase Order object is shown in RI 0 of the Order object dataset. The Purchase Order Item object is shown in RI 0 of the Order Item object dataset.

The mirrored rows in the SPTP Events dataset created by the OEP in Sequence 1.2 are based on element values within the Entity object dataset illustrated in FIG. 18. The "Mirror Entity" element of "Purchase Order" Entity object (index location [13][10]) is set to the object identifier of the "Sales Order" Entity object (index location [8][0]. The "Mirror Attribute" element of "Purchase Order" Entity object (index location [13][11]) is set to the object identifier of the "Vendor" Attribute object which is shown as Column Index 3 in the Order object dataset.

The "Mirror Entity" element of "Purchase Order Item" Entity object (index location [14][10]) is set to the object identifier of the "Sales Order Item" Entity object (index location [10][0].

The mirrored Sales Order object is shown in RI 1 of the Order object dataset, which can be an object dataset within an SDS on the same machine or different machine than the Purchase Order object. The mirrored Sales Order Item object is shown in RI 1 of the Order Item object dataset, which can be an object dataset within an SDS on the same machine or different machine than the Purchase Order Item object.

The "Owner Domain" element of the mirrored Sales Order object (index location [1][1] is set to the "Vendor" element of the Purchase Order object (index location [0][3]). The "Vendor" column of the Order object dataset also stores element values for the "Customer" attribute of the "Sales Order" Entity object. The "Vendor" element of the mirrored Sales Order object (index location [1][3]) is set to the "Owner Doman" element of the Purchase Order object (index location [0][1]).

The "Object Identifier" element of the mirrored Sales Order object (index location [1][0]) is set to the "Object Identifier" element of the Purchase Order object (index location [0][0]).

The "Date" element and other elements of the mirrored Sales Order object are set to the corresponding element values of the Purchase Order object.

The "Object Entity" of the Sales Order object is set to the "Mirror Entity" element of the "Purchase Order" Entity object at index location [13][10].

9. Example Processing Device

Figure 5:
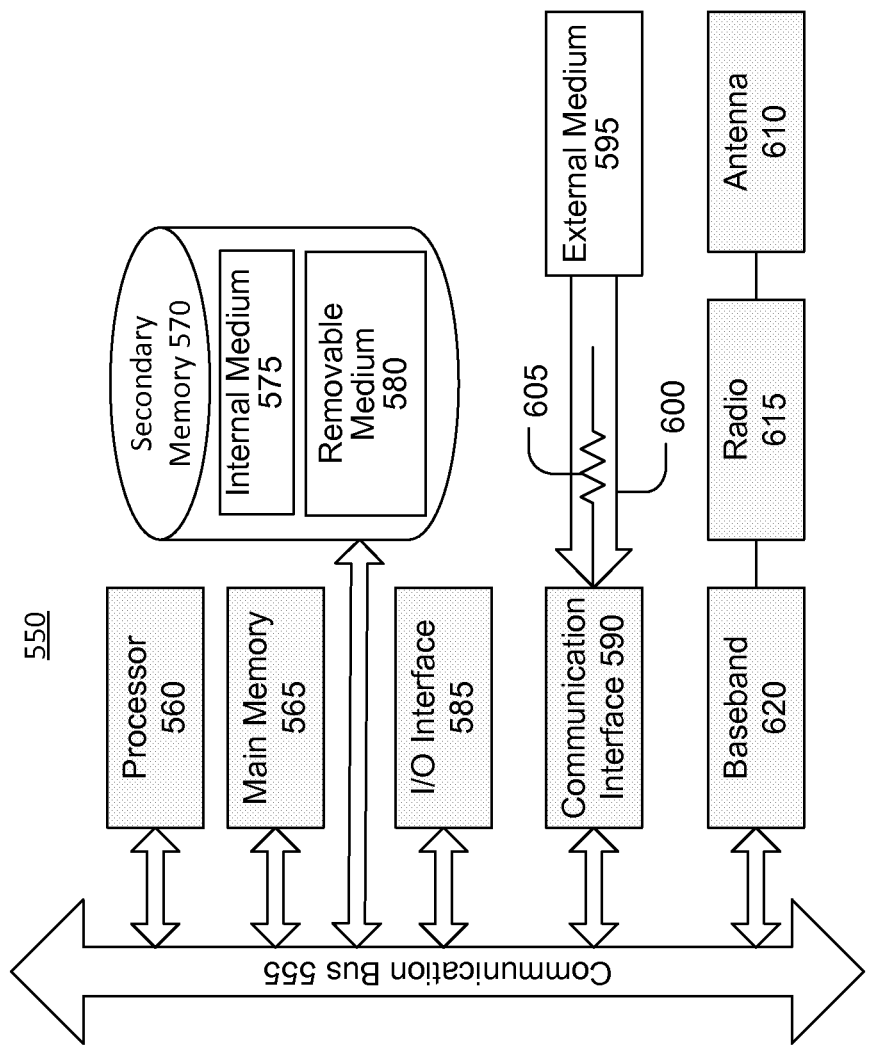
FIG. 5 illustrates a processing system on which one or more of the processes described herein may be executed, according to an embodiment.

FIG. 5 is a block diagram illustrating an example wired or wireless system 550 that may be used in connection with various embodiments described herein. For example the system 550 may be used as or in conjunction with one or more of the mechanisms, processes, methods, or functions (e.g., to store and/or execute the application or one or more software modules of the application) described above, and may represent components of server(s) 110, user system(s) 130, and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Perl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer-executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs or software, such as the disclosed application) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the disclosed embodiments as previously described.

In this description, the term "computer-readable medium" is used to refer to any non-transitory computer-readable storage media used to provide computer-executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer-readable mediums are means for providing executable code, programming instructions, and software to the system 550.

In an embodiment that is implemented using software, the software may be stored on a computer-readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615, and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the disclosed embodiments as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising using at least one hardware processor to:
    facilitate peer-to-peer communication and processing of object state changes by
        from a first agent on a first machine, accessing a first request dataset, wherein the first request dataset represents a two-dimensional structure having one or more rows and a plurality of columns, and wherein each of the one or more rows comprises an identification of an agent, a statement, an identification of a resource to process the statement, and one of a plurality of request types,
    wherein accessing a first request dataset comprises one of receiving a contents of the first request dataset from a second agent on a second machine, receiving the contents of the first request dataset from a resource on the first machine, and, by the first agent, generating the first request dataset, and
    wherein the statement in one or more rows in the first request dataset comprises a nested events dataset, wherein the nested events dataset represents a two-dimensional structure having one or more rows and a plurality of columns nested within the first request dataset, wherein each of the one or more rows represented in the nested events dataset comprises an identification of an object dataset, an identification of an object within the object dataset, an identification of an element of the object within the object dataset, and one of a plurality of event types, and wherein each of the identification of the object dataset, the identification of the object, and the identification of the element of the object comprises a globally unique identifier; and
    processing each of the one or more rows in the first request dataset by
        accessing the identification of an agent in the row,
        when the identification of the agent is the first agent, accessing the request type of the row, and processing one or more elements in the row based on the request type of the row, wherein processing one or more elements in the row based on the request type of the row comp
        rises, when the request type is a predetermined type and the statement in the row is an events dataset, by the resource identified in the row, performing one or more of
            processing the events dataset in the row to create, update, or delete one or more object datasets,
            processing the events dataset in the row to generate one or more additional rows in the events dataset for processing by the resource identified in the row, and
            processing the events dataset in the row to generate one or more additional rows in the first request dataset for processing by the first agent, and,
        when the identification of the agent is not the first agent, sending the statement, the identification of a resource to process the statement, and the request type in the row to the identified agent in the row for processing, wherein the identified agent is on a machine that is different from the first machine.

2. The method of claim 1, wherein an object dataset represents a two-dimensional structure having one or more rows and a plurality of columns, wherein each of the one or more rows of an object dataset represents an object, wherein, for each of the one or more rows of an object dataset, one or more of the plurality of columns represents an element of the object represented by that row, and wherein updating an object dataset comprises setting the value of an element in the object dataset or creating, updating, or deleting a column or a row in the object dataset.

3. The method of claim 2, wherein setting the value of an element in the object dataset comprises setting the value of an element in a row of the object dataset representing the first machine to a state element of the first machine.

4. The method of claim 1, wherein processing the nested events dataset in the row of the first request dataset to create, update, or delete one or more object datasets comprises processing each of the one or more rows in the nested events dataset by:
    accessing the event type in the row; and
    processing elements in the row based on the event type in the row, wherein processing elements in the row based on the event type in the row comprises, when the event type in the row is a predetermined type, performing one of
        creating an object dataset, updating an object dataset, and deleting an object dataset,
    wherein the object dataset is maintained within a data store, wherein the data store comprises one or more object datasets,
    wherein each of the one or more object datasets was created by processing one or more events datasets,
    wherein the object dataset represents a two-dimensional structure having one or more rows and a plurality of columns,
    wherein, for each of the one or more rows of the object dataset, the row represents an object and one or more of the plurality of columns represents an element of the object represented by that row, and
    wherein the object dataset, each object, and each element of the object is identified within the data store by a globally unique identifier.

5. The method of claim 4, wherein the nested events dataset is generated by a resource on the first machine by processing an application dataset, and wherein element values contained within the application dataset are derived from element values within object datasets within the data store.

6. The method of claim 4, wherein processing the elements in the row of the nested events dataset based on the event type in the row of the nested events dataset comprises, for elements in the row of the nested events dataset that satisfy a defined condition, performing one or more defined actions, wherein performing a defined action comprises one or more of:

generating one or more additional rows in the nested events dataset for processing; and generating one or more additional rows in the first request dataset for processing, wherein the defined condition is contained with a triggers dataset, wherein the one or more defined actions are contained within an actions dataset, and wherein each of the triggers dataset and the actions dataset represent object datasets within the data store.

7. The method of claim 1, wherein an object dataset represents a state of the resource identified in the row of the first request dataset, wherein an element of the object represents a state element of the resource identified in the row of the first request dataset, and wherein updating an object dataset comprises setting a value of the state element of the resource identified in the row of the first request dataset.

8. The method of claim 7, wherein the state element of the resource identified in the row of the first request dataset represents a port pin setting of a microcontroller.

9. A method comprising using at least one hardware processor to:

facilitate peer-to-peer communication and processing of object queries by from a first agent on a first machine, accessing a first request dataset, wherein the first request dataset represents a two-dimensional structure having one or more rows and a plurality of columns, and wherein each of the one or more rows comprises an identification of an agent, a statement, an identification of a resource to process the statement, and one of a plurality of request types, wherein accessing a first request dataset comprises one of receiving a contents of the first request dataset from a second agent on a second machine, receiving the contents of the first request dataset from a resource on the first machine, and, by the first agent, generating the first request dataset, and wherein the statement in one or more rows in the first request dataset comprises a nested view definition dataset, wherein the nested view definition dataset comprises one or more nested datasets, wherein each of the one or more nested datasets represents a two-dimensional data structure having one or more rows and a plurality of columns, wherein the nested view definition dataset comprises an identification of one or more object datasets, an identification of one or more elements of the one or more object datasets, an identification of one or more objects within one of the one or more object datasets, and one of a plurality of query types, and wherein each of the identification of the one or more object datasets, the identification of one or more elements of the one or more object datasets, and the identification of one or more objects within one of the one or more object datasets comprises a globally unique identifier; and processing each of the one or more rows in the first request dataset by accessing the identification of an agent in the row, when the identification of the agent is the first agent, accessing the request type of the row, and processing one or more elements in the row based on the request type of the row, wherein processing one or more elements in the row based on the request type of the row comprises, when the request type is a predetermined type and the statement in the row is a view definition dataset, by the resource identified in the row, performing one or more of generating a response dataset, wherein the response dataset comprises a value of one or more elements related to one or more objects identified in the view definition dataset, and generating one or more additional rows in the first request dataset for processing by the first agent, wherein the statement within the one or more additional rows comprises a value of one or more elements related to one or more objects identified in the view definition dataset, and, when the identification of the agent is not the first agent, sending the statement, the identification of a resource to process the statement, and the request type in the row to the identified agent in the row for processing, wherein the identified agent is on a machine that is different from the first machine.

10. The method of claim 9, wherein the response dataset comprises one or more element values retrieved from one or more related object datasets within a data store, wherein each object dataset represents a two-dimensional structure having one or more rows and a plurality of columns, wherein, for each of the one or more rows of each object dataset, the row represents an object and one or more of the plurality of columns represent an element of the object represented by that row, and wherein each of the one or more related object datasets, each object, and each element of the object is identified within the data store by a globally unique identifier.

11. The method of claim 10, wherein the nested view definition dataset is generated by a resource on the first machine by processing an application dataset, wherein element values contained within the application dataset are derived from element values within object datasets within the data store.

12. The method of claim 11, wherein the response dataset comprises element values contained within the application dataset.

13. The method of claim 9, wherein an object dataset represents a state of the resource identified in the row of the first request dataset, wherein an element of the object represents a state element of the resource identified in the row of the first request dataset, and wherein the response dataset comprises a retrieved value of one or more state elements of the resource identified in the row of the first request dataset.

14. The method of claim 13, wherein the state element of the resource identified in the row of the first request dataset represents a port pin setting of a microcontroller.

15. The method of claim 9, further comprising, by the first agent, returning the response dataset for processing to one of the second agent on the second machine, and the resource on the first machine.

16. The method of claim 9, further comprising, when the identification of the agent is not the first agent:
   receiving a second response dataset, representing a response, from the identified agent; and,
   by the first agent, processing the second response dataset.

17. The method of claim 16, wherein a row in the second response dataset comprises a second request dataset representing a two-dimensional structure with the same plurality of columns as the first request dataset.

18. The method of claim 9, wherein the statement within each of the one or more additional rows in the first request dataset comprises a script that is configured to perform one or more of generating a display or user interface, manipulating data, retrieving data, printing a document, invoking an application programming interface, controlling a mechanism, transmitting a message to a web service, changing a state of a machine, and changing a state of a resource of the machine.

* * * * *